(12) United States Patent
Winzer

(10) Patent No.: US 12,313,893 B2
(45) Date of Patent: May 27, 2025

(54) OPTICAL FIBER CABLE AND RACEWAY THEREFOR

(71) Applicant: Nubis Communications, Inc., Aberdeen, NJ (US)

(72) Inventor: Peter Johannes Winzer, Aberdeen, NJ (US)

(73) Assignee: Nubis Communications, Inc., New Providence, NJ (US)

( * ) Notice: Subject to any disclaimer, the term of this patent is extended or adjusted under 35 U.S.C. 154(b) by 0 days.

(21) Appl. No.: 17/912,443

(22) PCT Filed: Mar. 17, 2021

(86) PCT No.: PCT/US2021/022730
§ 371 (c)(1),
(2) Date: Sep. 16, 2022

(87) PCT Pub. No.: WO2021/188648
PCT Pub. Date: Sep. 23, 2021

(65) Prior Publication Data
US 2023/0134543 A1 May 4, 2023

Related U.S. Application Data

(63) Continuation of application No. 16/822,103, filed on Mar. 18, 2020, now Pat. No. 11,194,109.

(60) Provisional application No. 63/145,368, filed on Feb. 3, 2021.

(51) Int. Cl.
*G02B 6/44* (2006.01)

(52) U.S. Cl.
CPC ........... *G02B 6/443* (2013.01); *G02B 6/4431* (2023.05); *G02B 6/4459* (2013.01)

(58) Field of Classification Search
CPC .............................. G02B 6/443; G02B 6/4431
See application file for complete search history.

(56) References Cited

U.S. PATENT DOCUMENTS

| | | | |
|---|---|---|---|
| 5,155,789 A | 10/1992 | Le Noane et al. | |
| 5,956,446 A | 9/1999 | Benzel | |
| 6,226,431 B1 * | 5/2001 | Brown | G02B 6/4411 385/112 |
| 6,249,631 B1 | 6/2001 | LeVey | |
| 6,284,975 B1 | 9/2001 | McCord et al. | |
| 6,321,013 B1 | 11/2001 | Hardwick, III et al. | |
| 8,369,668 B1 | 2/2013 | McNutt et al. | |
| 8,737,788 B2 | 5/2014 | Keller et al. | |

(Continued)

FOREIGN PATENT DOCUMENTS

| | | |
|---|---|---|
| CN | 1723331 A | 1/2006 |
| EP | 0373846 | 6/1990 |

(Continued)

OTHER PUBLICATIONS

JP-2008501151-A English translation (Year: 2008).*

(Continued)

*Primary Examiner* — Charlie Y Peng
(74) *Attorney, Agent, or Firm* — Fish & Richardson P.C.

(57) ABSTRACT

Provided are (i) a fiber-optic cable having a cable sheath that enables significant changes in the cable's cross-sectional shape when the cable is bent and (ii) a raceway that can be used to deploy such a fiber-optic cable.

23 Claims, 31 Drawing Sheets

(56) References Cited

U.S. PATENT DOCUMENTS

| | | |
|---|---|---|
| 8,913,862 B1 | 12/2014 | Emmerich et al. |
| 9,581,777 B2 | 2/2017 | Baucom et al. |
| 10,481,346 B2 | 11/2019 | Ohmura |
| 11,153,670 B1 | 10/2021 | Winzer |
| 11,194,109 B2 | 12/2021 | Winzer |
| 11,287,585 B2 | 3/2022 | Winzer |
| 2004/0184749 A1 | 9/2004 | Herbst et al. |
| 2006/0280413 A1 | 12/2006 | Paschal et al. |
| 2008/0181564 A1 | 7/2008 | Overton et al. |
| 2009/0041414 A1* | 2/2009 | Lavenne ............... G02B 6/566 385/109 |
| 2009/0097213 A1* | 4/2009 | Bicknell ............... G02B 6/43 361/752 |
| 2013/0163935 A1 | 6/2013 | Sasaki |
| 2013/0233880 A1 | 9/2013 | Rago et al. |
| 2014/0178019 A1 | 6/2014 | Sakabe et al. |
| 2014/0199037 A1* | 7/2014 | Hurley ............... G02B 6/4403 385/114 |
| 2014/0219609 A1 | 8/2014 | Nielson et al. |
| 2015/0286024 A1 | 10/2015 | Kolesar |
| 2016/0054531 A1* | 2/2016 | Baca ............... G02B 6/443 385/110 |
| 2018/0335576 A1* | 11/2018 | Färbert ............... G02B 6/385 |
| 2019/0384026 A1 | 12/2019 | Bickhann et al. |
| 2021/0294052 A1 | 9/2021 | Winzer et al. |
| 2021/0376950 A1 | 12/2021 | Winzer |
| 2022/0091351 A1 | 3/2022 | Winzer |
| 2022/0159860 A1 | 5/2022 | Winzer et al. |
| 2022/0244465 A1 | 8/2022 | Winzer et al. |
| 2022/0263586 A1 | 8/2022 | Winzer |
| 2022/0264759 A1 | 8/2022 | Sawyer et al. |
| 2024/0402447 A1 | 12/2024 | Winzer |

FOREIGN PATENT DOCUMENTS

| | | | |
|---|---|---|---|
| JP | 2008501151 A | * | 1/2008 |
| JP | 2011-081089 | | 4/2011 |
| TW | 201802509 A | | 1/2018 |
| WO | WO 2008/054666 A2 | | 5/2008 |
| WO | WO 2004/057715 A2 | | 7/2024 |

OTHER PUBLICATIONS

ABCO Subsea, Polyurethane Vertebrae Bend Restrictor, retrieved from Internet: <https://www.abcosubsea.com/products/bendimiters/polyurethane-vertebrae-bend-restrictor>, 2 pages (2020).

Corning Data Sheet, RocketRibbon(TM) Extreme Density Cable, retrieved from Internet: <https://www.corning.com/catalog/coc/documents/product-specifications/Y56ZQ4-14101 S53 NAFTA_AEN .PDF>, 3 pages (2020).

Fosco, 101 Guidelines for Fiberoptic Cable Installation, retrieved from Internet: <https://www.fiberoptics4sale.com/blogs/archive-posts/9504 7814-101-guidelines-for-fiber--0ptic-cable-installation>, 17 pages (2020).

Hose Master, Stripwound Metal Hose and Assemblies Catalog, retrieved from Internet: <https://www.hosemaster.com/,vp-contenl/uploads/StripwoundCatalog.pdf>, 20 pages (2020).

International Preliminary Report on Patentability in International Appln. No. PCT/US2021/022730, mailed Sep. 29, 2022, 20 pages.

PCT International Search Report and Written Opinion in International Appln. PCT/US2021/022730, dated Jul. 21, 2021, 24 pages.

PCT Invitation to Pay Additional Fees in International Appln. No. PCT/US2021/022730, dated May 25, 2021, 2 pages.

Smith et al., Ribbon vs. Loose Tube Fiber Cabling, Proceedings of the OFC/NFOEC Conference, 3 pages (2007).

Sumitomo Electric Lightwave Data Sheet, Freeform Ribbon(R) Slotted Core Ribbon Cable, retrieved from Internet: <https://www.sumitomoelectric.com/wp-contenl/uploads/2016/08/3456-Slotled-Core-OSP .pdf>, 1 page (2020).

Van Vickle, Optical Fiber Cable Design and Reliability, retrieved from Internet: <https://www.ieee802.org/3/bm/public/rnay 14/vanvickle_01_0514_optx.pdf>, 28 pages (2020).

Extended European Search Report in European Appln. No. 21771175.3, mailed on Mar. 20, 2024, 8 pages.

* cited by examiner

102

102

300

302

302

302

302

302

302

102

102

600

611

612

613

610

FIG. 7A
611
FIG. 7B
612
FIG. 7C
613
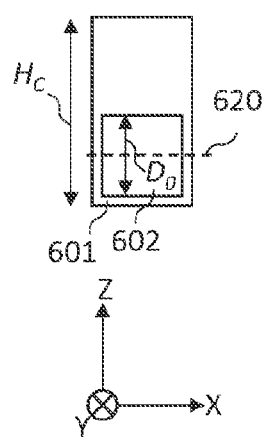
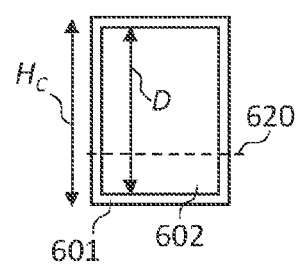
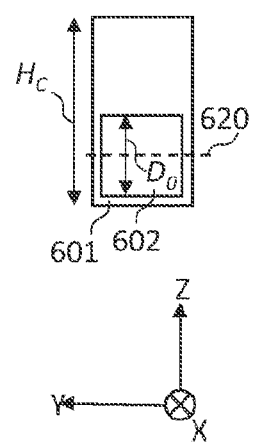

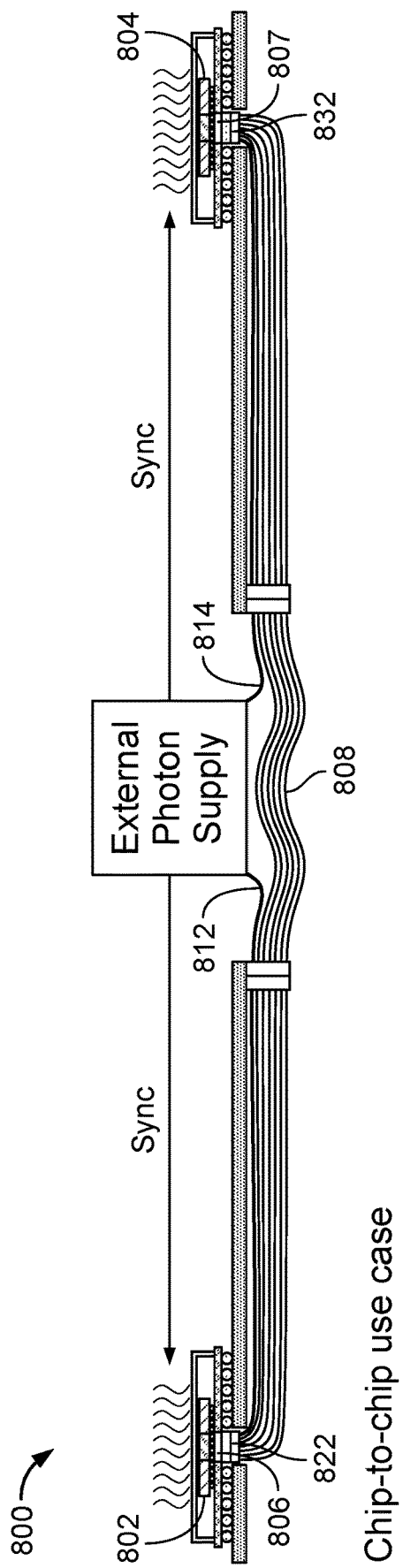
FIG. 8
Chip-to-chip use case
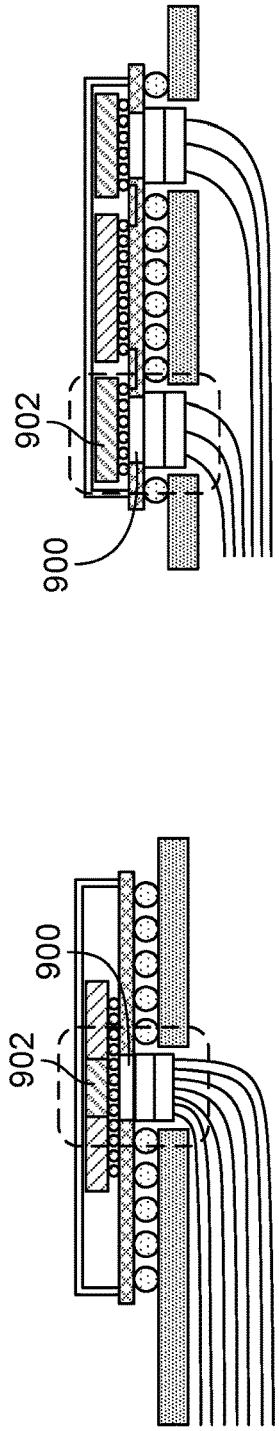
FIG. 9
FIG. 10

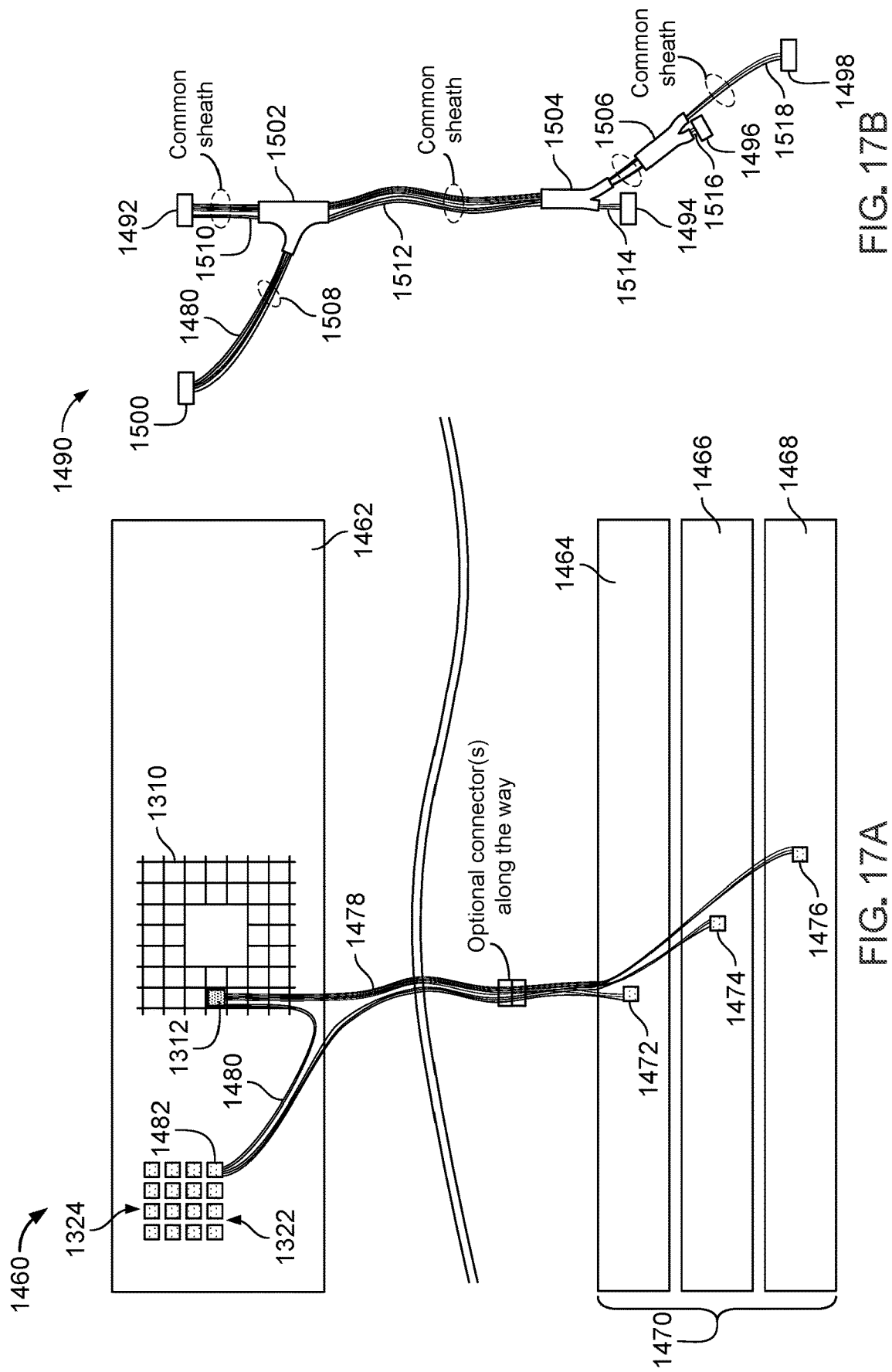

OPTICAL FIBER CABLE AND RACEWAY THEREFOR

CROSS-REFERENCE TO RELATED APPLICATIONS

This application is a national stage application of international application PCT/US2021/022730, filed Mar. 17, 2021, which claims priority to U.S. patent application Ser. No. 16/822,103, filed on Mar. 18, 2020, and U.S. provisional patent application 63/145,368, filed on Feb. 3, 2021. The entire contents of the above applications are incorporated by reference.

BACKGROUND

Field

Various example embodiments relate to optical communication equipment and, more specifically but not exclusively, to fiber-optic cables.

Description of the Related Art

This section introduces aspects that may help facilitate a better understanding of the disclosure. Accordingly, the statements of this section are to be read in this light and are not to be understood as admissions about what is in the prior art or what is not in the prior art.

As the input/output (I/O) capacities of electronic processing chips increase, electrical signals may not provide sufficient I/O capacity across the limited size of a practically viable electronic chip package. A feasible alternative may be to interconnect electronic chip packages using optical signals, which can typically be delivered with a much higher I/O capacity per unit area compared to electrical I/Os.

SUMMARY OF THE INVENTION

Disclosed herein are various embodiments of (i) a fiber-optic cable having a cable sheath that enables significant changes in the cable's cross-sectional shape when the cable is bent and (ii) a raceway that can be used to deploy such a fiber-optic cable.

According to an example embodiment, provided is a fiber-optic cable comprising a cable segment that has a plurality of optical fibers laterally encased by a cable sheath; and the cable segment is constructed to permit relative lateral movement of at least some of the optical fibers within the cable sheath to change a cross-sectional shape of the cable segment.

In some embodiments of the above fiber-optic cable, the cable segment is configured to change the cross-sectional shape in response to being bent.

In some embodiments of any of the above fiber-optic cables, in a bent portion of the cable segment, a pair of the optical fibers is laterally separated by a larger distance than any two of the optical fibers in a straight portion of the cable segment.

In some embodiments of any of the above fiber-optic cables, in a bent portion of the cable segment, a pair of the optical fibers is laterally separated by a larger distance than any two points in an orthogonal cross-section of a straight portion of the cable segment.

In some embodiments of any of the above fiber-optic cables, the cable sheath comprises a layer of a laterally flexible material.

In some embodiments of any of the above fiber-optic cables, the cable sheath comprises a layer of a laterally stretchable material.

In some embodiments of any of the above fiber-optic cables, the plurality of optical fibers comprises at least 100 optical fibers.

In some embodiments of any of the above fiber-optic cables, the plurality of optical fibers comprises at least 1000 optical fibers.

In some embodiments of any of the above fiber-optic cables, the cable segment further comprises one or more strength members.

In some embodiments of any of the above fiber-optic cables, the cable segment is constructed to permit lateral movement of at least some of the optical fibers with respect to the one or more strength members.

In some embodiments of any of the above fiber-optic cables, at least some of the strength members are distributed throughout an interior of the cable.

In some embodiments of any of the above fiber-optic cables, at least some of the strength members are more concentrated near a center of the cable.

In some embodiments of any of the above fiber-optic cables, at least some of the strength members are attached to an inner surface of the cable sheath.

In some embodiments of any of the above fiber-optic cables, at least some of the strength members are embedded within the cable sheath.

In some embodiments of any of the above fiber-optic cables, at least some of the strength members are attached to an outer surface of the cable sheath.

According to another example embodiment, provided is an apparatus comprising a raceway having a hollow cable conduit, the hollow cable conduit having a curved portion and a straight portion connected to the curved portion, the curved portion of the hollow cable conduit having a larger cross-sectional size measured orthogonally to a main plane of the raceway than a corresponding cross-sectional size of the straight portion of the hollow cable conduit.

In some embodiments of the above apparatus, the raceway has a substantially constant height along the curved and straight portions, said height being measured orthogonally to the main plain.

In some embodiments of any of the above apparatus, the raceway has a larger height along the curved portion than along the straight portion, said height being measured orthogonally to the main plain.

In some embodiments of any of the above apparatus, the apparatus further comprises a fiber-optic cable laid in the hollow cable conduit of the raceway.

In some embodiments of any of the above apparatus, the fiber-optic cable comprises a cable segment that has a plurality of optical fibers laterally encased by a cable sheath; and the cable segment is constructed to permit relative lateral movement of at least some of the optical fibers within the cable sheath to change a cross-sectional shape of the cable segment.

In a general aspect, a fiber-optic cable including a cable segment that has a plurality of optical fibers laterally encased by a cable sheath is provided. The plurality of optical fibers are permitted to move laterally relative to one another to become relatively spatially rearranged from a first cross-section of the cable segment to a second cross-section of the cable segment. The cable sheath includes a laterally stretchable material that permits a cross-sectional shape of the cable segment to change in response to movement of the optical fibers within the cable sheath.

BRIEF DESCRIPTION OF THE DRAWINGS

Other aspects, features, and benefits of various disclosed embodiments will become more fully apparent, by way of example, from the following detailed description and the accompanying drawings, in which:

FIGS. 7A-7C schematically show a section of a raceway that can be used in the optical communication system of FIG. 1 according to another embodiment.

FIG. 8 is a diagram an optical communications system.

FIGS. 9 and 10 are diagrams of co-packaged optical interconnect modules.

FIG. 17A is a diagram of an example of an optical communication system.

FIG. 17B is a diagram of an example of an optical cable assembly.

DETAILED DESCRIPTION

Emerging optical interconnects aim to co-package and even co-integrate optical transponders and electronic processing chips, which necessitates transponder solutions that consume relatively low power and that are sufficiently robust against significant temperature variations often present within an electronic processing chip package. Of significant interest are massively spatially parallel optical interconnect solutions that multiplex information signals onto relatively few wavelengths and use a relatively large number of parallel spatial paths for chip-to-chip interconnection. Although some optical cables carrying as many as 3456 strands of optical telecommunication fiber are commercially available, their relatively large cross-section, relative bend-inflexibility, and relatively high weight may make such optical cables unfavorable or even unusable for chip-to-chip interconnection applications.

Figure 1:
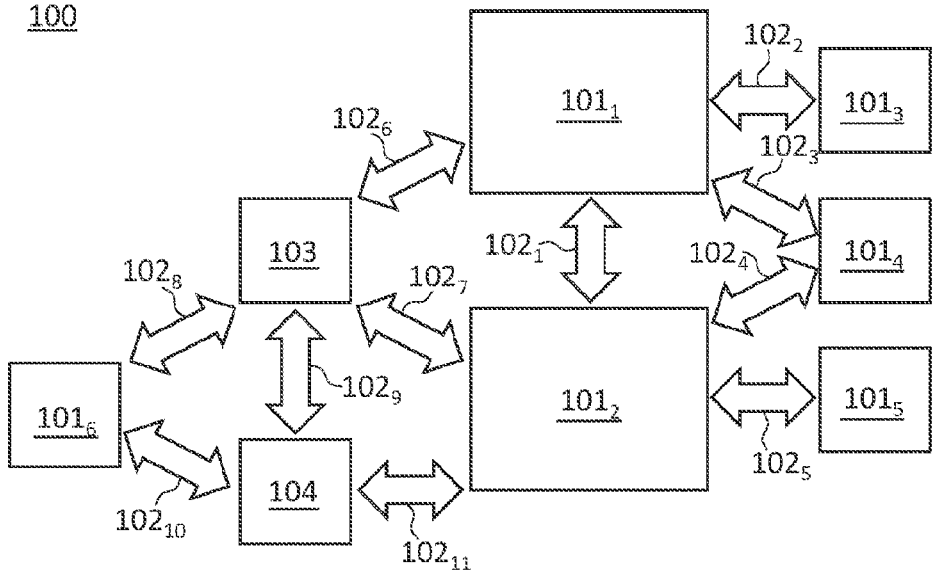
FIG. 1 shows a block diagram of an optical communication system in which at least some embodiments can be practiced.

FIG. 1 shows a block diagram of a communication system 100 in which at least some embodiments can be practiced. As shown, system 100 comprises integrated optical communication devices $101_1$-$101_6$ suitably interconnected by optical fiber cables $102_1$-$102_{11}$ establishing communication paths between the communication devices. Communication system 100 can also comprise one or more external optical power supply modules 103 producing continuous-wave (CW) light or producing one or more trains of periodic or non-periodic optical pulses for use in one or more of the integrated optical communication devices $101_1$-$101_6$. Some end-to-end communication paths can pass through external optical power supply modules 103 (e.g., see the communication path between devices $101_2$ and $101_6$). For example, the communication path between devices $101_2$ and $101_6$ can be jointly established by optical fiber cables $102_7$ and $102_8$, whereby light from external optical power supply 103 is multiplexed onto optical fiber cables $102_7$ and $102_8$. Some end-to-end communication paths can pass through a multiplexing unit 104 (e.g., see the communication path between devices $101_2$ and $101_6$). For example, the communication path between devices $101_2$ and $101_6$ can be jointly established by optical fiber cables $102_{10}$ and $102_{11}$, whereby light from external optical power supply 103 can be multiplexed within multiplexing unit 104 onto optical fiber cables $102_{10}$ and $102_{11}$.

Figure 2A:
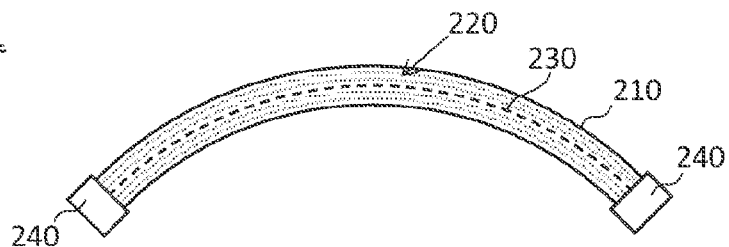
FIGS. 2A-2C illustrate certain features of an optical fiber cable that can be used in the optical communication system of FIG. 1 according to an embodiment.
Figure 2B:
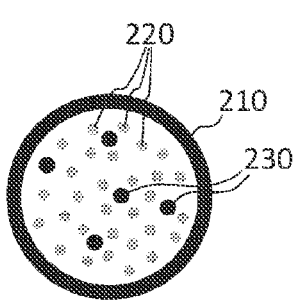
Figure 2C:
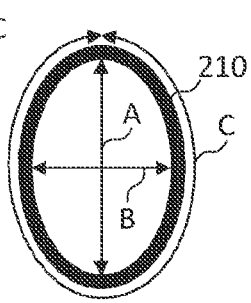

FIGS. 2A-2C illustrate certain features of optical fiber cable 102 that can be used in system 100 (FIG. 1) according to some embodiments. More specifically, FIG. 2A shows an example longitudinal-section 201 of optical fiber cable 102 according to some embodiments. FIG. 2B shows an example cross-section 202 of optical fiber cable 102 according to some embodiments. FIG. 2C shows an example cross-section 203 of a cable sheath 210 of optical fiber cable 102 according to some embodiments. The shown longitudinal-section 201 and cross-sections 202 and 203 may or may not correspond to the same optical fiber cable 102.

As shown in FIGS. 2A and 2B, each of optical fiber cables 102 comprise a respective sheath 210, a respective plurality of optical fiber strands 220 (shown in dotted gray in FIG. 2A), and respective one or more strength members 230 (shown in dashed black in FIG. 2A). Individual cables 102 can be terminated by connectors 240 that are designed to make the connection thereof to system elements 101, 103, and/or 104 relatively effortless and/or straightforward. In various embodiments, fiber strands 220 can be loosely contained within sheath 210, can be arranged in ribbons, or can be compartmentalized into tubes or sectors. In some embodiments, individual fiber strands 220 can be coated by a relatively thin layer of soft plastic (e.g., up to the cross-sectional diameter of about 250 micrometers) and optionally additionally be coated by a thicker layer of harder plastic (e.g., up to the cross-sectional diameter of about 900 micrometers).

In various embodiments, strength members 230 can be variously arranged, e.g., in the middle of cable 102, near sheath 210, embedded within sheath 210, and/or distributed throughout the cable cross-section. FIG. 2B shows a non-limiting example of the latter distribution. Example materials from which strength members 230 can be made include but are not limited to steel, fiberglass, and aramid yarn. In some embodiments, some strength members 230 can be attached to sheath 210 and/or to the cable end points at the housing of connector(s) 240. Sheath 210 can be designed to approximately maintain a certain cross-sectional shape, such as a substantially circular cross-sectional shape, across the cable's length (e.g., see FIG. 2B), even if the cable is bent or curved to create segments having a minimum recommended bend radius. For some cables 102, tighter-than-recommended bending may result in kinking and/or buckling of sheath 210 or irreversible damage inside the cable, e.g., when the tensile strain (at the outer side of the bend) or the compressive stress (at the inner side of the bend) exceeds the elastic-deformation limits of some of the materials making up the cable. Kinking, buckling, or breaking may, inter alia, result in damaged optical fiber strands 220.

Some cable features directed at the prevention of the cable 102 kinking, buckling, and/or breaking can include: (i) hard-to-bend sheaths, such as sheaths made of stiff materials; (ii) relatively thick sheaths; (iii) braided sheaths; (iv) spiral wraps; (v) mono-coil sheaths; and (vi) bend-restricting sheaths, such as the interlocking hose designs and interlocking vertebrae bend restrictors.

A typical recommended bend radius for conventional optical cables can be approximately 10 times the outer cable diameter. Conventional, commercially available cables for carrying one thousand or more fiber strands can have outer cable diameters on the order of one inch, which corresponds to a recommended minimum bend radius on the order of inches. The latter cable characteristic can make some conventional cables unsuitable for some compact applications, such as those corresponding to some embodiments of system 100 (FIG. 1).

These and possibly other related problems in the state of the art can be addressed using at least some embodiments of cables 102, in which sheaths 210 are constructed to be laterally flexible and/or laterally stretchable, e.g., as explained in more detail below, in reference to FIGS. 2C and 3A-3C. Such laterally flexible/stretchable sheaths 210 can be very different from and should be contrasted with typical conventional sheaths, e.g., used in outdoor cabling environments. For example, some embodiments of cables 102 disclosed herein can advantageously afford bend radii that are very close to the bend radii afforded by individual optical fiber strands 220 used therein. Such tight bend radii may not be achievable with conventional sheaths, e.g., because the latter can force the corresponding cable to maintain a substantially fixed cross-sectional shape throughout its entire length, including the bent segments of the cable. In contrast, some embodiments of laterally flexible/stretchable sheaths 210 can allow for significant changes of the cross-sectional shape of cable 102 when the latter is bent or otherwise deformed to fit into a restricted and/or confined geometry of the available cable conduit, thereby providing a capability to achieve tighter cable turns than the above-mentioned conventional cables without inflicting any internal damage onto the cable.

As shown in FIG. 2C, one can define a circumference C, a longest cross-sectional dimension A, and a shortest cross-sectional dimension B of sheath 210. While these quantities are shown for an example elliptical cross-section, they can be defined on any geometrical shape representing the cross-section of fiber-optic cable 102. According to some embodiments, one or more of the three geometric parameters A, B, and C associated with fiber-optic cable 102 can change when the cable is bent. We refer to the three geometric parameters of a straight section of cable as $A_0$, $B_0$, and $C_0$, respectively. In some embodiments, the cross-section of an unperturbed, straight section of cable can be essentially circular, in which case $A_0 \approx B_0$ and $C_0 \approx \pi A_0$. In some embodiments, the cross-section of an unperturbed, straight section of cable can be essentially square, in which case $A_0 \approx B_0$ and $C_0 \approx 4A_0$. In some embodiments, the cross-section of an unperturbed, straight section of cable can be essentially elliptical, in which case $C_0 \approx \pi([A_0^2+B_0^2]/2)^{1/2}$.

When fiber-optic cable 102 is being bent, e.g., to accommodate a 90-degree turn, laterally flexible/stretchable sheath 210 can change its cross-sectional shape from, e.g., circular (FIG. 2B) to, e.g., elliptical (FIG. 2C). In some embodiments, such a shape change can be nearly permanent and/or at least partially irreversible (e.g., if laterally flexible/stretchable sheath 210 is made from a plastically deformable or malleable material) or substantially reversible (e.g., if laterally flexible/stretchable sheath 210 is made from a deformable material whose elastic limit is not exceeded when the cable is bent). When laterally flexible/stretchable sheath 210 is made from an elastically deformable material, laterally flexible/stretchable sheath 210 can substantially return to its original shape once fiber-optic cable 102 is straightened out after having been bent.

As used herein, the term "laterally flexible" refers to a cable sheath that can maintain a substantially constant cable circumference while allowing the cross-sectional shape of the cable to change in a significant way. For example, in some embodiments, it may be possible to change the circumference of a laterally flexible cable sheath 210 in a bent cable section without damage to optical fiber strands 220 by no more than 10% relative to the circumference $C_0$, i.e., $0.9 C_0 \leq C \leq 1.1 C_0$. At the same time, it may also be possible in such embodiments to change one or both of the dimensions A and B of a laterally flexible cable sheath 210 in a bent cable section without damage to optical fiber strands 220 by more than 20% relative to the dimensions $A_0$ and $B_0$, i.e., in accordance with one or more of the inequalities: $A<0.8A_0$, $A>1.2A_0$, $B<0.8B_0$, and $B>1.2B_0$.

As used herein, the term "laterally stretchable" refers to a cable sheath 210 that can expand and/or contract the cable circumference without damage to optical fiber strands 220, e.g., by more than 10% when subjected to bending strain and/or stress, i.e., $C<0.9C_0$ or $C>1.1C_0$. In some embodiments, a laterally stretchable sheath 210 can allow the overall cross-sectional shape to be approximately maintained while the area of the cross-section expands or contracts during the cable bending without damage to optical fiber strands 220. For example, a generally oval or circular cross-sectional shape can be maintained along the length of the cable while the area of the corresponding cross-sectional oval or circle changes along said length. In some other embodiments, a laterally stretchable sheath can allow the cross-sectional shape of the cable to change in a significant way during bending without damage to optical fiber strands 220. For example, it may be possible to change one or both of the dimensions A and B of a laterally stretchable sheath 210 in a bent cable section without damage to optical fiber strands 220 by more than 20% relative to the dimensions $A_0$ and $B_0$, i.e., in accordance with one or more of the inequalities: $A<0.8A_0$, $A>1.2A_0$, $B<0.8B_0$, and/or $B>1.2B_0$.

In some embodiments, a laterally flexible/stretchable sheath 210 can comprise a relatively thin layer of a suitable elastic material, with the thickness thereof being selected such that: (i) said layer is thick enough to provide sufficient sheath strength for holding the optical fiber strands 220 and strength members 230 appropriately laterally confined and restrained under the sheath; and (ii) said layer is still thin enough to provide sufficient effective elasticity and/or plasticity for changing the cable's cross-sectional shape and/or area along the length of the cable. Example materials that can be used for this purpose include, but are not limited to: (i) various natural and artificial fabrics; (ii) plastic and metal foils; (iii) cellulose and its derivatives; (iv) rubber; (v) neoprene; (vi) latex; (vi) lycra; (vii) elastane; and (viii) spandex.

Figure 3A:
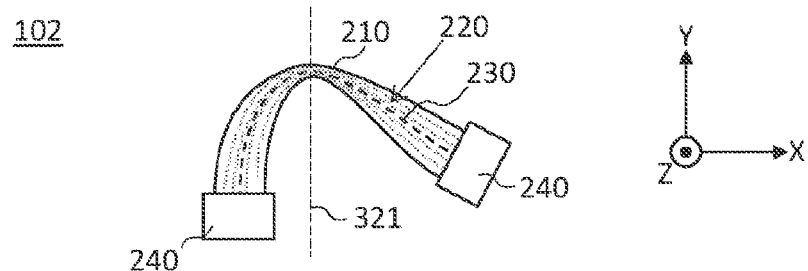
FIGS. 3A-3C pictorially illustrate an optical fiber cable that can be used in the optical communication system of FIG. 1 according to another embodiment.
Figure 3B:
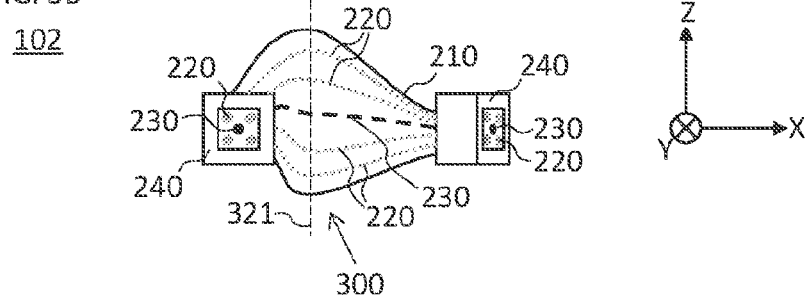
Figure 3C:
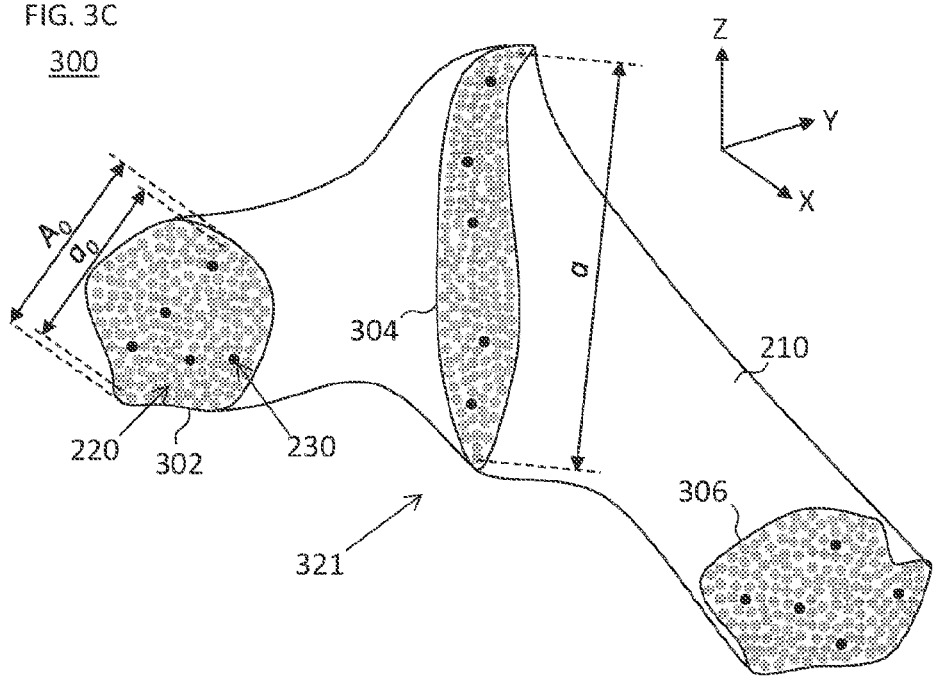

FIGS. 3A-3C pictorially illustrate optical fiber cable 102 that can be used in system 100 (FIG. 1) according to another embodiment. More specifically, FIG. 3A shows a top view of cable 102. FIG. 3B shows a side view of the same cable 102. FIG. 3C shows a three-dimensional (3D) perspective cutout view of a middle segment 300 of said same cable 102. The XYZ-coordinate triads shown in FIGS. 3A-3C indicate the relative orientations of the shown views.

Referring to FIG. 3A, optical fiber cable 102 is shown therein in a configuration that has a sharp (e.g., approximately 90-degree) bend near plane 321. Individual fiber strands 220 are such that each of them can accommodate such a bend without cracking or breaking.

Referring to FIG. 3B, the sheath 210 of the shown cable 102 is laterally flexible and/or stretchable as explained above. This characteristic enables cable 102 to change its cross-sectional shape along its length. For example, FIG. 3B clearly shows that the vertical size (i.e., the size measured along the Z-coordinate axis) of cable 102 is larger in a middle segment 300 thereof than in the end segments thereof immediately adjacent to connectors 240.

FIG. 3C schematically shows the middle segment 300 in more detail. In particular, FIG. 3C schematically shows three cross-sections of the middle segment 300, which cross-sections are labeled 302, 304, and 306, respectively. Cross-section 306 corresponds to plane 321 (also see FIGS. 3A-3B). Cross-sections 302 and 306 correspond to the respective planes that are locally orthogonal to the (bent) longitudinal axis of cable 102 and located closer to the opposite ends thereof (e.g., near respective connectors 240).

Cross-section 302 has an approximately pentagonal shape, with rounded corners. Cross-section 304 has an approximately oval shape characterized by a relatively large aspect ratio (e.g., >4). Cross-section 306 has an irregular non-convex shape. A person of ordinary skill in the art will understand that the shown shapes represent non-limiting examples and that many other cross-sectional shapes are possible. Visual inspection of the shown example cross-sectional shapes 302, 304, and 306 reveals that fiber strands 220 and strength members 230 can be relatively spatially rearranged from one cross-section to the next, e.g., to spread out laterally within sheath 210 more in some segments than in other segments. The latter property enables, inter alia, the sharp cable bend near plane 321.

During bending, at least some of the optical fiber strands 220 contained within the flexible/stretchable sheath 210 may be subject to relative lateral movement, whereby the relative positions between at least some of optical fiber strands 220 may change in a bent section of the cable compared to a straight section thereof. In one example embodiment, the largest distance between two optical fiber strands contained within the sheath in a bent section of the cable (a in FIG. 3C) can become larger than the largest distance between two optical fiber strands contained within the sheath in an unperturbed, straight section of the cable ($a_0$ in FIG. 3C), i.e., $a>a_0$. In some embodiments, the largest distance between two optical fiber strands contained within the sheath in a bent section of the cable (a in FIG. 3C) can become larger than the largest dimension of the cross-sectional area of the sheath in an unperturbed, straight section of cable ($A_0$ in FIG. 3C), i.e., $a>A_0$.

FIGS. 4A-4F schematically show cross-section 302 (FIG. 3C) according to some embodiments. More specifically, FIGS. 4A-4F provide some examples of how strength members 230 can be placed and/or distributed in cable 102.

Figure 4A:
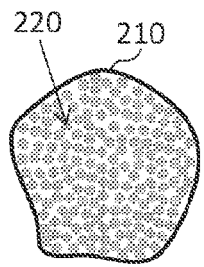
FIGS. 4A-4F schematically show example cross-sections of the optical fiber cable of FIG. 3 according to some embodiments.

FIG. 4A illustrates an embodiment in which no dedicated strength members 230 are being used. In this particular embodiment, the plurality of fiber strands 220 themselves also act as strength elements of the cable. In some embodiments, sheath 210 can have some axial strength that contributes to the overall axial strength of cable 102.

Figure 4B:
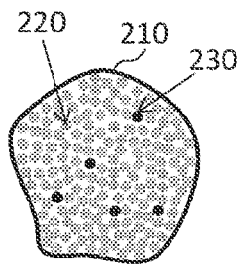

FIG. 4B illustrates an embodiment in which strength members 230 are relatively widely distributed (e.g., approximately uniformly or non-uniformly) throughout the interior of cable 102 within sheath 210. Strength members 230 can be redistributed within sheath 210, e.g., as indicated in FIG. 3C, when cable 102 is bent.

Figure 4C:
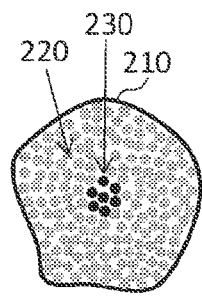

FIG. 4C illustrates an embodiment in which multiple strength members 230 are located near the cross-sectional center of cable 102. Such multiple strength members may or may not be connected to form a structural bundle.

Figure 4D:
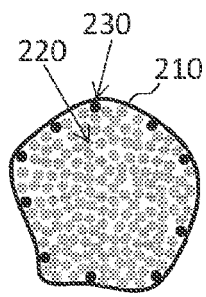

FIG. 4D illustrates an embodiment in which strength members 230 are located near the inner surface of sheath 210. In some embodiments, one or more such strength members 230 can be attached (e.g., glued) to the inner surface of sheath 210.

Figure 4E:
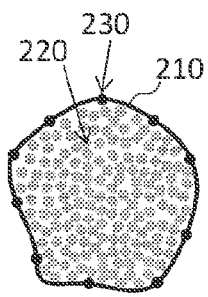

FIG. 4E illustrates an embodiment in which strength members 230 are embedded into sheath 210. In one possible embodiment, strength members 230 can be woven into a laterally flexible/stretchable fabric used in sheath 210. Alternatively or in addition, strength members 230 can be sandwiched between different thin layers of flexible/stretchable material used in sheath 210.

Figure 4F:
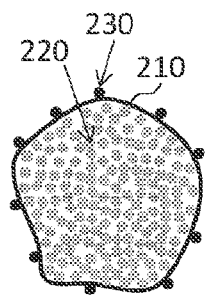

FIG. 4F illustrates an embodiment in which strength members 230 are positioned at the outer surface of sheath 210. In some embodiments, one or more such strength members 230 can be attached (e.g., glued) to sheath 210.

Alternatively or in addition, in any of the above embodiments, strength members 230 can be attached to the housing(s) of connector(s) 240 at the opposite ends of cable 102, or can be fed through sheath 210 to the outside of the cable, e.g., to make the strength members directly accessible during cable pulling.

Figure 5A:
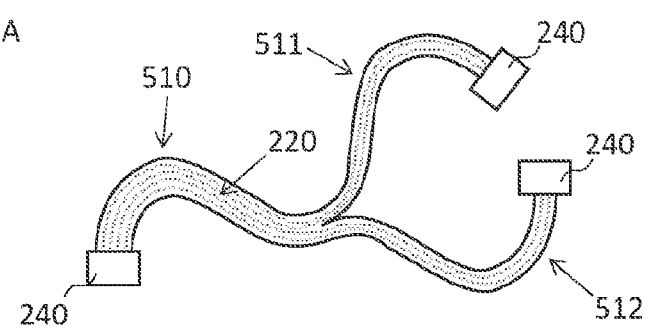
FIGS. 5A-5B schematically show example branching optical fiber cables that can be used in the optical communication system of FIG. 1 according to some embodiments.
Figure 5B:
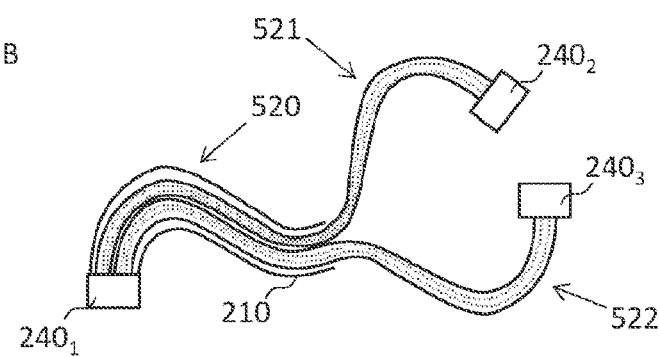

FIGS. 5A-5B schematically show some alternative embodiments of cable 102. More specifically, in such embodiments, cable 102 can comprise more than one connector 240 at one end or both ends thereof.

FIG. 5A illustrates an embodiment in which a sheathed trunk 510 splits into sheathed branches 511 and 512, each having a respective subset of optical fiber strands 220 of the trunk 510. At least one of trunk 510 and branches 511 and 512 includes sheath 210. The remainder can have sheaths that may or may not be laterally flexible or stretchable. In some embodiments, the sheaths of trunk 510 and branches 511 and 512 can comprise the same material. In some embodiments, the sheaths of trunk 510 and branches 511 and 512 can comprise different respective materials.

FIG. 5B illustrates an embodiment in which cable 102 comprises cables 521 and 522 and connectors $240_1$, $240_2$, and $240_3$. Cables 521 and 522 share connector $240_1$ and have connectors $240_2$ and $240_3$, respectively, at the other cable end. Near connector $240_1$, cables 521 and 522 are arranged in a trunk 520 that has laterally flexible or stretchable sheath 210 at an outer surface thereof. The sheath 210 of trunk 520 encloses the corresponding segments of cables 521 and 522, each carrying a respective subset of optical fibers 220. In some embodiments, the sheath 210 of trunk 520 can enclose more than two cables similar to cables 521 and 522.

Cables 521 and 522 can have respective sheaths that may or may not be laterally flexible or stretchable. Embodiments with any number of connectors 240 on either end of cable 102 and with at least one laterally flexible or stretchable sheath 210 are also contemplated. In view of this disclosure, a person of ordinary skill in the art will be able to make and use such embodiments without any undue experimentation. Although strength members 230 are not explicitly shown in FIGS. 5A-5B, such strength members can be incorporated into the corresponding cables 102, e.g., in accordance with any of FIGS. 4B-4F.

Referring back to FIG. 1, in some embodiments, at least some cables 102 in system 100 can be deployed using one or more cable raceways. In cable-management arts, a raceway (also sometimes referred to as a raceway system) is a rigid enclosed or semi-enclosed channel or conduit that protects, routes, and/or hides cables and wires. Raceways can protect wires and cables from heat, humidity, corrosion, water intrusion, and other physical threats. A well-grounded metallic raceway can also provide radio frequency (RF) shielding that reduces electromagnetic interference (EMI). A plastic raceway can be used, e.g., when EMI is not relevant. For example, cables 102 can be deployed using metallic or plastic raceways.

Figure 6A:
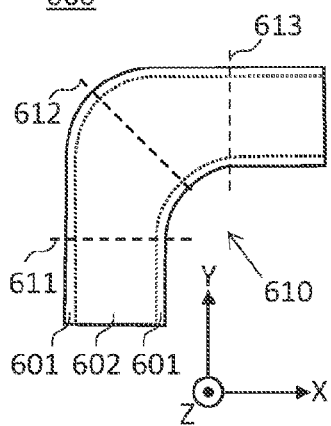
FIGS. 6A-6E schematically show a raceway that can be used in the optical communication system of FIG. 1 according to an embodiment.
Figure 6B:
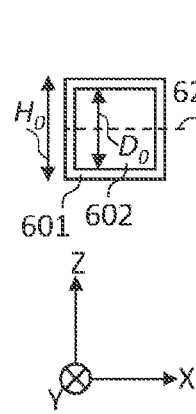
Figure 6C:
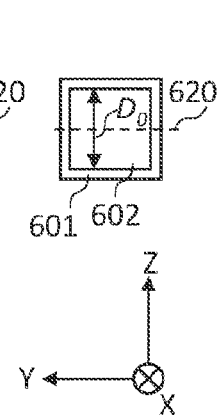
Figure 6D:
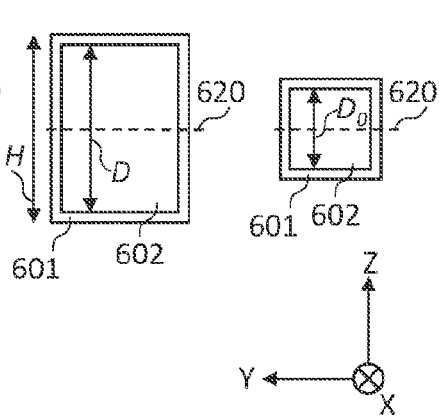
Figure 6E:
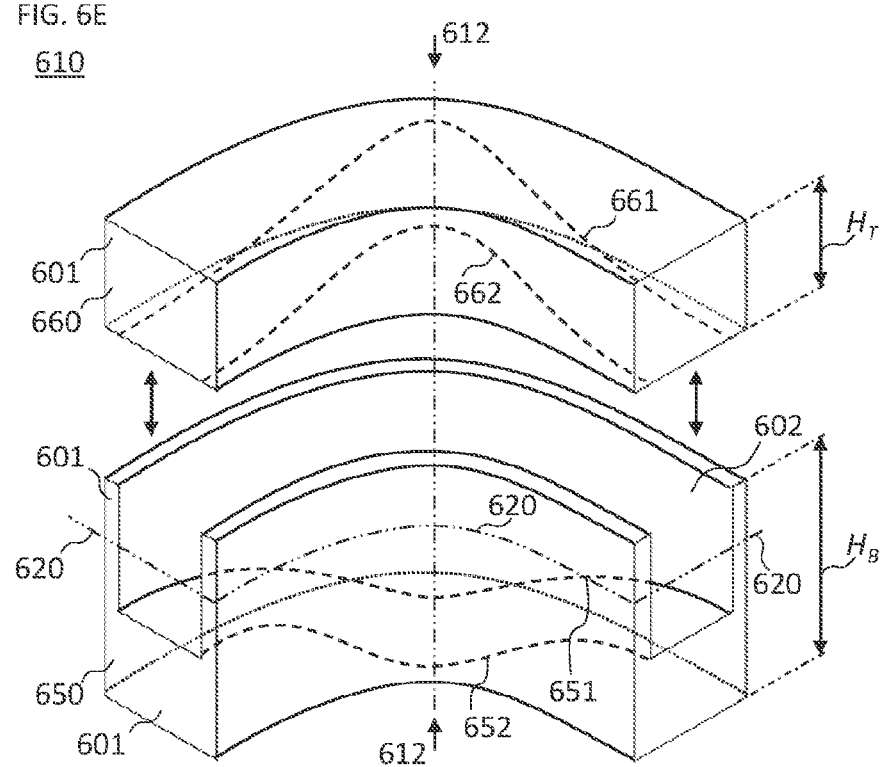

FIGS. 6A-6E schematically show a section of a raceway 600 that can be used to deploy one or more cables 102 in system 100 according to an embodiment. More specifically, FIG. 6A shows a top view of a section of raceway 600. FIGS. 6B-6D show three cross-sectional views of a section of raceway 600 at positions 611, 612, and 613 indicated in FIG. 6A. FIG. 6E pictorially shows a curved middle portion 610 of a section of raceway 600 in more detail (also see FIG. 6A). The XYZ-coordinate triads shown in FIGS. 6A, 6B, and 6D indicate the relative orientations of the shown views.

Referring to FIGS. 6A-6D, a section of raceway 600 comprises walls 601 forming an inner opening 602 as a hollow conduit for one or more fiber-optic cables 102. Within a section of raceway 600, the hollow conduit proceeds substantially along a main plane 620 of that section. One or more cables 102 can be deployed substantially along the main plane 620 of that raceway section. As used herein, the term "main plane" refers to a plane drawn approximately through the geometrical centroids of the inner opening's local cross-sections of raceway 600. In some embodiments, the main plain can be parallel to the surface of the floor on which raceway 600 is laid down.

In an example embodiment, one or more of the cross-sectional dimensions of the inner opening 602 of raceway 600 can change within the curved middle portion 610 of raceway 600, e.g., as indicated in FIGS. 6B-6D.

In one possible embodiment, the largest cross-sectional dimension (D in FIG. 6C) of the inner opening 602 in the curved middle portion 610 of raceway 600 (e.g., at position 612), measured in the direction orthogonal to the main plane 620 can be larger than the largest cross-sectional dimension ($D_0$ in FIGS. 6B and 6D) of the inner opening 602 in a straight portion (e.g., at positions 611 and 613) of raceway 600, measured in the direction orthogonal to the main plane, i.e., $D > D_0$. This feature enables raceway 600 to accommodate the lateral expansion of cable 102 at a bend, e.g., such as the lateral expansion near plane 321 illustrated in FIGS. 3B-3C. In the example embodiment illustrated by FIGS. 6B-6D, the inner opening 602 of raceway 600 is shaped to expand up and down with respect to the main plane 620 (also see FIG. 6E).

FIG. 6E pictorially illustrates example three-dimensional geometry of the inner opening 602 of raceway 600 within curved middle portion 610. As shown in FIG. 6E, raceway 600 comprises a bottom part 650 and a top part 660 that can be joined together as indicated by the double-headed arrows to form walls 601 and inner opening 602. The dashed lines 651, 652, 661, and 662 indicate the inner edges of the inner opening 602. The curvature of the inner edges 651, 652, 661, and 662 is such that the cross-sectional dimension changes indicated in FIGS. 6B-6D are realized.

In some embodiments, inner opening 602 of raceway 600 can be completely surrounded by walls 601. In some other embodiments, inner opening 602 of raceway 600 may only be partially surrounded by walls 601, e.g., the hollow conduit may not have a top wall.

FIGS. 7A-7C schematically show a section of raceway 600 that can be used to deploy one or more cables 102 in system 100 according to another embodiment. More specifically, FIGS. 7A-7C show three cross-sectional views of a section of raceway 600 at positions 611, 612, and 613 indicated in FIG. 6A. The XYZ-coordinate triads shown in FIGS. 7A and 7C indicate the relative orientations of the shown views. In this particular embodiment, at position 612, the inner opening 602 expands asymmetrically above and below the main plane 620 corresponding to positions 611 and 613. For example, there is a larger expansion above said main plane 620 than below said main plane, e.g., as indicated in FIG. 7B.

In some embodiments, the external height of raceway 600 can change between a value $H_0$ for a straight section and a value $H > H_0$ for a curved section, as visualized in FIGS. 6B-6D. In some other embodiments, the external height of raceway 600 can have a substantially constant value $H_C$ for both a straight section and a curved section, as visualized in FIGS. 7A-7C. In some embodiments, the external height of raceway 600 can be the sum of the height of a bottom part $H_B$ and the height of a top part $H_T$, as visualized in FIG. 6E.

According to an example embodiment disclosed above, e.g., in the summary section and/or in reference to any one or any combination of some or all of FIGS. 1-7, provided is a fiber-optic cable (e.g., 102, FIG. 1) comprising a cable segment (e.g., 300, FIGS. 3B-3C; 520, FIG. 5B) that has a plurality of optical fibers (e.g., 220, FIG. 2, 3, 4, or 5) laterally encased by a cable sheath (e.g., 210, FIG. 2, 3, 4, or 5); and the cable segment is constructed to permit relative lateral movement of at least some of the optical fibers within the cable sheath (e.g., as illustrated by comparison of 302, 304, 306, FIG. 3C) to change a cross-sectional shape of the cable segment.

The fiber optic cables described above (e.g., 102 of FIGS. 2A to 5B) can be used in various systems, such as the communication system 100 of FIG. 1. For example, the fiber optic cables can transmit data and control signals, as well as optical power supply light that can be used as light sources for modulators in photonic integrated circuits.

FIGS. 8 to 11 show examples of optical communications systems 800 and 1100 in which in each system an optical power supply or photon supply provides optical power supply light to photonic integrated circuits hosted in multiple communication devices (e.g., optical transponders), and the optical power supply is external to the communication devices. The optical power supply can have its own housing, electrical power supply, and control circuitry, independent of the housings, electrical power supplies, and control circuitry of the communication devices. This allows the optical power supply to be serviced, repaired, or replaced independent of the communication devices. Redundant optical power supplies can be provided so that a defective external optical power supply can be repaired or replaced without taking the communication devices off-line. The external optical power supply can be placed at a convenient centralized location with a dedicated temperature environment (as opposed to being crammed inside the communication devices, which may have a high temperature). The external optical power supply can be built more efficiently than individual power supply units, as certain common parts such as monitoring circuitry and thermal control units can be amortized over many more communication devices. The following describes implementations of the fiber cabling for remote optical power supplies. Additional information about the fiber cabling for remote optical power supplies is provided in U.S. provisional patent application 63/145,368, filed on Feb. 3, 2021 (referred to as "the '368 application"), the entire contents of which are incorporated by reference.

FIG. 8 shows an optical communications system 800 providing high-speed communications between a first chip 802 and a second chip 804 using co-packaged optical interconnect modules 806, 807, respectively, that include photonic integrated circuits. Each of the first and second chips 802 and 804 can be a high-capacity chip, e.g., a high bandwidth Ethernet switch chip. The first and second chips 802 and 804 communicate with each other through an optical fiber interconnection cable 808 that includes a plurality of optical fibers. In some implementations, the optical fiber interconnection cable 808 can be implemented using one or more of the optical fiber cables 102 described above (e.g., see FIGS. 2A to 5A). In the example of FIG. 8, the optical fiber interconnection cable 808 includes optical fiber cores that transmit data and control signals between the first and second chips 802, 804. The optical fiber interconnection cable 808 also includes one or more optical fiber cores that transmit optical power supply light from an optical power supply or photon supply to photonic integrated circuits that provide optoelectronic interfaces for the first and second chips 802, 804. The optical fiber interconnection cable 808 can include single-core fibers or multi-core fibers. Each single-core fiber includes a cladding and a core, typically made from glasses of different refractive indices such that the refractive index of the cladding is lower than the refractive index of the core to establish a dielectric optical waveguide. Each multi-core optical fiber includes a cladding and multiple cores, typically made from glasses of different refractive indices such that the refractive index of the cladding is lower than the refractive index of the core. More complex refractive index profiles, such as index trenches, multi-index profiles, or gradually changing refractive index profiles can also be used. More complex geometric structures such as non-circular cores or claddings, photonic crystal structures, photonic bandgap structures, or nested antiresonant nodeless hollow core structures can also be used.

The example in FIG. 8 illustrates a switch-to-switch use case. An external optical power supply or photon supply 810 provides optical power supply signals, which can be, e.g., continuous-wave light, one or more trains of periodic optical pulses, or one or more trains of non-periodic optical pulses. The power supply light is provided from the photon supply 810 to the photonic integrated circuits through optical fibers 812 and 814, respectively. For example, the optical power supply 810 can provide continuous wave light, or both pulsed light for data modulation and synchronization, as described in U.S. patent application Ser. No. 16/847,705, filed on Apr. 14, 2020 (referred to as "the '705 application"), the entire contents of which are incorporated by reference. This allows the first chip 802 to be synchronized with the second chip 804.

For example, the photon supply 810 can correspond to the optical power supply 103 of FIG. 1. The pulsed light from the photon supply 810 can be provided to the co-packaged optical interconnect modules 806, 807. In some implementations, the photon supply 810 can provide a sequence of optical frame templates, in which each of the optical frame templates includes a respective frame header and a respective frame body, and the frame body includes a respective optical pulse train. The modulators in the co-packaged optical interconnect modules 806, 807 can load data into the respective frame bodies to convert the sequence of optical frame templates into a corresponding sequence of loaded optical frames that are output through optical fiber links. The implementation shown in FIG. 8 uses a packaging solution corresponding to FIG. 9 in which a photonic integrated circuit 900 is directly attached to a serializers/deserializers module 902. FIG. 10 shows another example in which the photonic integrated circuit 900 is directly attached to the serializers/deserializers 902.

The optical fiber cable 808 includes a first optical fiber connector 822 and a second optical fiber connector 832. The first optical fiber connector 822 mates with a corresponding connector optically coupled to the co-packaged optical interconnect module 806, and the second optical fiber connector 832 mates with a corresponding connector optically coupled to the co-packaged optical interconnect module 807. Each of the first optical fiber connector 822 and the second optical fiber connector 832 includes one or more power supply fiber ports, one or more transmitter fiber ports, and one or more receiver fiber ports. One or more optical fibers that includes a plurality of optical fiber cores is optically coupled between the first optical fiber connector 822 and the second optical fiber connector 832 to enable communication between the chips 802 and 804.

Each power supply fiber port of the first optical fiber connector 822 provides optical power supply light to the co-packaged optical interconnect module 806. The co-packaged optical interconnect module 806 transmits output optical signals to the one or more transmitter fiber ports of the optical fiber connector 822, and receives input optical signals from the one or more receiver fiber ports of the optical fiber connector 822. In a similar manner, each power supply fiber port of the second optical fiber connector 832 provides optical power supply light to the co-packaged optical interconnect module 807. The co-packaged optical interconnect module 807 transmits output optical signals to the one or more transmitter fiber ports of the optical fiber connector 832, and receives input optical signals from the one or more receiver fiber ports of the optical fiber connector 832. The optical fiber connectors 822 and 832 can have symmetric properties described below so that the optical fiber connectors 822 and 832 are interchangeable, e.g., the optical fiber connector 832 can be connected to connector associated with the co-packaged optical interconnect module 806, and the optical fiber connector 822 can be connected to connector associated with the co-packaged optical interconnect module 807. Each of the optical fiber connectors 822 and 832 can be invariant against a 180-degree rotation or a 90-degree rotation so that it is more convenient for the user.

One or more portions of the optical fiber cable 808 can have a cable sheath (e.g., similar to the cable sheath 210 of FIGS. 2A to 5B). The optical fiber cable 808 can have strength members (e.g., similar to the strength members 230). In some implementations, the optical fiber cable 808 can include a cable segment constructed to permit relative lateral movement of at least some of the optical fibers within the cable sheath to change a cross-sectional shape of the cable segment. In some implementations, the optical fiber cable 808 can include a cable segment that has a plurality of optical fibers laterally encased by a cable sheath, in which the plurality of optical fibers are permitted to move laterally relative to one another to become relatively spatially rearranged from a first cross-section of the cable segment to a second cross-section of the cable segment, and wherein the cable sheath includes a laterally stretchable material that permits a cross-sectional shape of the cable segment to change in response to movement of the optical fibers within the cable sheath.

Figure 11:
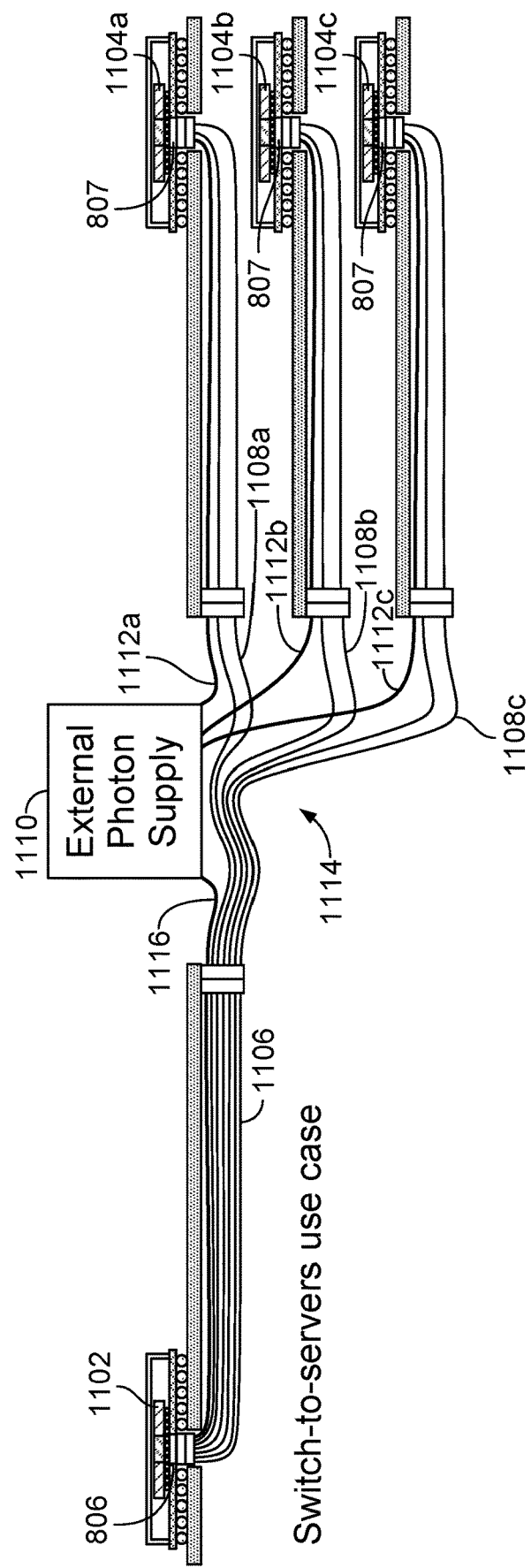
FIG. 11 is a diagram of an example of an optical communications system.

FIG. 11 shows an example of an optical communications system 1100 providing high-speed communications between a high-capacity chip 1102 (e.g., an Ethernet switch chip) and multiple lower-capacity chips 1104a, 1104b, 1104c, e.g., multiple network interface cards (NICs) attached to computer servers using co-packaged optical interconnect modules 806, 807 similar to those shown in FIG. 8. The high-capacity chip 1102 communicates with the lower-capacity chips 1104a, 1104b, 1104c through an optical fiber cable 1114 that includes a high-capacity optical fiber interconnection cable 1106 that later branches out into several lower-capacity optical fiber interconnection cables 1108a, 1108b, 1108c that are connected to the lower-capacity chips 1104a, 1104b, 1104c, respectively. This example illustrates a switch-to-servers use case.

An external optical power supply or photon supply 1110 provides optical power supply signals, which can be continuous-wave light, one or more trains of periodic optical pulses, or one or more trains of non-periodic optical pulses. The power supply light is provided from the photon supply 1110 to the optical interconnect modules 806, 807 through optical fibers 1116, 1112a, 1112b, 1112c, respectively. For example, the optical power supply 1110 can provide both pulsed light for data modulation and synchronization, as described in U.S. patent application Ser. No. 16/847,705. This allows the high-capacity chip 1102 to be synchronized with the lower-capacity chips 1104a, 1104b, and 1104c.

In some implementations, the optical fiber cable 1114 can include a cable segment that has a plurality of optical fibers laterally encased by a cable sheath, in which the cable segment is constructed to permit relative lateral movement of at least some of the optical fibers within the cable sheath to change a cross-sectional shape of the cable segment. In some implementations, the optical fiber cable 1114 can include a cable segment that has a plurality of optical fibers laterally encased by a cable sheath, in which the plurality of optical fibers are permitted to move laterally relative to one another to become relatively spatially rearranged from a first cross-section of the cable segment to a second cross-section of the cable segment, and wherein the cable sheath includes a laterally stretchable material that permits a cross-sectional shape of the cable segment to change in response to movement of the optical fibers within the cable sheath.

Some aspects of the systems 8000 and 11000 are described in more detail in connection with FIGS. 12 to 17C.

Figure 12:
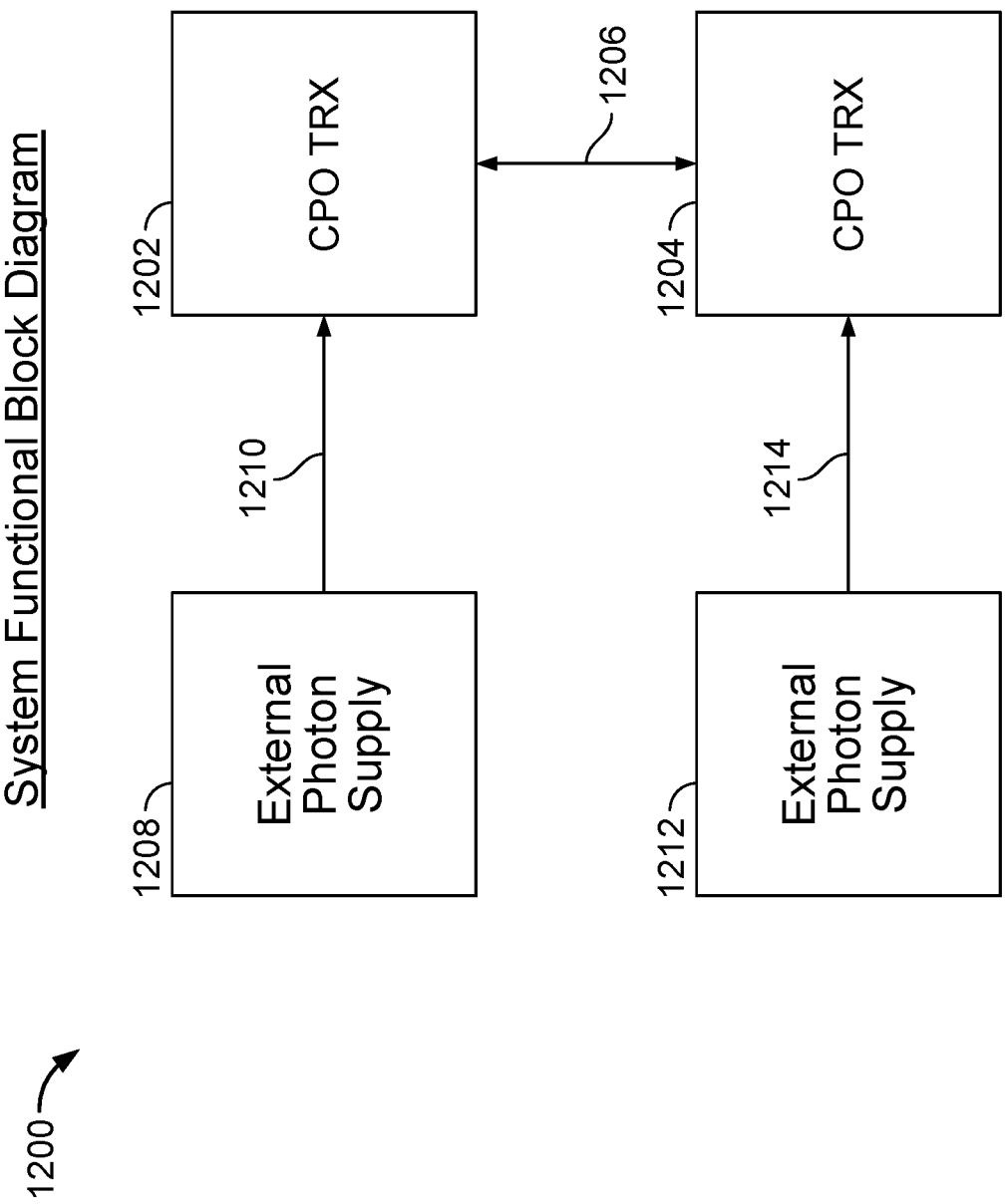
FIG. 12 is a block diagram of an example of an optical communication system.

FIG. 12 is a system functional block diagram of an example of an optical communication system 1200 that includes a first communication transponder 1202 and a second communication transponder 1204. Each of the first and second communication transponders 1202, 1204 can include one or more co-packaged optical modules described above. Each communication transponder can include, e.g., one or more data processors, such as network switches, central processing units, graphics processor units, tensor processing units, digital signal processors, and/or other application specific integrated circuits (ASICs). In this example, the first communication transponder 1202 sends optical signals to, and receives optical signals from, the second communication transponder 1204 through a first optical communication link 1206. The one or more data processors in each communication transponder 1202, 1204 process the data received from the first optical communication link 1206 and outputs processed data to the first optical communication link 1206. The optical communication system 1200 can be expanded to include additional communication transponders. The optical communication system 1200 can also be expanded to include additional communication between two or more external photon supplies, which can coordinate aspects of the supplied light, such as the respectively emitted wavelengths or the relative timing of the respectively emitted optical pulses.

A first external photon supply 1208 provides optical power supply light to the first communication transponder 1202 through a first optical power supply link 12910 and a second external photon supply 1212 provides optical power supply light to the second communication transponder 1204 through a second optical power supply link 1214. In one example embodiment, the first external photon supply 1208 and the second external photon supply 1212 provide continuous wave laser light at the same optical wavelength. In another example embodiment, the first external photon supply 1208 and the second external photon supply 1212 provide continuous wave laser light at different optical wavelengths. In yet another example embodiment, the first external photon supply 1208 provides a first sequence of optical frame templates to the first communication transponder 1202, and the second external photon supply 1212 provides a second sequence of optical frame templates to the second communication transponder 1204. For example, as described in U.S. patent Ser. No. 16/847,705, each of the optical frame templates can include a respective frame header and a respective frame body, and the frame body includes a respective optical pulse train. The first communication transponder 1202 receives the first sequence of optical frame templates from the first external photon supply 1208, loads data into the respective frame bodies to convert the first sequence of optical frame templates into a first sequence of loaded optical frames that are transmitted through the first optical communication link 1206 to the second communication transponder 1204. Similarly, the second communication transponder 1204 receives the second sequence of optical frame templates from the second external photon supply 1212, loads data into the respective frame bodies to convert the second sequence of optical frame templates into a second sequence of loaded optical frames that are transmitted through the first optical communication link 1206 to the first communication transponder 1202.

In some implementations, each of the communication links 1206, 1210, 1214 can include an optical fiber cable that includes a cable segment that has a plurality of optical fibers laterally encased by a cable sheath, in which the cable segment is constructed to permit relative lateral movement of at least some of the optical fibers within the cable sheath to change a cross-sectional shape of the cable segment. In some implementations, each of the communication links 1206, 1210, 1214 can include an optical fiber cable that includes a cable segment that has a plurality of optical fibers laterally encased by a cable sheath, in which the plurality of optical fibers are permitted to move laterally relative to one another to become relatively spatially rearranged from a first cross-section of the cable segment to a second cross-section of the cable segment, and wherein the cable sheath includes a laterally stretchable material that permits a cross-sectional shape of the cable segment to change in response to movement of the optical fibers within the cable sheath.

Figures 13A, 13B:
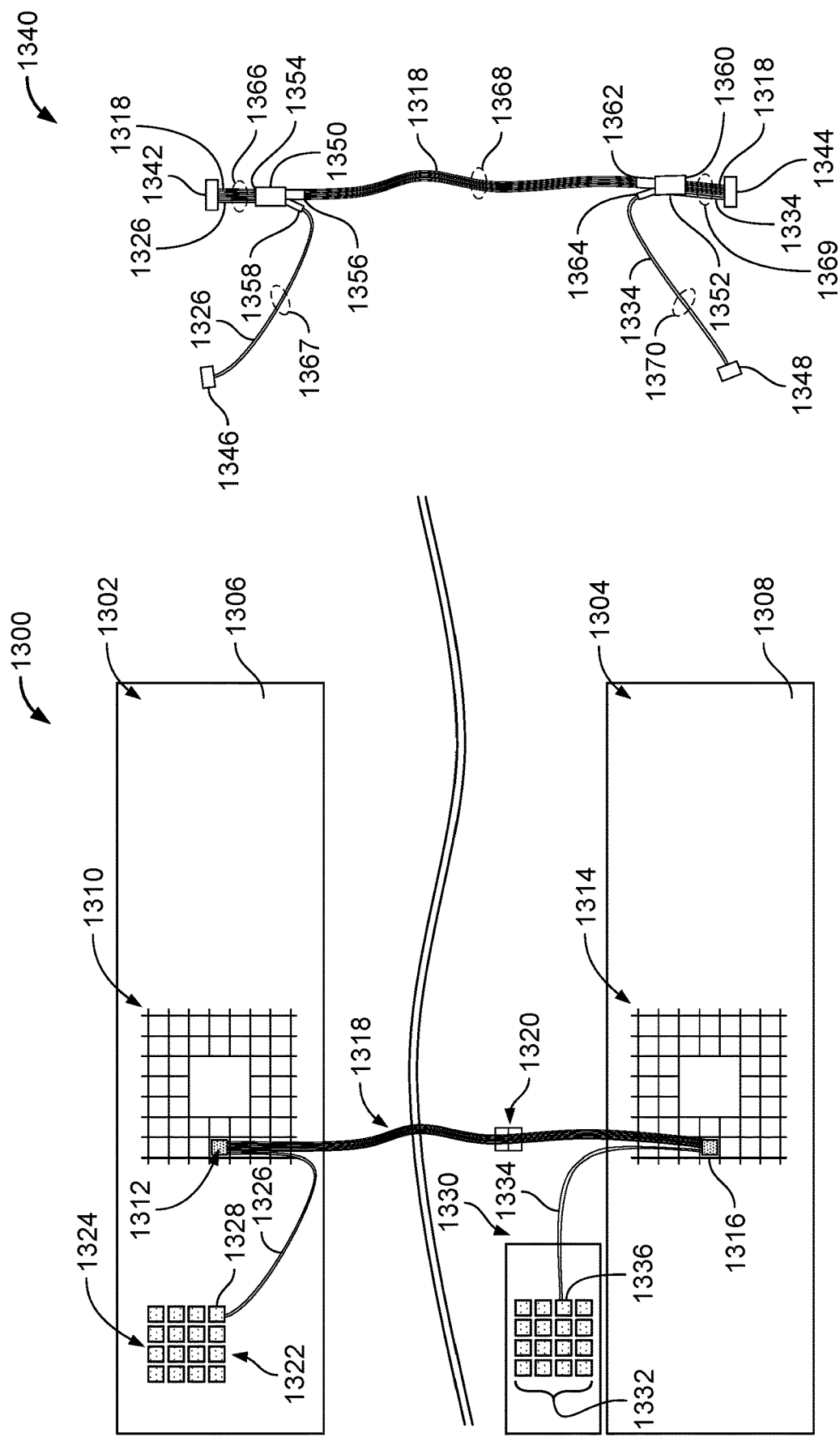
FIG. 13A is a diagram of an example of an optical communication system.
FIG. 13B is a diagram of an example of an optical cable assembly used in the optical communication system of FIG. 13A.

FIG. 13A is a diagram of an example of an optical communication system 1300 that includes a first switch box 1302 and a second switch box 1304. Each of the switch boxes 1302, 1304 can include one or more data processors, such as network switches. The first and second switch boxes 1302, 1304 can be separated by a distance greater than, e.g., 1 foot, 3 feet, 10 feet, 100 feet, or 1000 feet. The figure shows a diagram of a front panel 1306 of the first switch box 1302 and a front panel 1308 of the second switch box 1304. In this example, the first switch box 1302 includes a vertical ASIC mount grid structure 1310. A co-packaged optical module 1312 is attached to a receptor of the grid structure 1310. The second switch box 1304 includes a vertical ASIC mount grid structure 1314. A co-packaged optical module 1316 is attached to a receptor of the grid structure 1314. The first co-packaged optical module 1312 communicates with the second co-packaged optical module 1316 through an optical fiber bundle 1318 that includes multiple optical fibers. Optional fiber connectors 1320 can be used along the optical fiber bundle 1318, in which shorter sections of optical fiber bundles are connected by the fiber connectors 1320.

In some implementations, each co-packaged optical module (e.g., 1312, 1316) includes a photonic integrated circuit configured to convert input optical signals to input electrical signals that are provided to a data processor, and convert output electrical signals from the data processor to output optical signals. The co-packaged optical module can include an electronic integrated circuit configured to process the input electrical signals from the photonic integrated circuit before the input electrical signals are transmitted to the data processor, and to process the output electrical signals from the data processor before the output electrical signals are transmitted to the photonic integrated circuit. In some implementations, the electronic integrated circuit can include a plurality of serializers/deserializers configured to process the input electrical signals from the photonic integrated circuit, and to process the output electrical signals transmitted to the photonic integrated circuit. The electronic integrated circuit can include a first serializers/deserializers module having multiple serializer units and deserializer units, in which the first serializers/deserializers module is configured to generate a plurality of sets of first parallel electrical signals based on a plurality of first serial electrical signals provided by the photonic integrated circuit, and condition the electrical signals, in which each set of first parallel electrical signals is generated based on a corresponding first serial electrical signal. The electronic integrated circuit can include a second serializers/deserializers module having multiple serializer units and deserializer units, in which the second serializers/deserializers module is configured to generate a plurality of second serial electrical signals based on the plurality of sets of first parallel electrical signals, and each second serial electrical signal is generated based on a corresponding set of first parallel electrical signals. The plurality of second serial electrical signals can be transmitted toward the data processor.

The first switch box 1302 includes an external optical power supply 1322 (i.e., external to the co-packaged optical module) that provides optical power supply light through an optical connector array 1324. In this example, the optical power supply 1322 is located internal of the housing of the switch box 1302. Optical fibers 1326 are optically coupled to an optical connector 1328 (of the optical connector array 1324) and the co-packaged optical module 1312. The optical power supply 1322 sends optical power supply light through the optical connector 1328 and the optical fibers 1326 to the co-packaged optical module 1312. For example, the co-packaged optical module 1312 includes a photonic integrated circuit that modulates the power supply light based on data provided by a data processor to generate a modulated optical signal, and transmits the modulated optical signal to the co-packaged optical module 1316 through one of the optical fibers in the fiber bundle 1318.

In some examples, the optical power supply 1322 is configured to provide optical power supply light to the co-packaged optical module 1312 through multiple links that have built-in redundancy in case of malfunction in some of the optical power supply modules. For example, the co-packaged optical module 1312 can be designed to receive N channels of optical power supply light (e.g., N1 continuous wave light signals at the same or at different optical wavelengths, or N1 sequences of optical frame templates), N1 being a positive integer, from the optical power supply 1322. The optical power supply 1322 provides N1+M1 channels of optical power supply light to the co-packaged optical module 1312, in which M1 channels of optical power supply light are used for backup in case of failure of one or more of the N1 channels of optical power supply light, M1 being a positive integer.

The second switch box 1304 receives optical power supply light from a co-located optical power supply 1330, which is, e.g., external to the second switch box 1304 and located near the second switch box 1304, e.g., in the same rack as the second switch box 1304 in a data center. The optical power supply 1330 includes an array of optical connectors 1332. Optical fibers 1334 are optically coupled to an optical connector 1336 (of the optical connectors 1332) and the co-packaged optical module 1316. The optical power supply 1330 sends optical power supply light through the optical connector 1336 and the optical fibers 1334 to the co-packaged optical module 1316. For example, the co-packaged optical module 1316 includes a photonic integrated circuit that modulates the power supply light based on data provided by a data processor to generate a modulated optical signal, and transmits the modulated optical signal to the co-packaged optical module 1312 through one of the optical fibers in the fiber bundle 1318.

In some examples, the optical power supply 1330 is configured to provide optical power supply light to the co-packaged optical module 1316 through multiple links that have built-in redundancy in case of malfunction in some of the optical power supply modules. For example, the co-packaged optical module 1316 can be designed to receive N2 channels of optical power supply light (e.g., N2 continuous wave light signals at the same or at different optical wavelengths, or N2 sequences of optical frame templates), N2 being a positive integer, from the optical power supply 1322. The optical power supply 1322 provides N2+M2 channels of optical power supply light to the co-packaged optical module 1312, in which M2 channels of optical power supply light are used for backup in case of failure of one or more of the N2 channels of optical power supply light, M2 being a positive integer.

Figure 13C:
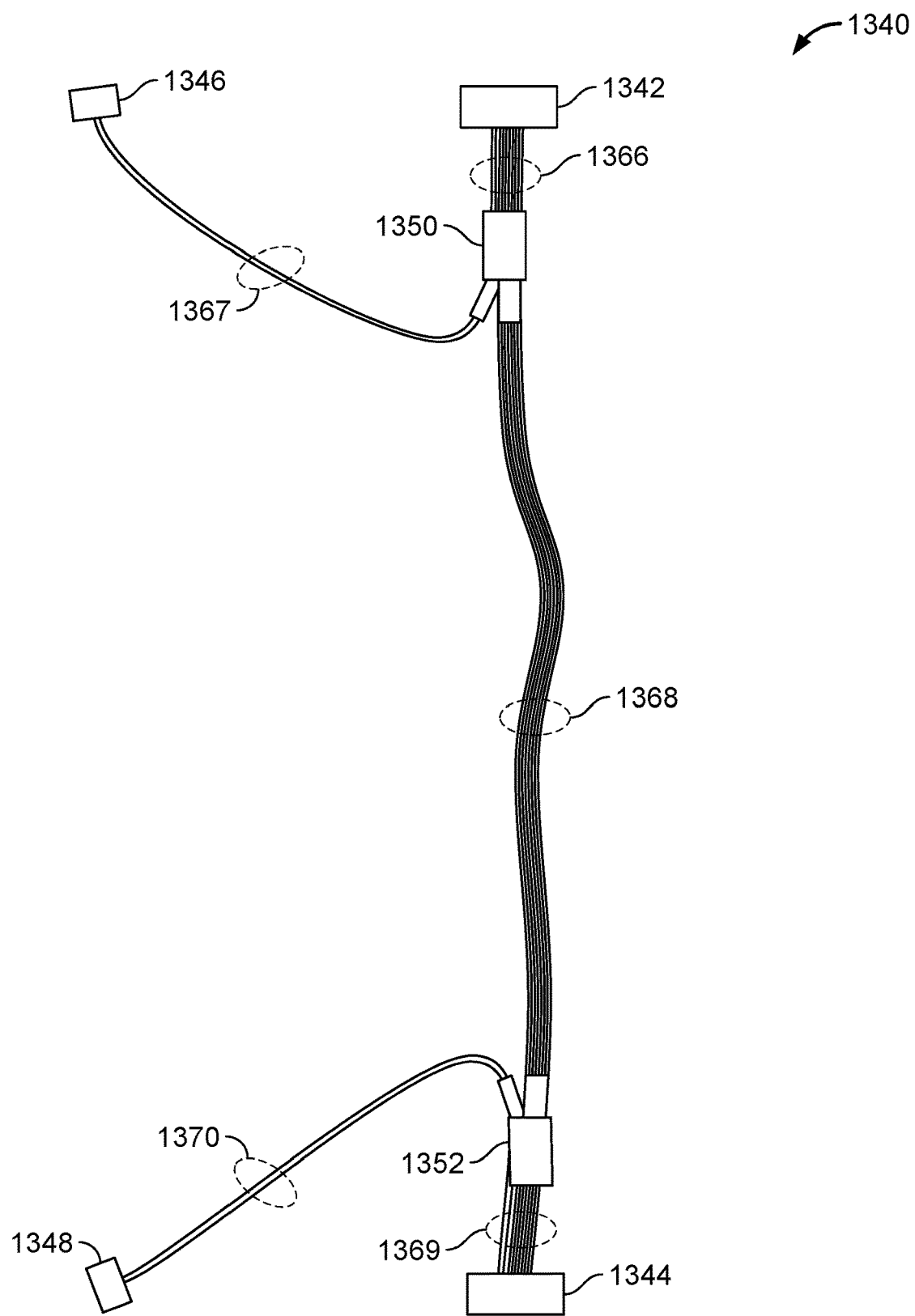
FIG. 13C is an enlarged diagram of the optical cable assembly of FIG. 13B.

FIG. 13B is a diagram of an example of an optical cable assembly 1340 that can be used to enable the first co-packaged optical module 1312 to receive optical power supply light from the first optical power supply 1322, enable the second co-packaged optical module 1316 to receive optical power supply light from the second optical power supply 1330, and enable the first co-packaged optical module 1312 to communicate with the second co-packaged optical module 1316. FIG. 13C is an enlarged diagram of the optical cable assembly 1340 without some of the reference numbers to enhance clarity of illustration.

The optical cable assembly 1340 includes a first optical fiber connector 1342, a second optical fiber connector 1344, a third optical fiber connector 1346, and a fourth optical fiber connector 1348. The first optical fiber connector 1342 is designed and configured to be optically coupled to the first co-packaged optical module 1312. For example, the first optical fiber connector 1342 can be configured to mate with a connector part of the first co-packaged optical module 1312, or a connector part that is optically coupled to the first co-packaged optical module 1312. The first, second, third, and fourth optical fiber connectors 1342, 1344, 1346, 1348 can comply with an industry standard that defines the specifications for optical fiber interconnection cables that transmit data and control signals, and optical power supply light.

Figure 23:
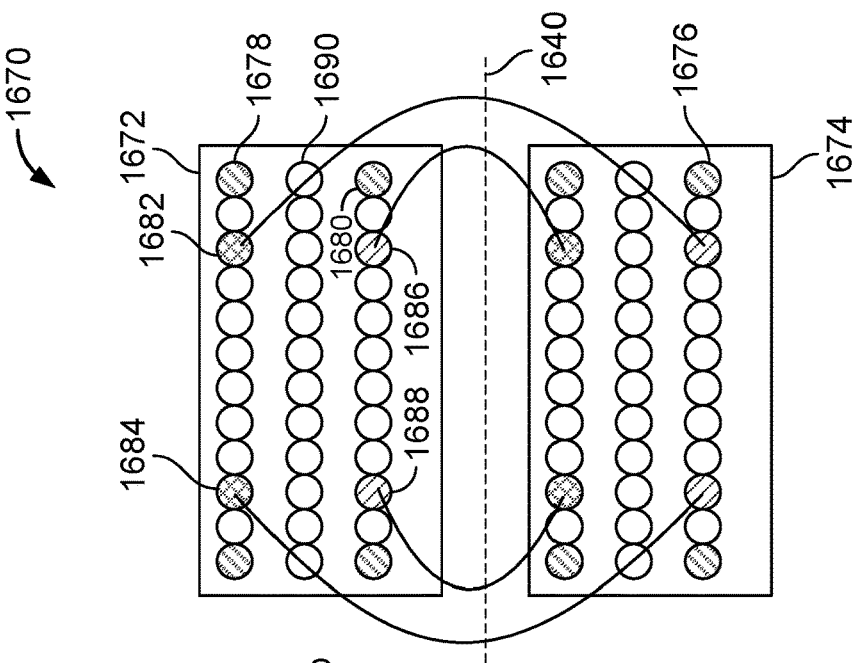
FIGS. 22 and 23 are diagrams of examples of fiber port mapping for optical fiber interconnection cables.
Figure 22:
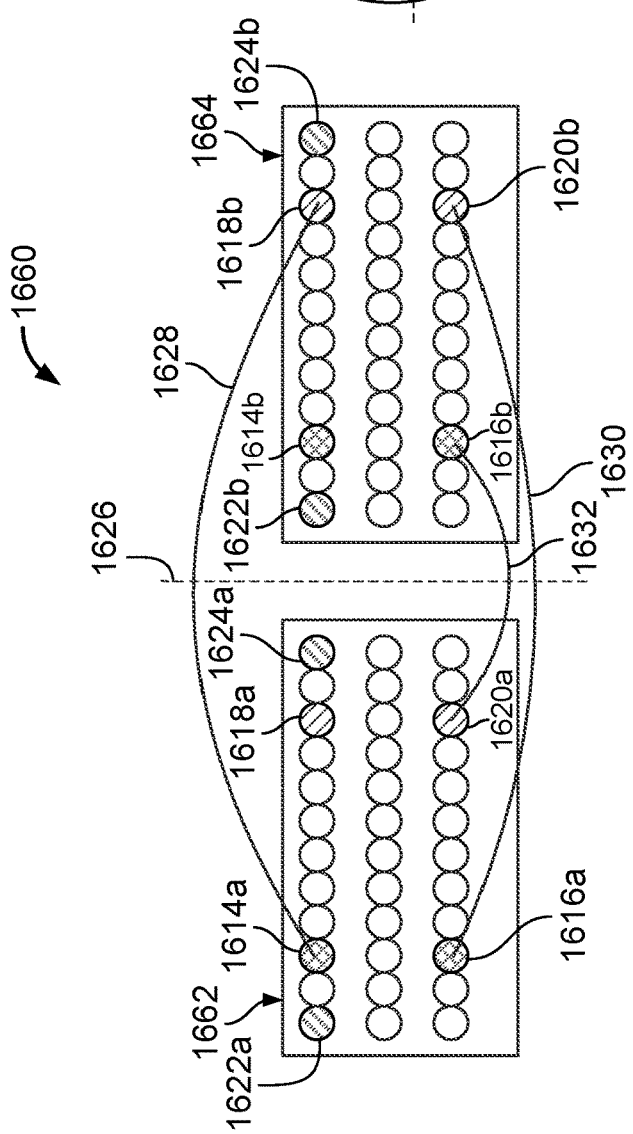

The first optical fiber connector 1342 includes optical power supply (PS) fiber ports, transmitter (TX) fiber ports, and receiver (RX) fiber ports. The optical power supply fiber ports provide optical power supply light to the co-packaged optical module 1312. The transmitter fiber ports allow the co-packaged optical module 1312 to transmit output optical signals (e.g., data and/or control signals), and the receiver fiber ports allow the co-packaged optical module 1312 to receive input optical signals (e.g., data and/or control signals). Examples of the arrangement of the optical power supply fiber ports, the transmitter ports, and the receiver ports in the first optical fiber connector 1342 are shown in FIGS. 13D, 22, and 23.

Figure 13D:
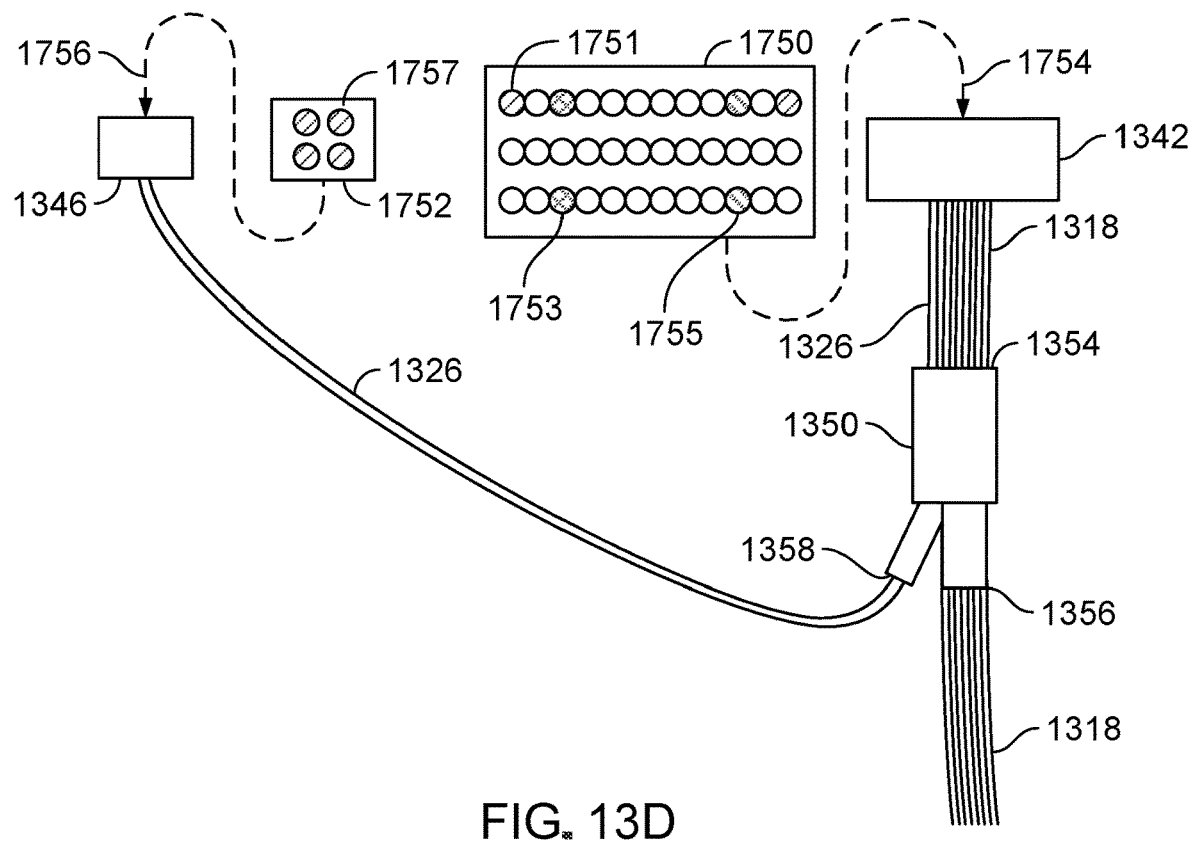
FIG. 13D is an enlarged diagram of the upper portion of the optical cable assembly of FIG. 13B.

FIG. 13D shows an enlarged upper portion of the diagram of FIG. 13B, with the addition of an example of a mapping of fiber ports 1750 of the first optical fiber connector 1342 and a mapping of fiber ports 1752 of the third optical fiber connector 1346. The mapping of fiber ports 1750 shows the positions of the transmitter fiber ports (e.g., 1753), receiver fiber ports (e.g., 1755), and power supply fiber ports (e.g., 1751) of the first optical fiber connector 1342 when viewed in the direction 1754 into the first optical fiber connector 1342. The mapping of fiber ports 1752 shows the positions of the power supply fiber ports (e.g., 1757) of the third optical fiber connector 1346 when viewed in the direction 1756 into the third optical fiber connector 1346.

The second optical fiber connector 1344 is designed and configured to be optically coupled to the second co-packaged optical module 1316. The second optical fiber connector 1344 includes optical power supply fiber ports, transmitter fiber ports, and receiver fiber ports. The optical power supply fiber ports provide optical power supply light to the co-packaged optical module 1316. The transmitter fiber ports allow the co-packaged optical module 1316 to transmit output optical signals, and the receiver fiber ports allow the co-packaged optical module 1316 to receive input optical signals. Examples of the arrangement of the optical power supply fiber ports, the transmitter ports, and the receiver ports in the second optical fiber connector 1344 are shown in FIGS. 13E, 22, and 23.

Figure 13E:
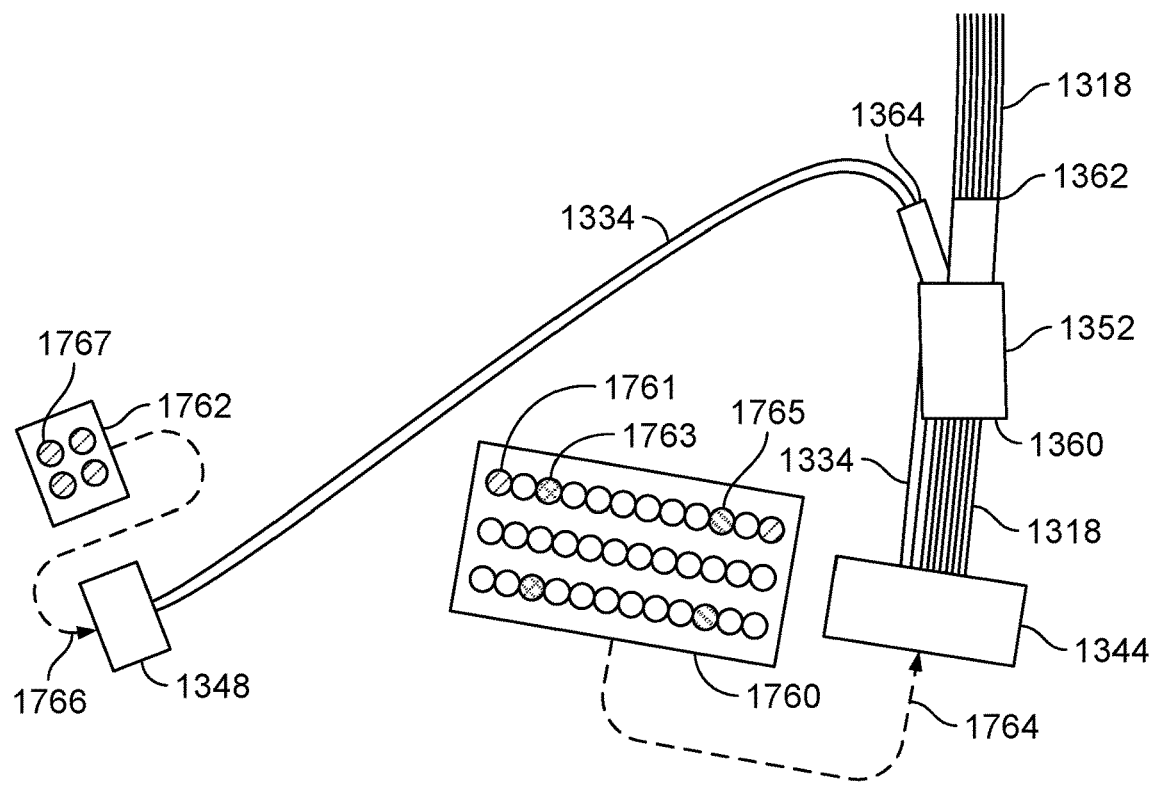
FIG. 13E is an enlarged diagram of the lower portion of the optical cable assembly of FIG. 13B.

FIG. 13E shows an enlarged lower portion of the diagram of FIG. 13B, with the addition of an example of a mapping of fiber ports 1760 of the second optical fiber connector 1344 and a mapping of fiber ports 1762 of the fourth optical fiber connector 1348. The mapping of fiber ports 1760 shows the positions of the transmitter fiber ports (e.g., 1763), receiver fiber ports (e.g., 1765), and power supply fiber ports (e.g., 1761) of the second optical fiber connector 1344 when viewed in the direction 1764 into the second optical fiber connector 1344. The mapping of fiber ports 1762 shows the positions of the power supply fiber ports (e.g., 1767) of the fourth optical fiber connector 1348 when viewed in the direction 1766 into the fourth fiber connector 1348.

The third optical connector 1346 is designed and configured to be optically coupled to the power supply 1322. The third optical connector 1346 includes optical power supply fiber ports (e.g., 1757) through which the power supply 1322 can output the optical power supply light. The fourth optical connector 1348 is designed and configured to be optically coupled to the power supply 1330. The fourth optical connector 1348 includes optical power supply fiber ports (e.g., 1762) through which the power supply 1322 can output the optical power supply light.

In some implementations, the optical power supply fiber ports, the transmitter fiber ports, and the receiver fiber ports in the first and second optical fiber connectors 1342, 1344 are designed to be independent of the communication devices, i.e., the first optical fiber connector 1342 can be optically coupled to the second switch box 1304, and the second optical fiber connector 1344 can be optically coupled to the first switch box 1302 without any re-mapping of the fiber ports. Similarly, the optical power supply fiber ports in the third and fourth optical fiber connectors 1346, 1348 are designed to be independent of the optical power supplies, i.e., if the first optical fiber connector 1342 is optically coupled to the second switch box 1304, the third optical fiber connector 1346 can be optically coupled to the second optical power supply 1330. If the second optical fiber connector 1344 is optically coupled to the first switch box 1302, the fourth optical fiber connector 1348 can be optically coupled to the first optical power supply 1322.

The optical cable assembly 1340 includes a first optical fiber guide module 1350 and a second optical fiber guide module 1352. The optical fiber guide module depending on context is also referred to as an optical fiber coupler or splitter because the optical fiber guide module combines multiple bundles of fibers into one bundle of fibers, or separates one bundle of fibers into multiple bundles of fibers. The first optical fiber guide module 1350 includes a first port 1354, a second port 1356, and a third port 1358. The second optical fiber guide module 1352 includes a first port 1360, a second port 1362, and a third port 1364. The fiber bundle 1318 extends from the first optical fiber connector 1342 to the second optical fiber connector 1344 through the first port 1354 and the second port 1356 of the first optical fiber guide module 1350 and the second port 1362 and the first port 1360 of the second optical fiber guide module 1352. The optical fibers 1326 extend from the third optical fiber connector 1346 to the first optical fiber connector 1342 through the third port 1358 and the first port 1354 of the first optical fiber guide module 1350. The optical fibers 1334 extend from the fourth optical fiber connector 1348 to the second optical fiber connector 1344 through the third port 1364 and the first port 1360 of the second optical fiber guide module 1352.

A portion (or section) of the optical fibers 1318 and a portion of the optical fibers 1326 extend from the first port 1354 of the first optical fiber guide module 1350 to the first optical fiber connector 1342. A portion of the optical fibers 1318 extend from the second port 1356 of the first optical fiber guide module 1350 to the second port 1362 of the second optical fiber guide module 1352, with optional optical connectors (e.g., 1320) along the paths of the optical fibers 1318. A portion of the optical fibers 1326 extend from the third port 1358 of the first optical fiber connector 1350 to the third optical fiber connector 1346. A portion of the optical fibers 1334 extend from the third port 1364 of the second optical fiber connector 1352 to the fourth optical fiber connector 1348.

The first optical fiber guide module 1350 is designed to restrict bending of the optical fibers such that the bending radius of any optical fiber in the first optical fiber guide module 1350 is greater than the minimum bending radius specified by the optical fiber manufacturer to avoid excess optical light loss or damage to the optical fiber. For example, the minimum bend radii can be 2 cm, 1 cm, 5 mm, or 2.5 mm. Other bend radii are also possible. For example, the fibers 1318 and the fibers 1326 extend outward from the first port 1354 along a first direction, the fibers 1318 extend outward from the second port 1356 along a second direction, and the fibers 1326 extend outward from the third port 1358 along a third direction. A first angle is between the first and second directions, a second angle is between the first and third directions, and a third angle is between the second and third directions. The first optical fiber guide module 1350 can be designed to limit the bending of optical fibers so that each of the first, second, and third angles is in a range from, e.g., 30° to 180°.

For example, the portion of the optical fibers 1318 and the portion of the optical fibers 1326 between the first optical fiber connector 1342 and the first port 1354 of the first optical fiber guide module 1350 can be surrounded and protected by a first common sheath 1366. The optical fibers 1318 between the second port 1356 of the first optical fiber guide module 1350 and the second port 1362 of the second optical fiber guide module 1352 can be surrounded and protected by a second common sheath 1368. The portion of the optical fibers 1318 and the portion of the optical fibers 1334 between the second optical fiber connector 1344 and the first port 1360 of the second optical fiber guide module 1352 can be surrounded and protected by a third common sheath 1369. The optical fibers 1326 between the third optical fiber connector 1346 and the third port 1358 of the first optical fiber guide module 1350 can be surrounded and protected by a fourth common sheath 1367. The optical fibers 1334 between the fourth optical fiber connector 1348 and the third port 1364 of the second optical fiber guide module 1352 can be surrounded and protected by a fifth common sheath 1370. Each of the common sheaths can be laterally flexible and/or laterally stretchable, as described in, e.g., U.S. patent application Ser. No. 16/822,103.

In some implementations, the optical cable assembly 1340 includes cable segments, in which each cable segment includes optical fibers laterally encased by a cable sheath (e.g., 1366, 1367, 1368, 1369, 1370). Each cable segment is constructed to permit relative lateral movement of at least some of the optical fibers within the cable sheath to change a cross-sectional shape of the cable segment. In some implementations, the plurality of optical fibers are permitted to move laterally relative to one another to become relatively spatially rearranged from a first cross-section of the cable segment to a second cross-section of the cable segment. The cable sheath includes a laterally stretchable material that permits a cross-sectional shape of the cable segment to change in response to movement of the optical fibers within the cable sheath.

One or more optical cable assemblies 1340 (FIGS. 13B, 13C) and other optical cable assemblies (e.g., 1400 of FIG. 15B, 15C, 1490 of FIG. 17B, 17C) described in this document can be used to optically connect switch boxes that are configured differently compared to the switch boxes 1302, 1304 shown in FIG. 13A, in which the switch boxes receive optical power supply light from one or more external optical power supplies. For example, in some implementations, the optical cable assembly 1340 can be attached to a fiber-optic array connector mounted on the outside of the front panel of an optical switch, and another fiber-optic cable then connects the inside of the fiber connector to a co-packaged optical module that is mounted on a circuit board positioned inside the housing of the switch box. The co-packaged optical module (which includes, e.g., a photonic integrated circuit, optical-to-electrical converters, such as photodetectors, and electrical-to-optical converters, such as laser diodes) can be co-packaged with a switch ASIC and mounted on a circuit board that can be vertically or horizontally oriented. For example, in some implementations, the front panel is mounted on hinges and a vertical ASIC mount is recessed behind it. The optical cable assembly 1340 provides optical paths for communication between the switch boxes, and optical paths for transmitting power supply light from one or more external optical power supplies to the switch boxes. The switch boxes can have any of a variety of configurations regarding how the power supply light and the data and/or control signals from the optical fiber connectors are transmitted to or received from the photonic integrated circuits, and how the signals are transmitted between the photonic integrated circuits and the data processors.

One or more optical cable assemblies 1340 and other optical cable assemblies (e.g., 1400 of FIG. 15B, 15C, 1490 of FIG. 17B, 17C) described in this document can be used to optically connect computing devices other than switch boxes. For example, the computing devices can be server computers that provide a variety of services, such as cloud computing, database processing, audio/video hosting and streaming, electronic mail, data storage, web hosting, social network, supercomputing, scientific research computing, healthcare data processing, financial transaction processing, logistics management, weather forecast, or simulation, to list a few examples. The optical power light required by the optoelectronic modules of the computing devices can be provided using one or more external optical power supplies. For example, in some implementations, one or more external optical power supplies that are centrally managed can be configured to provide the optical power supply light for hundreds or thousands of server computers in a data center, and the one or more optical power supplies and the server computers can be optically connected using the optical cable assemblies (e.g., 1340, 1400, 1490) described in this document and variations of the optical cable assemblies using the principles described in this document.

Figure 14:
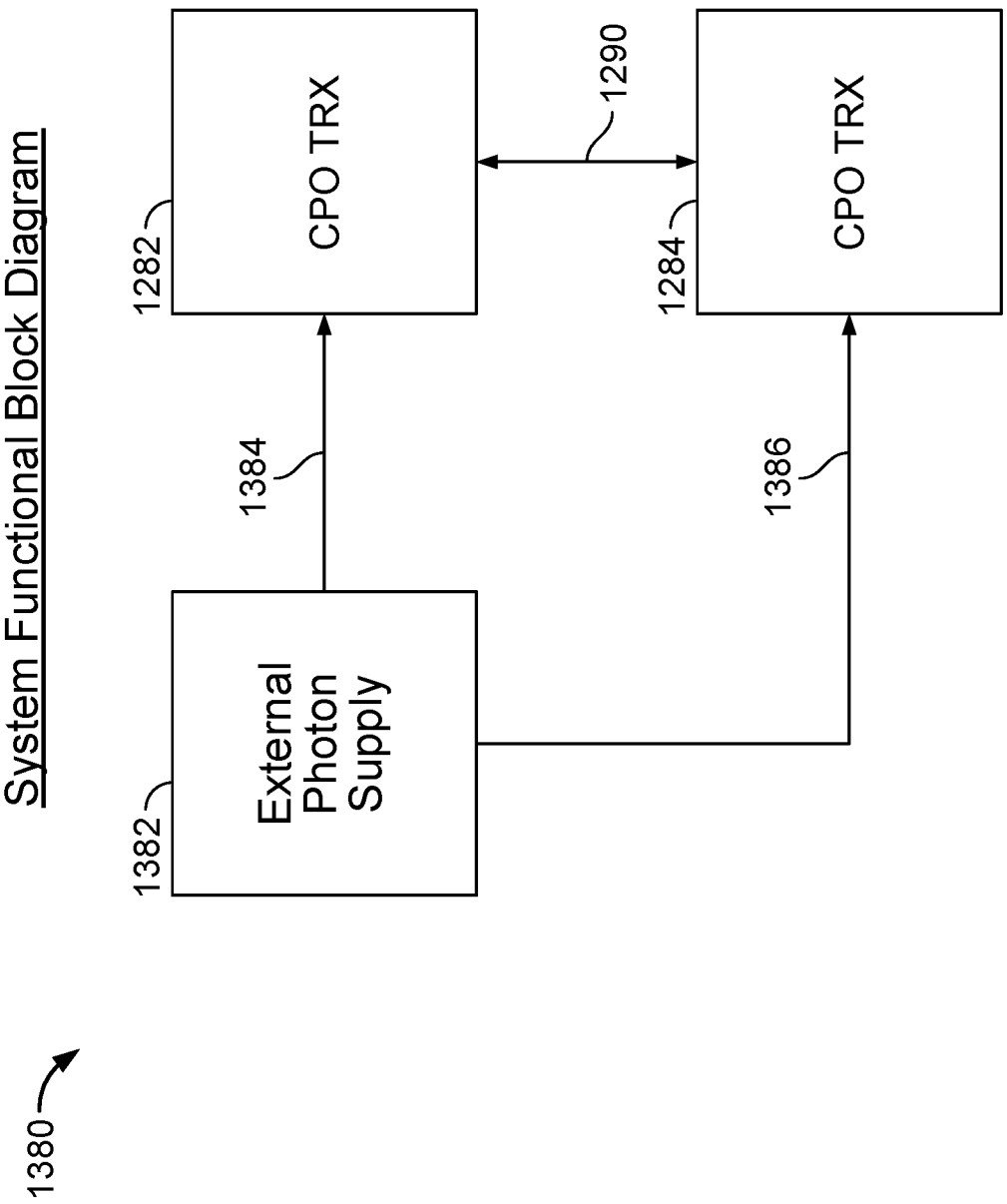
FIG. 14 is a block diagram of an example of an optical communication system.

FIG. 14 is a system functional block diagram of an example of an optical communication system 1380 that includes a first communication transponder 1282 and a second communication transponder 1284, similar to those in FIG. 12. The first communication transponder 1282 sends optical signals to, and receives optical signals from, the second communication transponder 1284 through a first optical communication link 1290. The optical communication system 1380 can be expanded to include additional communication transponders.

An external photon supply 1382 provides optical power supply light to the first communication transponder 1282 through a first optical power supply link 1384, and provides optical power supply light to the second communication transponder 1284 through a second optical power supply link 1386. In one example, the external photon supply 1282 provides continuous wave light to the first communication transponder 1282 and to the second communication transponder 1284. In one example, the continuous wave light can be at the same optical wavelength. In another example, the continuous wave light can be at different optical wavelengths. In yet another example, the external photon supply 1282 provides a first sequence of optical frame templates to the first communication transponder 1282, and provides a second sequence of optical frame templates to the second communication transponder 1284. Each of the optical frame templates can include a respective frame header and a respective frame body, and the frame body includes a respective optical pulse train. The first communication transponder 1282 receives the first sequence of optical frame templates from the external photon supply 1382, loads data into the respective frame bodies to convert the first sequence of optical frame templates into a first sequence of loaded optical frames that are transmitted through the first optical communication link 1290 to the second communication transponder 1284. Similarly, the second communication transponder 1284 receives the second sequence of optical frame templates from the external photon supply 1382, loads data into the respective frame bodies to convert the second sequence of optical frame templates into a second sequence of loaded optical frames that are transmitted through the first optical communication link 1290 to the first communication transponder 1282.

Figures 15A, 15B:
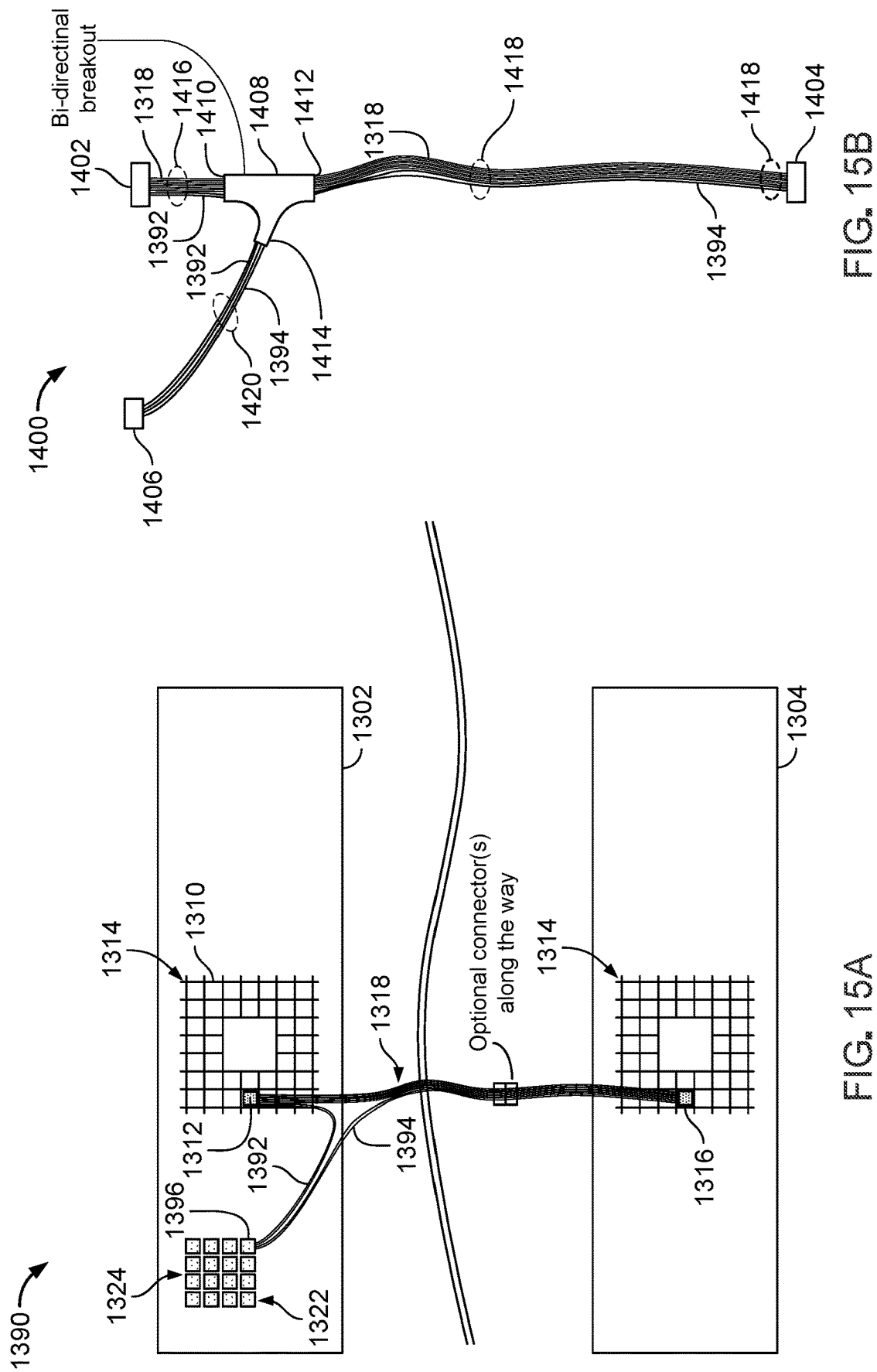
FIG. 15A is a diagram of an example of an optical communication system.
FIG. 15B is a diagram of an example of an optical cable assembly.

FIG. 15A is a diagram of an example of an optical communication system 1390 that includes a first switch box 1302 and a second switch box 1304, similar to those in FIG. 13A. The first switch box 1302 includes a vertical ASIC mount grid structure 1310, and a co-packaged optical module 1312 is attached to a receptor of the grid structure 1310. The second switch box 1304 includes a vertical ASIC mount grid structure 1314, and a co-packaged optical module 1316 is attached to a receptor of the grid structure 1314. The first co-packaged optical module 1312 communicates with the second co-packaged optical module 1316 through an optical fiber bundle 1318 that includes multiple optical fibers.

As discussed above in connection with FIGS. 13A to 13E, the first and second switch boxes 1302, 1304 can have other configurations. For example, horizontally mounted ASICs can be used. A fiber-optic array connector attached to a front panel can be used to optically connect the optical cable assembly 1340 to another fiber-optic cable that connects to a co-packaged optical module mounted on a circuit board inside the switch box. The front panel can be mounted on hinges and a vertical ASIC mount can be recessed behind it. The switch boxes can be replaced by other types of server computers.

In an example embodiment, the first switch box 1302 includes an external optical power supply 1322 that provides optical power supply light to both the co-packaged optical module 1312 in the first switch box 1302 and the co-packaged optical module 1316 in the second switch box 1304. In another example embodiment, the optical power supply can be located outside the switch box 1302 (cf. 1330, FIG. 13A). The optical power supply 1322 provides the optical power supply light through an optical connector array 1324. Optical fibers 1392 are optically coupled to an optical connector 1396 and the co-packaged optical module 1312. The optical power supply 1322 sends optical power supply light through the optical connector 1396 and the optical fibers 1392 to the co-packaged optical module 1312 in the first switch box 1302. Optical fibers 1394 are optically coupled to the optical connector 1396 and the co-packaged optical module 1316. The optical power supply 1322 sends optical power supply light through the optical connector 1396 and the optical fibers 1394 to the co-packaged optical module 1316 in the second switch box 1304.

Figure 15C:
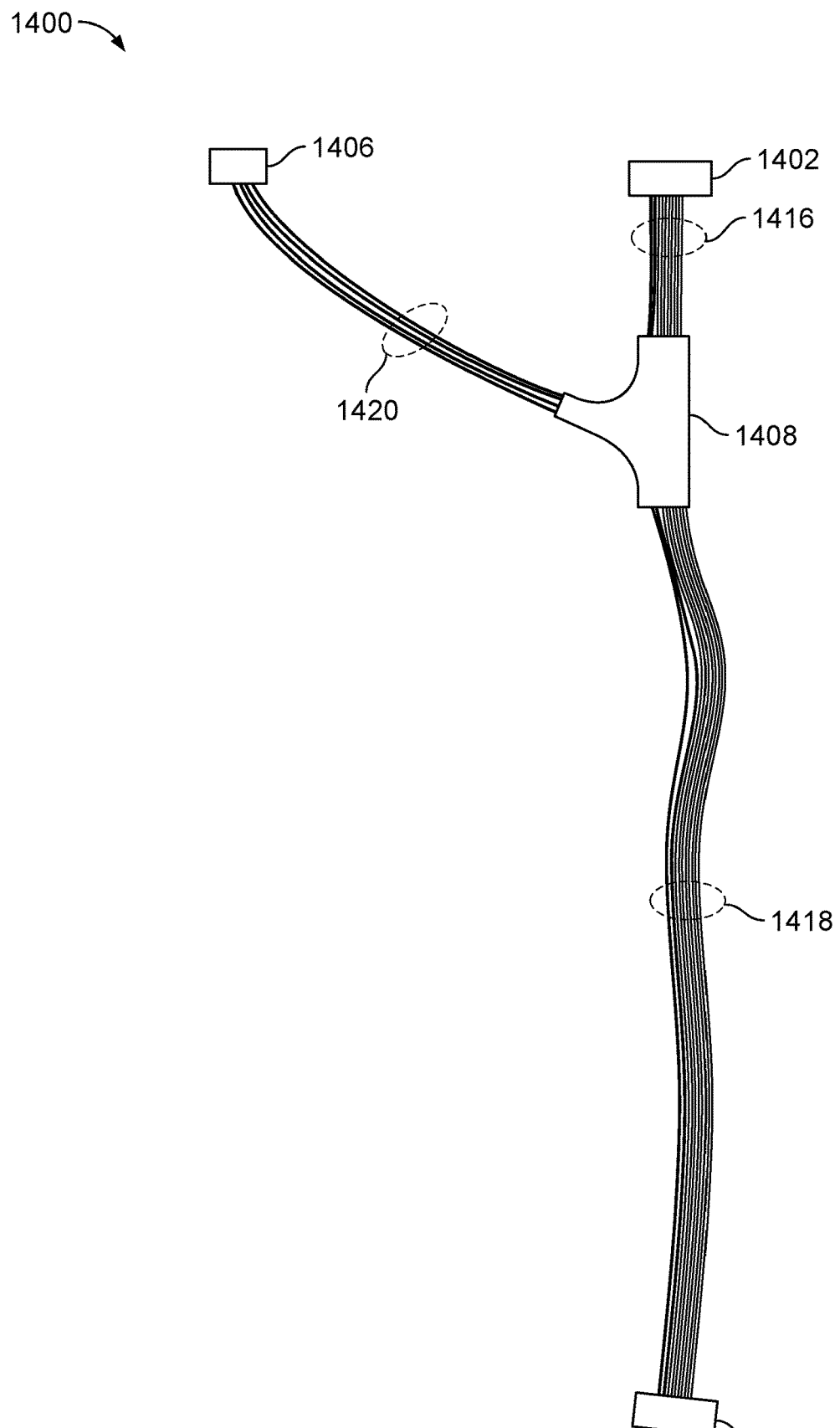
FIG. 15C is an enlarged diagram of the optical cable assembly of FIG. 15B.

FIG. 15B shows an example of an optical cable assembly 1400 that can be used to enable the first co-packaged optical module 1312 to receive optical power supply light from the optical power supply 1322, enable the second co-packaged optical module 1316 to receive optical power supply light from the optical power supply 1322, and enable the first co-packaged optical module 1312 to communicate with the second co-packaged optical module 1316. FIG. 15C is an enlarged diagram of the optical cable assembly 1400 without some of the reference numbers to enhance clarity of illustration.

The optical cable assembly 1400 includes a first optical fiber connector 1402, a second optical fiber connector 1404, and a third optical fiber connector 1406. The first optical fiber connector 1402 is similar to the first optical fiber connector 1342 of FIGS. 13B, 13C, 13D, and is designed and configured to be optically coupled to the first co-packaged optical module 1312. The second optical fiber connector 1404 is similar to the second optical fiber connector 1344 of FIGS. 13B, 13C, 13E, and is designed and configured to be optically coupled to the second co-packaged optical module 1316. The third optical connector 1406 is designed and configured to be optically coupled to the power supply 1322. The third optical connector 1406 includes first optical power supply fiber ports (e.g., 1770, FIG. 15D) and second optical power supply fiber ports (e.g., 1772). The power supply 1322 outputs optical power supply light through the first optical power supply fiber ports to the optical fibers 1392, and outputs optical power supply light through the second optical power supply fiber ports to the optical fibers 1394. The first, second, and third optical fiber connectors 1402, 1404, 1406 can comply with an industry standard that defines the specifications for optical fiber interconnection cables that transmit data and control signals, and optical power supply light.

Figure 15D:
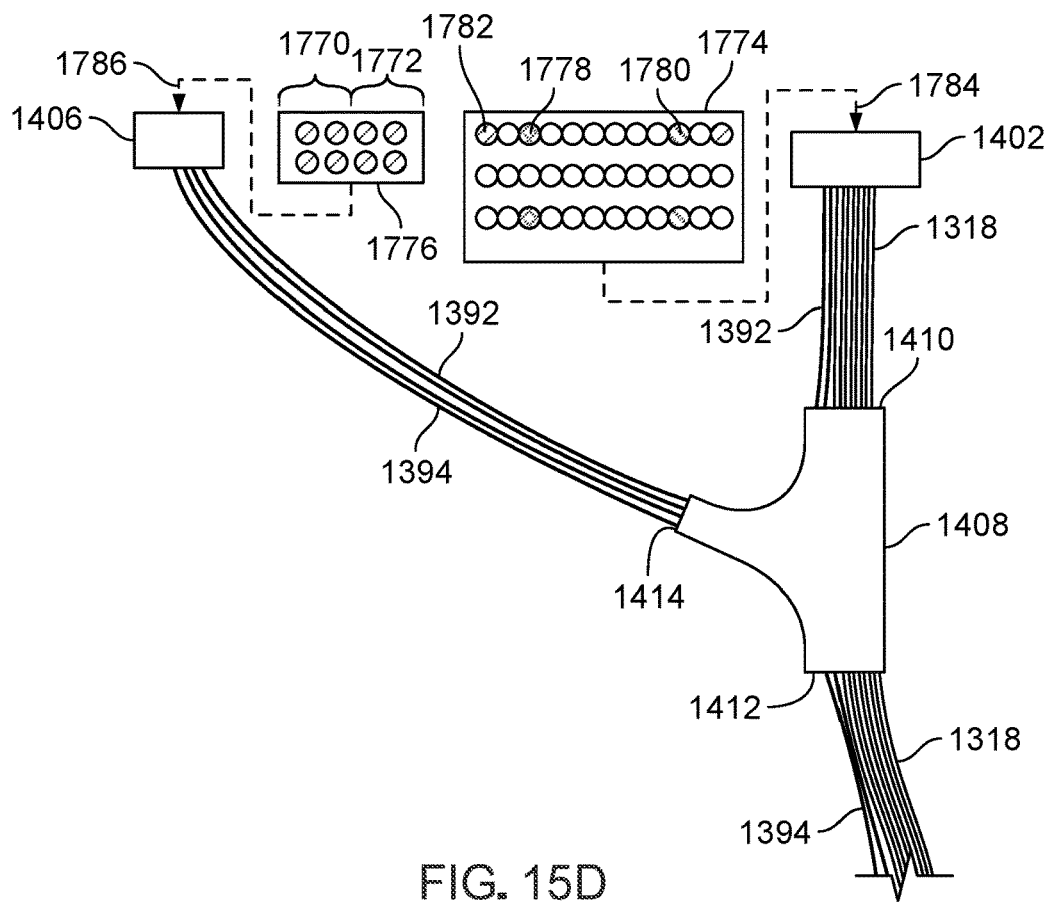
FIG. 15D is an enlarged diagram of the upper portion of the optical cable assembly of FIG. 15B.

FIG. 15D shows an enlarged upper portion of the diagram of FIG. 15B, with the addition of an example of a mapping of fiber ports 1774 of the first optical fiber connector 1402 and a mapping of fiber ports 1776 of the third optical fiber connector 1406. The mapping of fiber ports 1774 shows the positions of the transmitter fiber ports (e.g., 1778), receiver fiber ports (e.g., 1780), and power supply fiber ports (e.g., 1782) of the first optical fiber connector 1402 when viewed in the direction 1784 into the first optical fiber connector 1402. The mapping of fiber ports 1776 shows the positions of the power supply fiber ports (e.g., 1770, 1772) of the third optical fiber connector 1406 when viewed in the direction 1786 into the third optical fiber connector 1406. In this example, the third optical fiber connector 1406 includes 8 optical power supply fiber ports.

In some examples, optical connector array 1324 of the optical power supply 1322 can include a first type of optical connectors that accept optical fiber connectors having 4 optical power supply fiber ports, as in the example of FIG. 13D, and a second type of optical connectors that accept optical fiber connectors having 8 optical power supply fiber ports, as in the example of FIG. 15D. In some examples, if the optical connector array 1324 of the optical power supply 1322 only accepts optical fiber connectors having 4 optical power supply fiber ports, then a converter cable can be used to convert the third optical fiber connector 1406 of FIG. 15D to two optical fiber connectors, each having 4 optical power supply fiber ports, that is compatible with the optical connector array 1324.

Figure 15E:
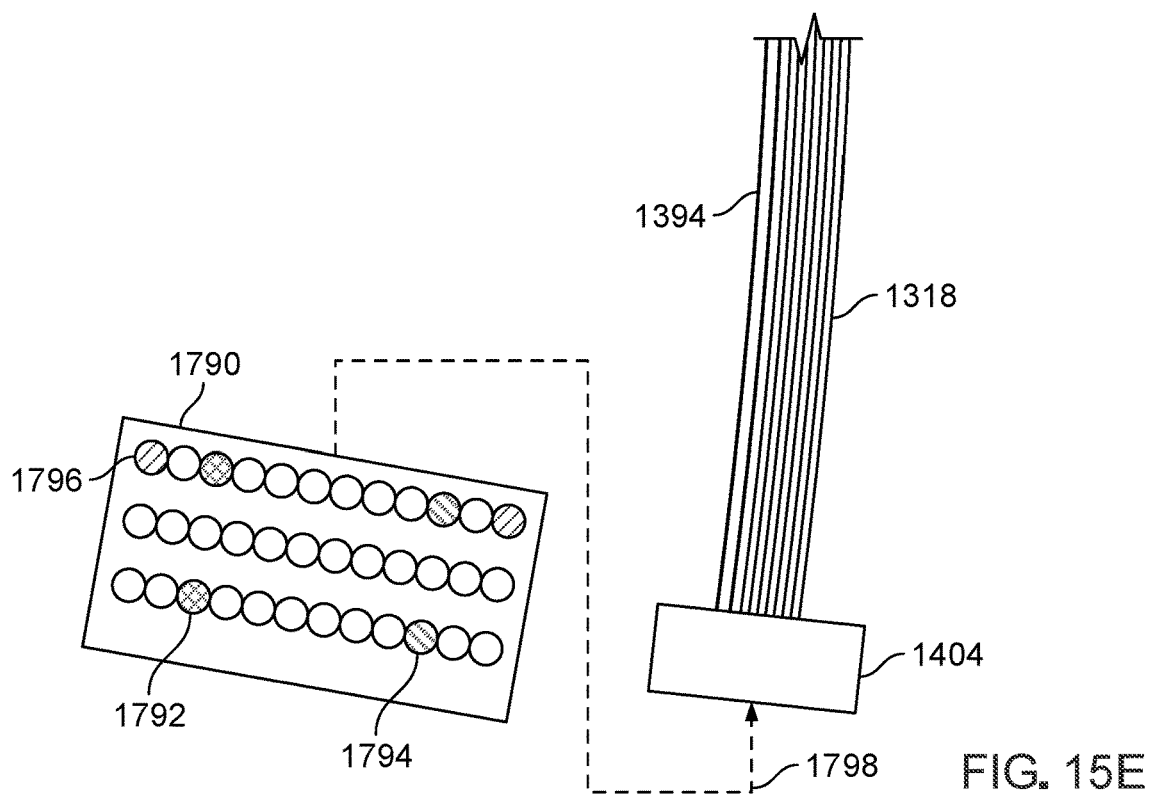
FIG. 15E is an enlarged diagram of the lower portion of the optical cable assembly of FIG. 15B.

FIG. 15E shows an enlarged lower portion of the diagram of FIG. 15B, with the addition of an example of a mapping of fiber ports 1790 of the second optical fiber connector 1404. The mapping of fiber ports 1790 shows the positions of the transmitter fiber ports (e.g., 1792), receiver fiber ports (e.g., 1794), and power supply fiber ports (e.g., 1796) of the second optical fiber connector 1404 when viewed in the direction 1798 into the second optical fiber connector 1404.

The port mappings of the optical fiber connectors shown in FIGS. 13D, 13E, 15D, and 15E are merely examples. Each optical fiber connector can include a greater number or a smaller number of transmitter fiber ports, a greater number or a smaller number of receiver fiber ports, and a greater number or a smaller number of optical power supply fiber ports, as compared to those shown in FIGS. 13D, 13E, 15D, and 15E. The arrangement of the relative positions of the transmitter, receiver, and optical power supply fiber ports can also be different from those shown in FIGS. 13D, 13E, 15D, and 15E.

The optical cable assembly 1400 includes an optical fiber guide module 1408, which includes a first port 1410, a second port 1412, and a third port 1414. The optical fiber guide module 1408 depending on context is also referred as an optical fiber coupler (for combining multiple bundles of optical fibers into one bundle of optical fiber) or an optical fiber splitter (for separating a bundle of optical fibers into multiple bundles of optical fibers). The fiber bundle 1318 extends from the first optical fiber connector 1402 to the second optical fiber connector 1404 through the first port 1410 and the second port 1412 of the optical fiber guide module 1408. The optical fibers 1392 extend from the third optical fiber connector 1406 to the first optical fiber connector 1402 through the third port 1414 and the first port 1410 of the optical fiber guide module 1408. The optical fibers 1394 extend from the third optical fiber connector 1406 to the second optical fiber connector 1404 through the third port 1414 and the second port 1412 of the optical fiber guide module 1408.

A portion of the optical fibers 1318 and a portion of the optical fibers 1392 extend from the first port 1410 of the optical fiber guide module 1408 to the first optical fiber connector 1402. A portion of the optical fibers 1318 and a portion of the optical fibers 1394 extend from the second port 1412 of the optical fiber guide module 1408 to the second optical fiber connector 1404. A portion of the optical fibers 1394 extend from the third port 1414 of the optical fiber connector 1408 to the third optical fiber connector 1406.

The optical fiber guide module 1408 is designed to restrict bending of the optical fibers such that the radius of curvature of any optical fiber in the optical fiber guide module 1408 is greater than the minimum radius of curvature specified by the optical fiber manufacturer to avoid excess optical light loss or damage to the optical fiber. For example, the optical fibers 1318 and the optical fibers 1392 extend outward from the first port 1410 along a first direction, the optical fibers 1318 and the optical fibers 1394 extend outward from the second port 1412 along a second direction, and the optical fibers 1392 and the optical fibers 1394 extend outward from the third port 1414 along a third direction. A first angle is between the first and second directions, a second angle is between the first and third directions, and a third angle is between the second and third directions. The optical fiber guide module 1408 is designed to limit the bending of optical fibers so that each of the first, second, and third angles is in a range from, e.g., 30° to 180°.

For example, the portion of the optical fibers 1318 and the portion of the optical fibers 1392 between the first optical fiber connector 1402 and the first port 1410 of the optical fiber guide module 1408 can be surrounded and protected by a first common sheath 1416. The optical fibers 1318 and the optical fibers 1394 between the second optical fiber connector 1404 and the second port 1412 of the optical fiber guide module 1408 can be surrounded and protected by a second common sheath 1418. The optical fibers 1392 and the optical fibers 1394 between the third optical fiber connector 1406 and the third port 1414 of the optical fiber guide module 1408 can be surrounded and protected by a third common sheath 1420. Each of the common sheaths can be laterally flexible and/or laterally stretchable.

In some implementations, the optical cable assembly 1400 includes cable segments, in which each cable segment includes optical fibers laterally encased by a cable sheath (e.g., 1416, 1418, 1420). Each cable segment is constructed to permit relative lateral movement of at least some of the optical fibers within the cable sheath to change a cross-sectional shape of the cable segment. In some implementations, the optical fibers are permitted to move laterally relative to one another to become relatively spatially rearranged from a first cross-section of the cable segment to a second cross-section of the cable segment. The cable sheath includes a laterally stretchable material that permits a cross-sectional shape of the cable segment to change in response to movement of the optical fibers within the cable sheath.

Figure 16:
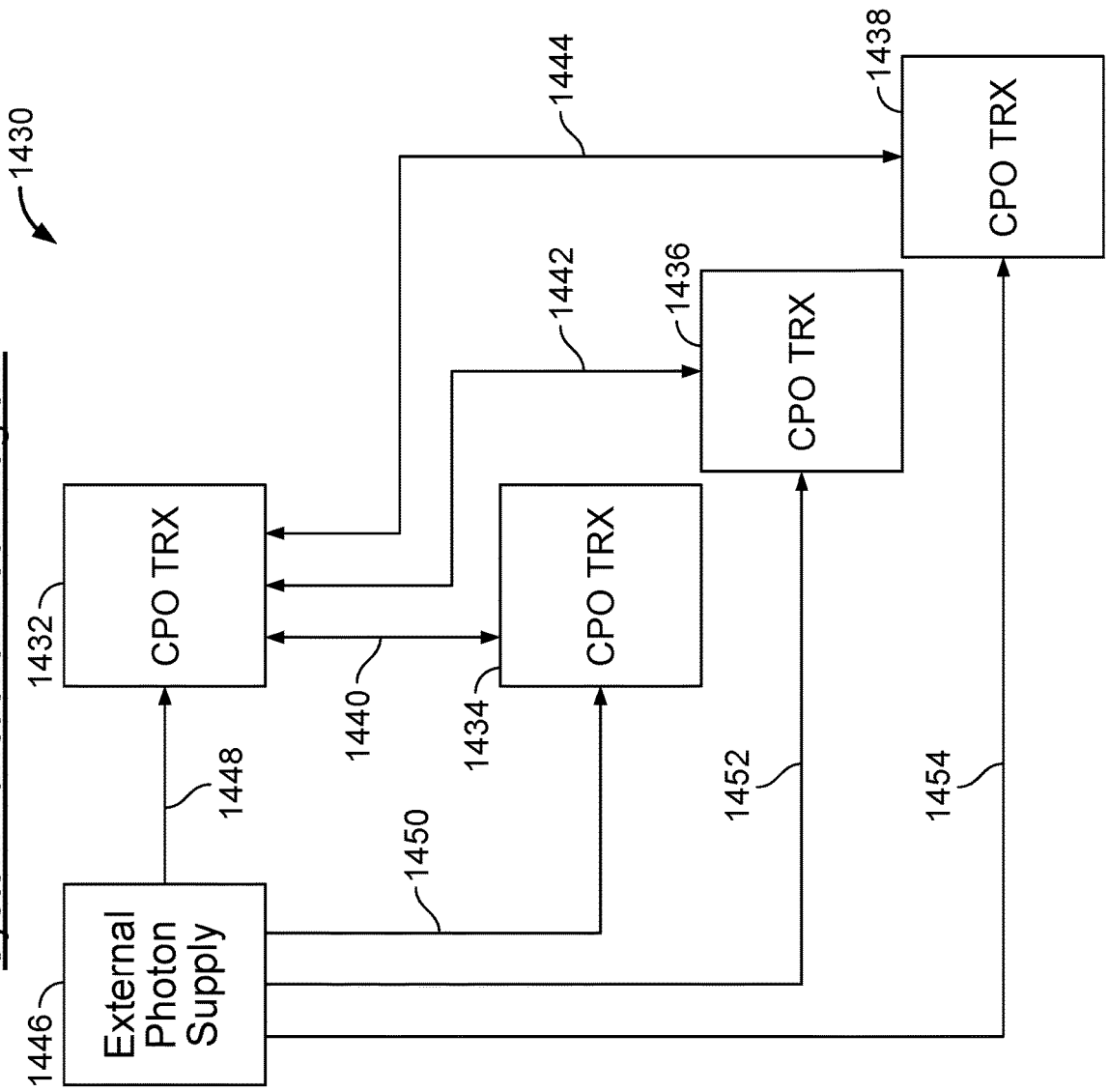
FIG. 16 is a block diagram of an example of an optical communication system.

FIG. 16 is a system functional block diagram of an example of an optical communication system 1430 that includes a first communication transponder 1432, a second communication transponder 1434, a third communication transponder 1436, and a fourth communication transponder 1438. Each of the communication transponders 1432, 1434, 1436, 1438 can be similar to the communication transponders 1282, 1284 of FIG. 12. The first communication transponder 1432 communicates with the second communication transponder 1434 through a first optical link 1440. The first communication transponder 1432 communicates with the third communication transponder 1436 through a second optical link 1442. The first communication transponder 1432 communicates with the fourth communication transponder 1438 through a third optical link 1444.

An external photon supply 1446 provides optical power supply light to the first communication transponder 1432 through a first optical power supply link 1448, provides optical power supply light to the second communication transponder 1434 through a second optical power supply link 1450, provides optical power supply light to the third communication transponder 1436 through a third optical power supply link 1452, and provides optical power supply light to the fourth communication transponder 1438 through a fourth optical power supply link 1454.

FIG. 17A is a diagram of an example of an optical communication system 1460 that includes a first switch box 1462 and a remote server array 1470 that includes a second switch box 1464, a third switch box 1466, and a fourth switch box 1468. The first switch box 1462 includes a vertical ASIC mount grid structure 1310, and a co-packaged optical module 1312 is attached to a receptor of the grid structure 1310. The second switch box 1464 includes a co-packaged optical module 1472, the third switch box 1466 includes a co-packaged optical module 1474, and the third switch box 1468 includes a co-packaged optical module 1476. The first co-packaged optical module 1312 communicates with the co-packaged optical modules 1472, 1474, 1476 through an optical fiber bundle 1478 that later branches out to the co-packaged optical modules 1472, 1474, 1476.

In one example embodiment, the first switch box 1462 includes an external optical power supply 1322 that provides optical power supply light through an optical connector array 1324. In another example embodiment, the optical power supply can be located external to switch box 1462 (cf. 1330, FIG. 80A). Optical fibers 1480 are optically coupled to an optical connector 1482, and the optical power supply 1322 sends optical power supply light through the optical connector 1482 and the optical fibers 1480 to the co-packaged optical modules 1312, 1472, 1474, 1476.

Figure 17C:
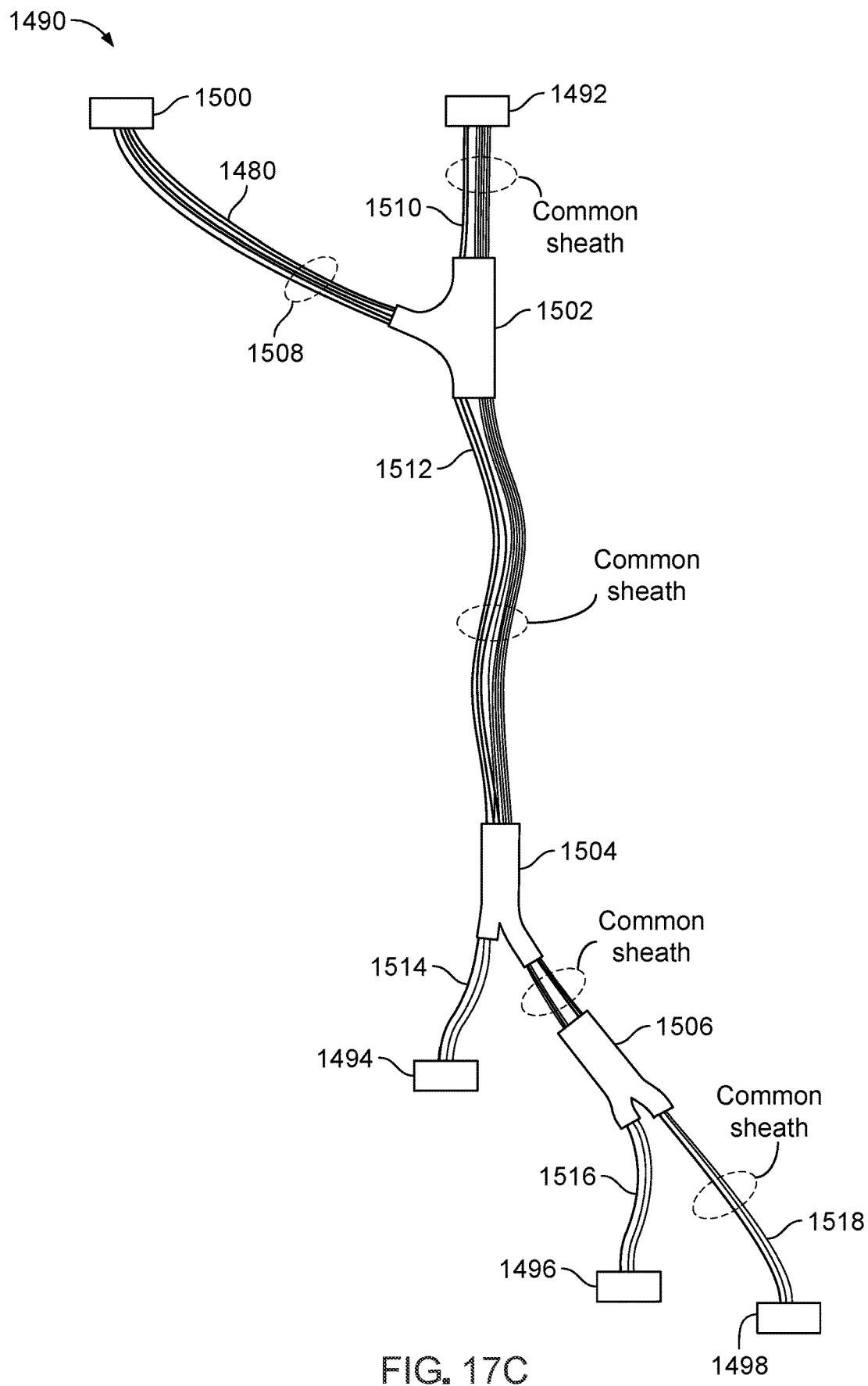
FIG. 17C is an enlarged diagram of the optical cable assembly of FIG. 17B.

FIG. 17B shows an example of an optical cable assembly 1490 that can be used to enable the optical power supply 1322 to provide optical power supply light to the co-packaged optical modules 1312, 1472, 1474, 1476, and enable the co-packaged optical module 1312 to communicate with the co-packaged optical modules 1472, 1474, 1476. The optical cable assembly 1490 includes a first optical fiber connector 1492, a second optical fiber connector 1494, a third optical fiber connector 1496, a fourth optical fiber connector 1498, and a fifth optical fiber connector 1500. The first optical fiber connector 1492 is configured to be optically coupled to the co-packaged optical module 1312. The second optical fiber connector 1494 is configured to be optically coupled to the co-packaged optical module 1472. The third optical fiber connector 1496 is configured to be optically coupled to the co-packaged optical module 1474. The fourth optical fiber connector 1498 is configured to be optically coupled to the co-packaged optical module 1476. The fifth optical fiber connector 1500 is configured to be optically coupled to the optical power supply 1322. FIG. 17C is an enlarged diagram of the optical cable assembly 1490.

In some implementations, the optical cable assembly 1490 includes cable segments, in which each cable segment includes optical fibers laterally encased by a cable sheath. Each cable segment is constructed to permit relative lateral movement of at least some of the optical fibers within the cable sheath to change a cross-sectional shape of the cable segment. In some implementations, the optical fibers are permitted to move laterally relative to one another to become relatively spatially rearranged from a first cross-section of the cable segment to a second cross-section of the cable segment. The cable sheath includes a laterally stretchable material that permits a cross-sectional shape of the cable segment to change in response to movement of the optical fibers within the cable sheath.

Optical fibers that are optically coupled to the optical fiber connectors 1500 and 1492 enable the optical power supply 1322 to provide the optical power supply light to the co-packaged optical module 1312. Optical fibers that are optically coupled to the optical fiber connectors 1500 and 1494 enable the optical power supply 1322 to provide the optical power supply light to the co-packaged optical module 1472. Optical fibers that are optically coupled to the optical fiber connectors 1500 and 1496 enable the optical power supply 1322 to provide the optical power supply light to the co-packaged optical module 1474. Optical fibers that are optically coupled to the optical fiber connectors 1500 and 1498 enable the optical power supply 1322 to provide the optical power supply light to the co-packaged optical module 1476.

Optical fiber guide modules 1502, 1504, 1506, and common sheaths are provided to organize the optical fibers so that they can be easily deployed and managed. The optical fiber guide module 1502 is similar to the optical fiber guide module 1408 of FIG. 15B. The optical fiber guide modules 1504, 1506 are similar to the optical fiber guide module 1350 of FIG. 13B. The common sheaths gather the optical fibers in a bundle so that they can be more easily handled, and the optical fiber guide modules guide the optical fibers so that they extend in various directions toward the devices that need to be optically coupled by the optical cable assembly 1490. The optical fiber guide modules restrict bending of the optical fibers such that the bending radiuses are greater than minimum values specified by the optical fiber manufacturers to prevent excess optical light loss or damage to the optical fibers.

The optical fibers 1480 that extend from the include optical fibers that extend from the optical 1482 are surrounded and protected by a common sheath 1508. At the optical fiber guide module 1502, the optical fibers 1480 separate into a first group of optical fibers 1510 and a second group of optical fibers 1512. The first group of optical fibers 1510 extend to the first optical fiber connector 1492. The second group of optical fibers 1512 extend toward the optical fiber guide modules 1504, 1506, which together function as a 1:3 splitter that separates the optical fibers 1512 into a third group of optical fibers 1514, a fourth group of optical fibers 1516, and a fifth group of optical fibers 1518. The group of optical fibers 1514 extend to the optical fiber connector 1494, the group of optical fibers 1516 extend to the optical fiber connector 1496, and the group of optical fibers 1518 extend to the optical fiber connector 1498. In some examples, instead of using two 1:2 split optical fiber guide modules 1504, 1506, it is also possible to use a 1:3 split optical fiber guide module that has four ports, e.g., one input port and three output ports. In general, separating the optical fibers in a 1:N split (N being an integer greater than 2) can occur in one step or multiple steps.

Figure 18:
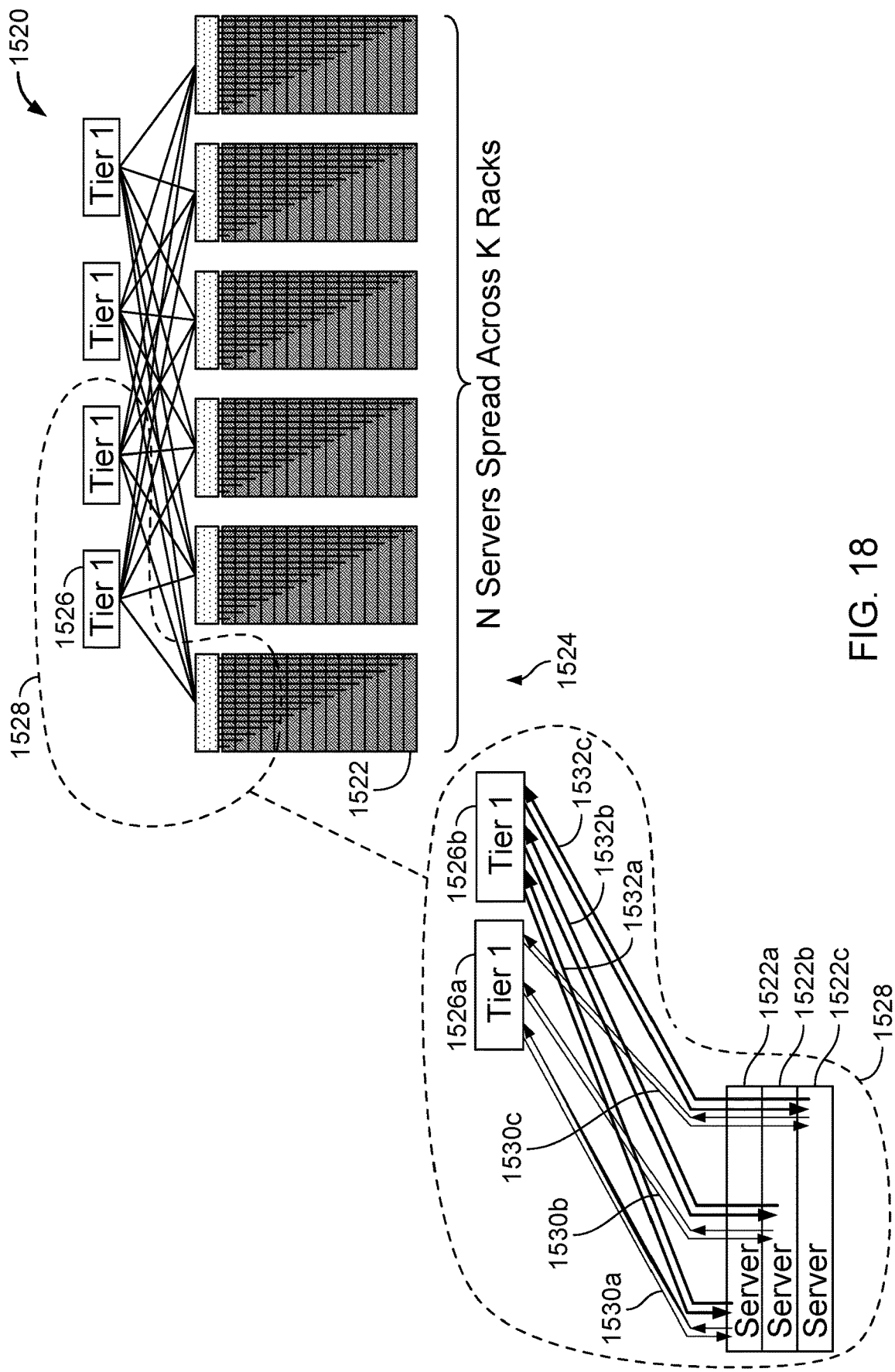
FIGS. 18 to 20B are diagrams of examples of data processing systems.

FIG. 18 is a diagram of an example of a data processing system (e.g., data center) 1520 that includes N servers 1522 spread across K racks 1524. In this example, there are 6 racks 1524, and each rack 1524 includes 15 servers 1522. Each server 1522 directly communicates with a tier 1 switch 1526. The left portion of the figure shows an enlarged view of a portion 1528 of the system 1520. A server 1522*a* directly communicates with a tier 1 switch 1526*a* through a communication link 1530*a*. Similarly, servers 1522*b*, 1522*c* directly communicate with the tier 1 switch 1526*a* through communication links 1530*b*, 1530*c*, respectively. The server 1522*a* directly communicates with a tier 1 switch 1526*b* through a communication link 1532*a*. Similarly, servers 1522*b*, 1522*c* directly communicate with the tier 1 switch 1526*b* through communication links 1532*b*, 1532*c*, respectively. Each communication link can include a pair of optical fibers to allow bi-directional communication. The system 1520 bypasses the conventional top-of-rack switch and can have the advantage of higher data throughput. The system 1520 includes a point-to-point connection between every server 1522 and every tier 1 switch 1526. In this example, there are 4 tier 1 switches 1526, and 4 fiber pairs are used per server 1522 for communicating with the tier 1 switches 1526. Each tier-1 switch 1526 is connected to N servers, so there are N fiber pairs connected to each tier-1 switch 1526.

Figure 19:
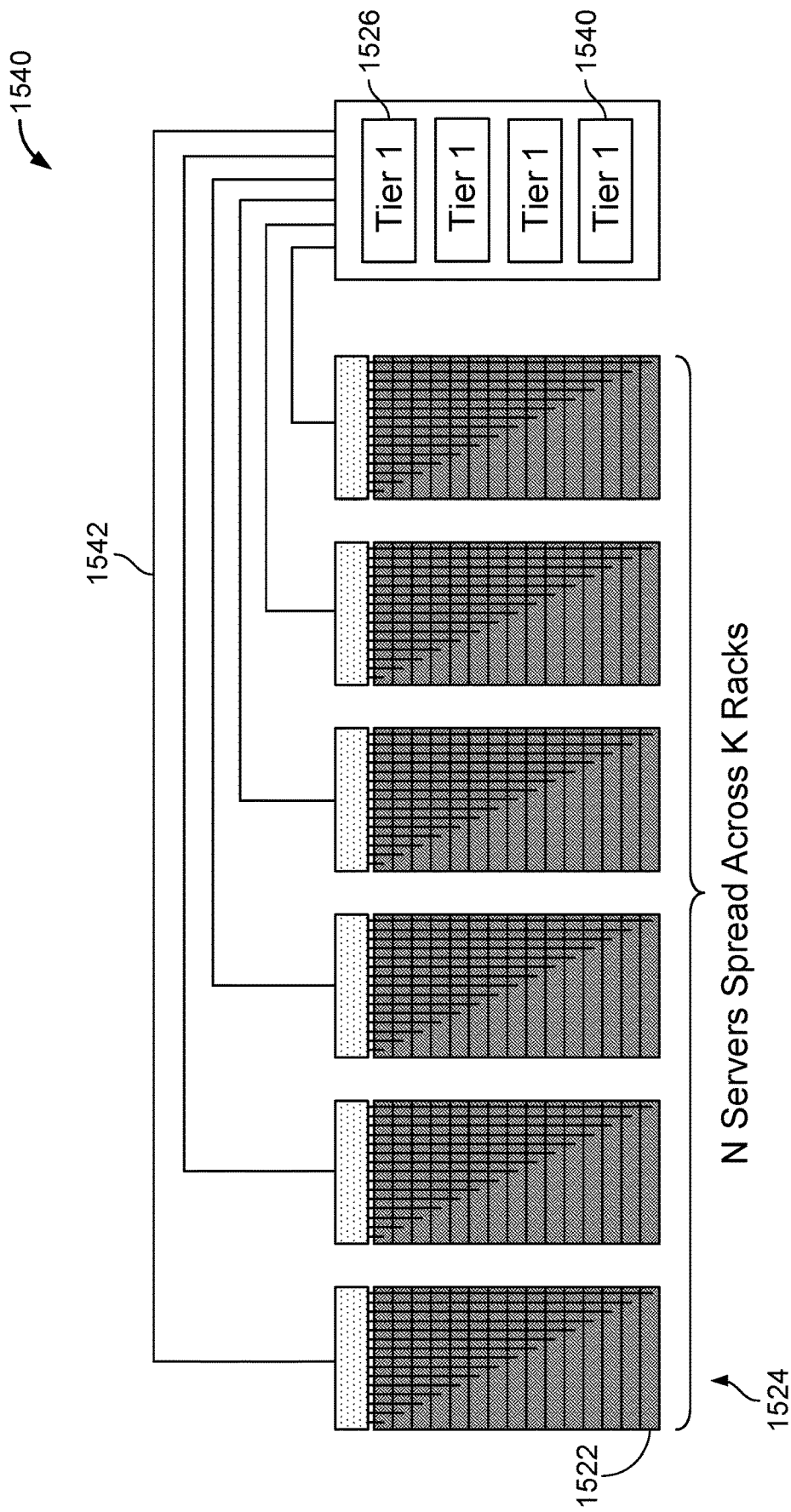

Referring to FIG. 19, in some implementations, a data processing system (e.g., data center) 1540 includes tier-1 switches 1526 that are co-located in a rack 1540 separate from the N servers 1522 that are spread across K racks 1524. Each server 1522 has a direct link to each of the tier-1 switches 1526. In some implementations, there is one fiber cable 1542 (or a small number <<N/K of fiber cables) from the tier-1 switch rack 1540 to each of the K server racks 1524.

Figure 20A:
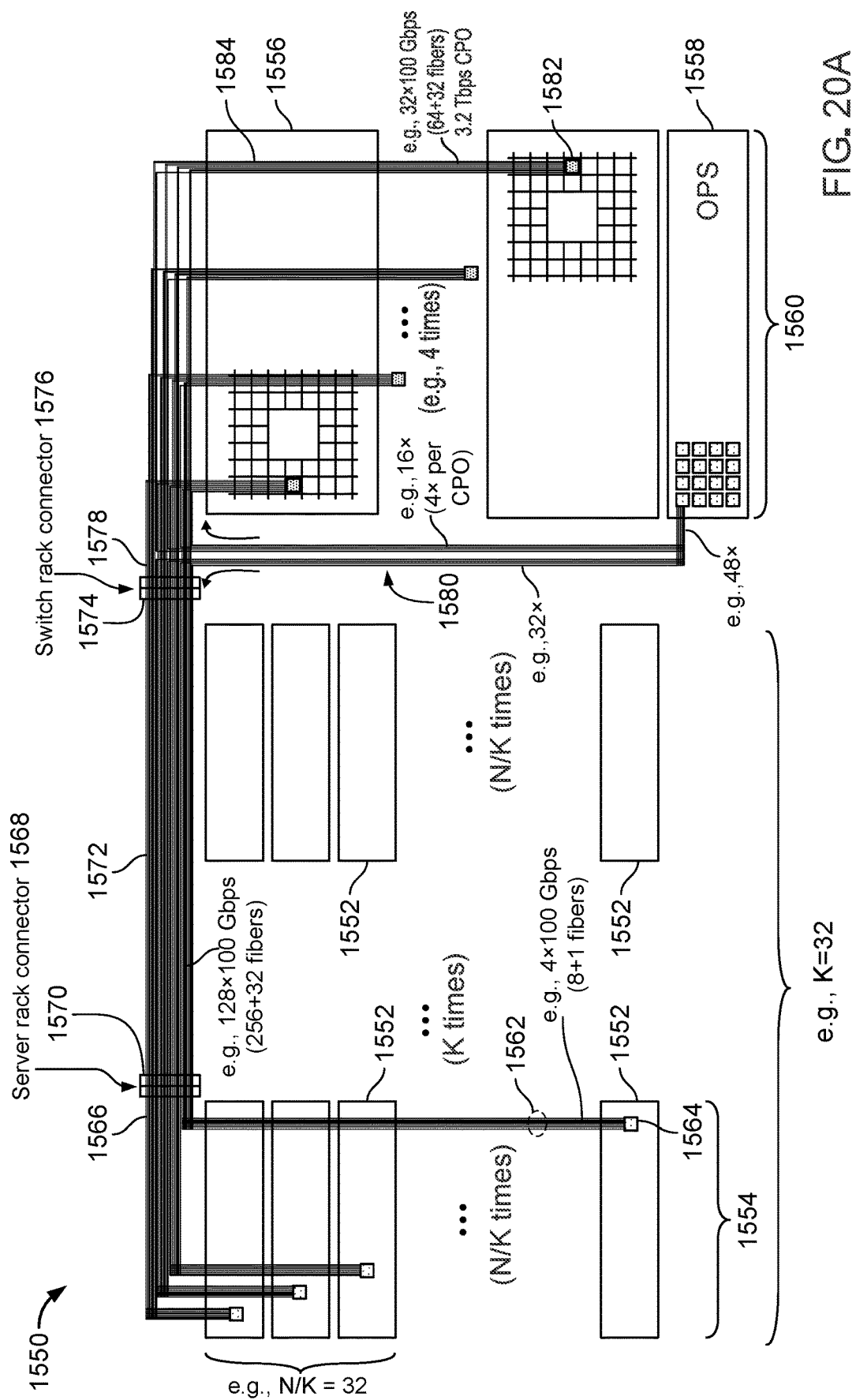

FIG. 20A is a diagram of an example of a data processing system 1550 that includes N=1024 servers 1552 spread across K=32 racks 1554, in which each rack 1554 includes N/K=1024/32=32 servers 1552. There are 4 tier-1 switches 1556 and an optical power supply 1558 that is co-located in a rack 1560.

Optical fibers connect the servers 1552 to the tier-1 switches 1556 and the optical power supply 1558. In this example, a bundle of 9 optical fibers is optically coupled to a co-packaged optical module 1564 of a server 1552, in which 1 optical fiber provides the optical power supply light, and 4 pairs of (a total of 8) optical fibers provide 4 bi-directional communication channels, each channel having a 100 Gbps bandwidth, for a total of 4×100 Gbps bandwidth in each direction. Because there are 32 servers 1552 in each rack 1554, there are a total of 256+32=288 optical fibers that extend from each rack 1554 of servers 1552, in which 32 optical fibers provide the optical power supply light, and 256 optical fibers provide 128 bi-directional communication channels, each channel having a 100 Gbps bandwidth.

For example, at the server rack side, optical fibers 1566 (that are connected to the servers 1552 of a rack 1554) terminate at a server rack connector 1568. At the switch rack side, optical fibers 1578 (that are connected to the switch boxes 1556 and the optical power supply 1558) terminate at a switch rack connector 1576. An optical fiber extension cable 1572 is optically coupled to the server rack side and the switch rack side. The optical fiber extension cable 1572 includes 256+32=288 optical fibers. The optical fiber extension cable 1572 includes a first optical fiber connector 1570 and a second optical fiber connector 1574. The first optical fiber connector 1570 is connected to the server rack connector 1568, and the second optical fiber connector 1574 is connected to the switch rack connector 1576. At the switch rack side, the optical fibers 1578 include 288 optical fibers, of which 32 optical fibers 1580 are optically coupled to the optical power supply 1558. The 256 optical fibers that carry 128 bi-directional communication channels (each channel having a 100 Gbps bandwidth in each direction) are separated into four groups of 64 optical fibers, in which each group of 64 optical fibers is optically coupled to a co-packaged optical module 1582 in one of the switch boxes 1556. The co-packaged optical module 1582 is configured to have a bandwidth of 32×100 Gbps=3.2 Tbps in each direction (input and output). Each switch box 1556 is connected to each server 1552 of the rack 1554 through a pair of optical fibers that carry a bandwidth of 100 Gbps in each direction.

The optical power supply 1558 provides optical power supply light to co-packaged optical modules 1582 at the switch boxes 1556. In this example, the optical power supply 1558 provides optical power supply light through 4 optical fibers to each co-packaged optical module 1582, so that a total of 16 optical fibers are used to provide the optical power supply light to the 4 switch boxes 1556. A bundle of optical fibers 1584 is optically coupled to the co-packaged optical module 1582 of the switch box 1556. The bundle of optical fibers 1584 includes 64+16=80 fibers. In some examples, the optical power supply 1558 can provide additional optical power supply light to the co-packaged optical module 1582 using additional optical fibers. For example, the optical power supply 1558 can provide optical power supply light to the co-packaged optical module 1582 using 32 optical fibers with built-in redundancy.

Figure 20B:
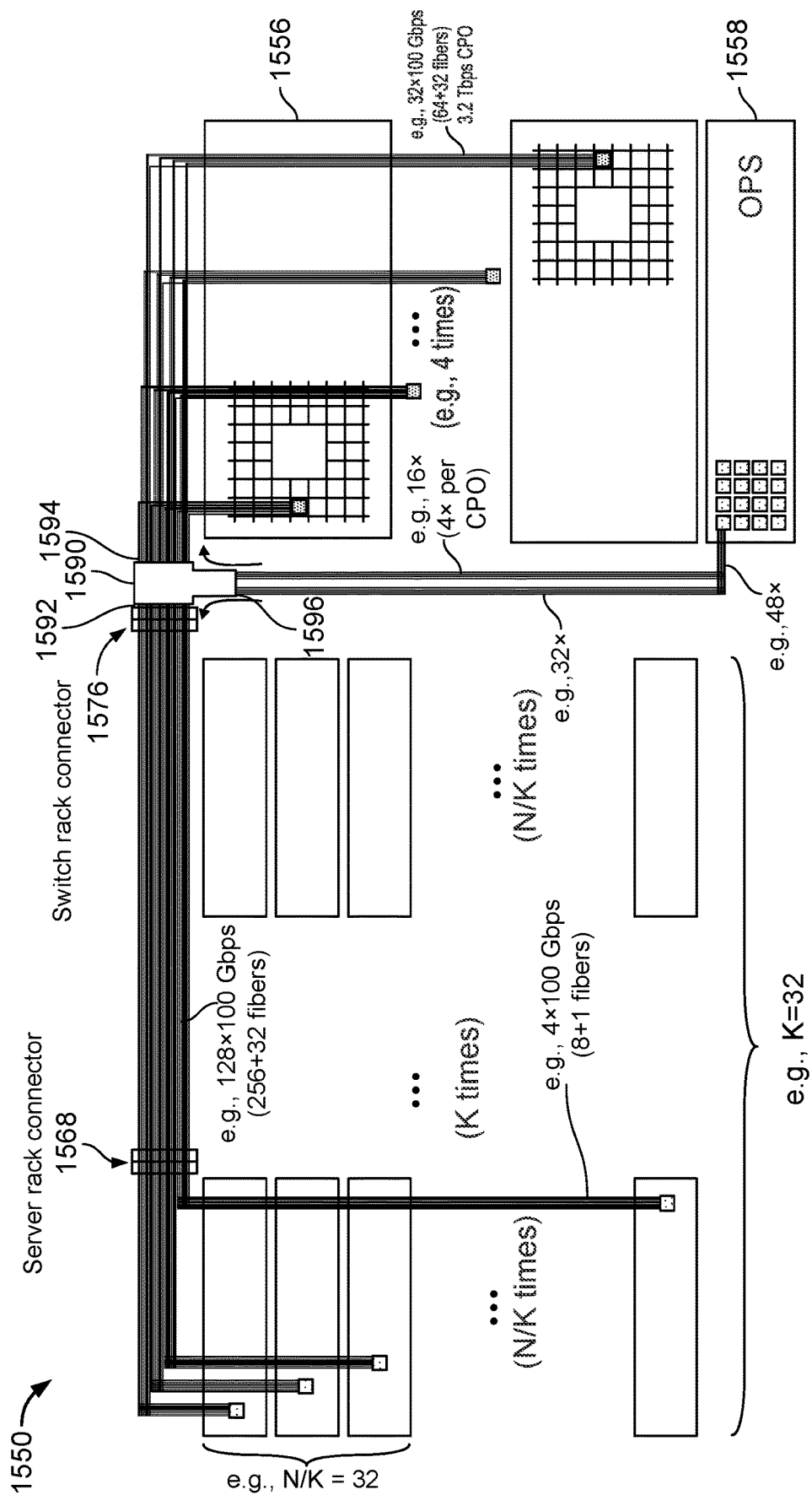

Referring to FIG. 20B, the data processing system 1550 includes an optical fiber guide module 1590 that helps organize the optical fibers so that they are directed to the appropriate directions. The optical fiber guide module 1590 also restricts bending of the optical fibers to be within the specified limits to prevent excess optical light loss or damage to the optical fibers. The optical fiber guide module 1590 includes a first port 1592, a second port 1594, and a third port 1596. The optical fibers that extend outward from the first port 1592 are optically coupled to the switch rack connector 1576. The optical fibers that extend outward from the second port 1594 are optically coupled to the switch boxes. The optical fibers that extend outward from the third port 1596 are optically coupled to the optical power supply 1558.

In some implementations, one or more of fiber-optic cables in FIGS. 20A and 20B each includes a cable segment that has a plurality of optical fibers laterally encased by a cable sheath. The cable segment is constructed to permit relative lateral movement of at least some of the optical fibers within the cable sheath to change a cross-sectional shape of the cable segment. In some implementations, the optical fibers are permitted to move laterally relative to one another to become relatively spatially rearranged from a first cross-section of the cable segment to a second cross-section of the cable segment. The cable sheath includes a laterally stretchable material that permits a cross-sectional shape of the cable segment to change in response to movement of the optical fibers within the cable sheath.

Figure 21:
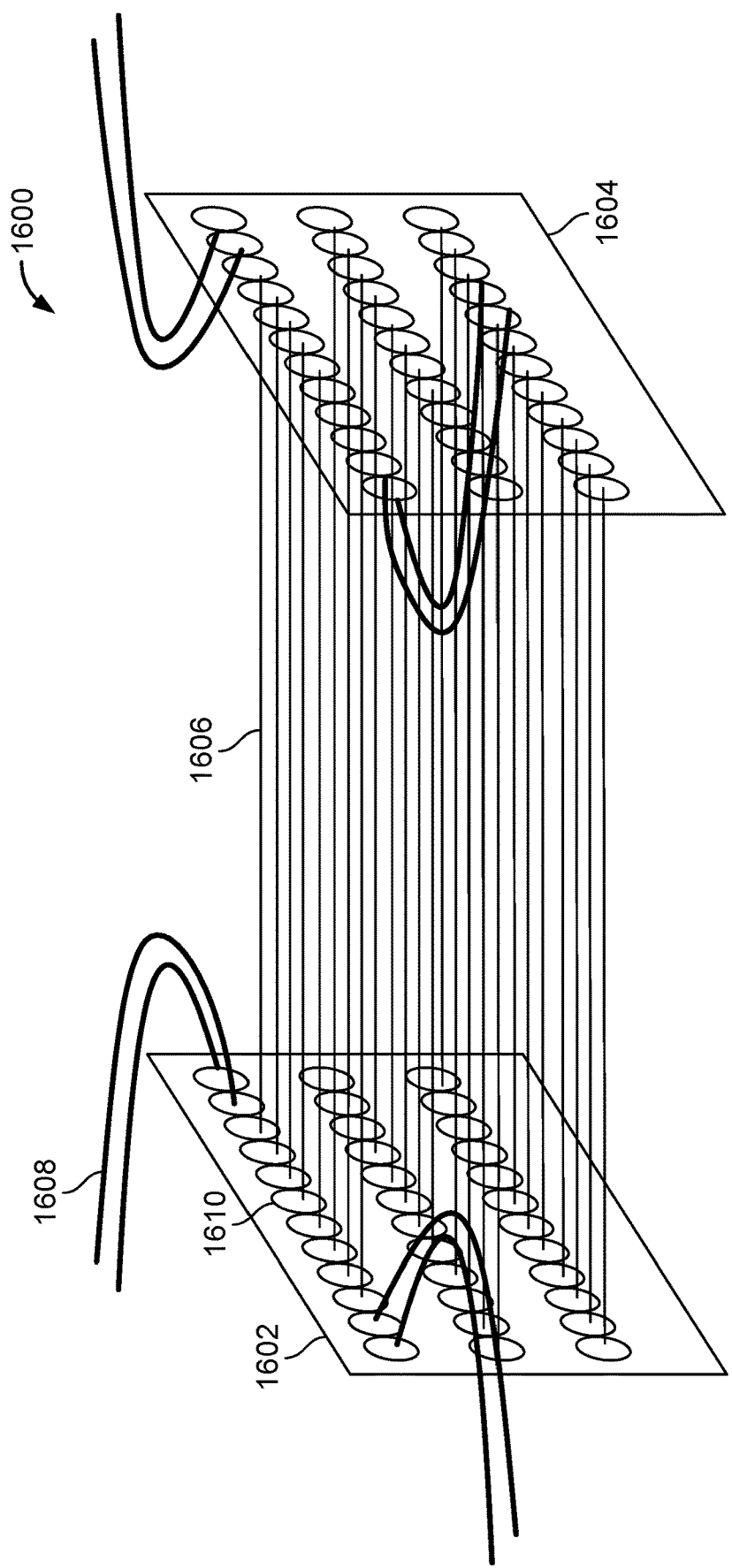
FIG. 21 is a diagram of an example of connector port mapping for an optical fiber interconnection cable.

FIG. 21 is a diagram of an example of the connector port mapping for an optical fiber interconnection cable 1600, which includes a first optical fiber connector 1602, a second optical fiber connector 1604, optical fibers 1606 that transmit data and/or control signals between the first and second optical fiber connectors 1602, 1604, and optical fibers 1608 that transmit optical power supply light. Each optical fiber terminates at an optical fiber port 1610, which can include, e.g., lenses for focusing light entering or exiting the optical fiber port 1610. The first and second optical fiber connectors 1602, 1604 can be, e.g., the optical fiber connectors 1342 and 1344 of FIGS. 13B, 13C, the optical fiber connectors 1402 and 1404 of FIGS. 15B, 15C, or the optical fiber connectors 1570 and 1574 of FIG. 20A. The principles for designing the optical fiber interconnection cable 1600 can be used to design the optical cable assembly 1340 of FIGS. 13B, 13C, the optical cable assembly 1400 of FIGS. 15B, 15C, and the optical cable assembly 1490 of FIGS. 17B, 17C.

In some implementations, a segment of the optical fiber interconnection cable 1600 includes the optical fibers 1606 laterally encased by a cable sheath. The cable segment is constructed to permit relative lateral movement of at least some of the optical fibers within the cable sheath to change a cross-sectional shape of the cable segment. In some implementations, the optical fibers 1606 are permitted to move laterally relative to one another to become relatively spatially rearranged from a first cross-section of the cable segment to a second cross-section of the cable segment. The cable sheath includes a laterally stretchable material that permits a cross-sectional shape of the cable segment to change in response to movement of the optical fibers within the cable sheath.

In the example of FIG. 21, each optical fiber connector 1602 or 1604 includes 3 rows of optical fiber ports, each row including 12 optical fiber ports. Each optical fiber connector 1602 or 1604 includes 4 power supply fiber ports that are connected to optical fibers 1608 that are optically coupled to one or more optical power supplies. Each optical fiber connector 1602 or 1604 includes 32 fiber ports (some of which are transmitter fiber ports, and some of which are receiver fiber ports) that are connected to the optical fibers 1606 for data transmission and reception.

In some implementations, the mapping of the fiber ports of the optical fiber connectors 1602, 1604 are designed such that the interconnection cable 1600 can have the most universal use, in which each fiber port of the optical fiber connector 1602 is mapped to a corresponding fiber port of the optical fiber connector 1604 with a 1-to-1 mapping and without transponder-specific port mapping that would require fibers 1606 to cross over. This means that for an optical transponder that has an optical fiber connector compatible with the interconnection cable 1600, the optical transponder can be connected to either the optical fiber connector 1602 or the optical fiber connector 1604. The mapping of the fiber ports is designed such that each transmitter port of the optical fiber connector 1602 is mapped to a corresponding receiver port of the optical fiber connector 1604, and each receiver port of the optical fiber connector 1602 is mapped to a corresponding transmitter port of the optical fiber connector 1604.

FIG. 22 is a diagram showing an example of the fiber port mapping for an optical fiber interconnection cable 1660 that includes a pair of optical fiber connectors, i.e., a first optical fiber connector 1662 and a second optical fiber connector 1664. The optical fiber connectors 1662 and 1664 are designed such that either the first optical fiber connector 1662 or the second optical fiber connector 1664 can be connected to a given communication transponder that is compatible with the optical fiber interconnection cable 1660. The diagram shows the fiber port mapping when viewed from the outer edge of the optical fiber connector into the optical fiber connector (i.e., toward the optical fibers in the interconnection cable 1660).

The first optical fiber connector 1662 includes transmitter fiber ports (e.g., 1614*a*, 1616*a*), receiver fiber ports (e.g., 1618*a*, 1620*a*), and optical power supply fiber ports (e.g., 1622*a*, 1624*a*). The second optical fiber connector 1664 includes transmitter fiber ports (e.g., 1614*b*, 1616*b*), receiver fiber ports (e.g., 1618*b*, 1620*b*), and optical power supply fiber ports (e.g., 1622*b*, 1624*b*). For example, assume that the first optical fiber connector 1662 is connected to a first optical transponder, and the second optical fiber connector 1664 is connected to a second optical transponder. The first optical transponder transmits first data and/or control signals through the transmitter ports (e.g., 1614*a*, 1616*a*) of the first optical fiber connector 1662, and the second optical transponder receives the first data and/or control signals from the corresponding receiver fiber ports (e.g., 1618*b*, 1620*b*) of the second optical fiber connector 1664. The transmitter ports 1614*a*, 1616*a* are optically coupled to the corresponding receiver fiber ports 1618*b*, 1620*b* through optical fibers 1628, 1630, respectively. The second optical transponder transmits second data and/or control signals through the transmitter ports (e.g., 1614*b*, 1616*b*) of the second optical fiber connector 1664, and the first optical transponder receives the second data and/or control signals from the corresponding receiver fiber ports (1618*a*, 1620*a*) of the first optical fiber connector 1662. The transmitter port 1616*b* is optically coupled to the corresponding receiver fiber port 1620*a* through an optical fiber 1632.

A first optical power supply transmits optical power supply light to the first optical transponder through the power supply fiber ports of the first optical fiber connector 1662. A second optical power supply transmits optical power supply light to the second optical transponder through the power supply fiber ports of the second optical fiber connector 1664. The first and second power supplies can be different (such as the example of FIG. 13B) or the same (such as the example of FIG. 15B).

In the following description, when referring to the rows and columns of fiber ports of the optical fiber connector, the uppermost row is referred to as the $1^{st}$ row, the second uppermost row is referred to as the $2^{nd}$ row, and so forth. The leftmost column is referred to as the $1^{st}$ column, the second leftmost column is referred to as the $2^{nd}$ column, and so forth.

For an optical fiber interconnection cable having a pair of optical fiber connectors (i.e., a first optical fiber connector and a second optical fiber connector) to be universal, i.e., either one of the pair of optical fiber connectors can be connected to a given optical transponder, the arrangement of the transmitter fiber ports, the receiver fiber ports, and the power supply fiber ports in the optical fiber connectors have a number of properties. These properties are referred to as the "universal optical fiber interconnection cable port mapping properties." The term "mapping" here refers to the arrangement of the transmitter fiber ports, the receiver fiber ports, and the power supply fiber ports at particular locations within the optical fiber connector. The first property is that the mapping of the transmitter, receiver, and power supply fiber ports in the first optical fiber connector is the same as the mapping of the transmitter, receiver, and power supply fiber ports in the second optical fiber connector (as in the example of FIG. 22).

In the example of FIG. 22, the individual optical fibers connecting the transmitter, receiver, and power supply fiber ports in the first optical fiber connector to the transmitter, receiver, and power supply fiber ports in the second optical fiber connector are parallel to one another.

In some implementations, each of the optical fiber connectors includes a unique marker or mechanical structure, e.g., a pin, that is configured to be at the same spot on the co-packaged optical module, similar to the use of a "dot" to denote "pin 1" on electronic modules. In some examples, such as those shown in FIGS. 22 and 23, the larger distance from the bottom row (the third row in the examples of FIGS.

22 and 23) to the connector edge can be used as a "marker" to guide the user to attach the optical fiber connector to the co-packaged optical module connector in a consistent manner.

The mapping of the fiber ports of the optical fiber connectors of a "universal optical fiber interconnection cable" has a second property: When mirroring the port map of an optical fiber connector and replacing each transmitter port with a receiver port as well as replacing each receiver port with a transmitter port in the mirror image, the original port mapping is recovered. The mirror image can be generated with respect to a reflection axis at either connector edge, and the reflection axis can be parallel to the row direction or the column direction. The power supply fiber ports of the first optical fiber connector are mirror images of the power supply fiber ports of the second optical fiber connector.

The transmitter fiber ports of the first optical fiber connector and the receiver fiber ports of the second optical fiber connector are pairwise mirror images of each other, i.e., each transmitter fiber port of the first optical fiber connector is mirrored to a receiver fiber port of the second optical fiber connector. The receiver fiber ports of the first optical fiber connector and the transmitter fiber ports of the second optical fiber connector are pairwise mirror images of each other, i.e., each receiver fiber port of the first optical fiber connector is mirrored to a transmitter fiber port of the second optical fiber connector.

Another way of looking at the second property is as follows: Each optical fiber connector is transmitter port-receiver port (TX-RX) pairwise symmetric and power supply port (PS) symmetric with respect to one of the main or center axes, which can be parallel to the row direction or the column direction. For example, if an optical fiber connector has an even number of columns, the optical fiber connector can be divided along a center axis parallel to the column direction into a left half portion and a right half portion. The power supply fiber ports are symmetric with respect to the main axis, i.e., if there is a power supply fiber port in the left half portion of the optical fiber connector, there will also be a power supply fiber port at the mirror location in the right half portion of the optical fiber connector. The transmitter fiber ports and the receiver fiber ports are pairwise symmetric with respect to the main axis, i.e., if there is a transmitter fiber port in the left half portion of the optical fiber connector, there will be a receiver fiber port at a mirror location in the right half portion of the optical fiber connector. Likewise, if there is a receiver fiber port in the left half portion of the optical fiber connector, there will be a transmitter fiber port at a mirror location in the right half portion of the optical fiber connector.

For example, if an optical fiber connector has an even number of rows, the optical fiber connector can be divided along a center axis parallel to the row direction into an upper half portion and a lower half portion. The power supply fiber ports are symmetric with respect to the main axis, i.e., if there is a power supply fiber port in the upper half portion of the optical fiber connector, there will also be a power supply fiber port at the mirror location in the lower half portion of the optical fiber connector. The transmitter fiber ports and the receiver fiber ports are pairwise symmetric with respect to the main axis, i.e., if there is a transmitter fiber port in the upper half portion of the optical fiber connector, there will be a receiver fiber port at a mirror location in the lower half portion of the optical fiber connector. Likewise, if there is a receiver fiber port in the upper half portion of the optical fiber connector, there will be a transmitter fiber port at a mirror location in the lower half portion of the optical fiber connector.

The mapping of the transmitter fiber ports, receiver fiber ports, and power supply fiber ports follow a symmetry requirement that can be summarized as follows:

(i) Mirror all ports on either one of the two connector edges.
(ii) Swap TX (transmitter) and RX (receiver) functionality on the mirror image.
(iii) Leave mirrored PS (power supply) ports as PS ports.
(iv) The resulting port map is the same as the original one.

Essentially, a viable port map is TX-RX pairwise symmetric and PS symmetric with respect to one of the main axes.

The properties of the mapping of the fiber ports of the optical fiber connectors can be mathematically expressed as follows:

Port matrix M with entries PS=0, TX=+1 RX=−1;

Column-mirror operation $\vec{M}$;
Row-mirror operation $\updownarrow$;

→ A viable port map either satisfies $-\vec{M}$=M or $-\updownarrow$ M=M.

In some implementations, if a universal optical fiber interconnection cable has a first optical fiber connector and a second optical fiber connector that are mirror images of each other after swapping the transmitter fiber ports to receiver fiber ports and swapping the receiver fiber ports to transmitter fiber ports in the mirror image, and the mirror image is generated with respect to a reflection axis parallel to the column direction, as in the example of FIG. 22, then each optical fiber connector should be TX-RX pairwise symmetric and PS symmetric with respect to a center axis parallel to the column direction. If a universal optical fiber interconnection cable has a first optical fiber connector and a second optical fiber connector that are mirror images of each other after swapping the transmitter and receiver fiber ports in the mirror image, and the mirror image is generated with respect to a reflection axis parallel to the row direction, as in the example of FIG. 23, then each optical fiber connector should be TX-RX pairwise symmetric and PS symmetric with respect to a center axis parallel to the row direction.

In some implementations, a universal optical fiber interconnection cable:
a. Comprises n_trx strands of TX/RX fibers and n_p strands of power supply fibers, in which 0≤n_p≤n_trx.
b. The n_trx strands of TX/RX fibers are mapped 1:1 from a first optical fiber connector to the same port positions on a second optical fiber connector through the optical fiber cable, i.e. the optical fiber cable can be laid out in a straight manner without leading to any cross-over fiber strands.
c. Those connector ports that are not 1:1 connected by TX/RX fibers may be connected to power supply fibers via a break-out cable.

In some implementations, a universal optical module connector has the following properties:
d. Starting from a connector port map PM0.
e. First mirror port map PM0 either across the row dimension or across the column dimension.
f. Mirroring can be done either across a column axis or across a row axis.
g. Replace TX ports by RX ports and vice versa.
h. If at least one mirrored and replaced version of the port map again results in the starting port map PM0, the connector is called a universal optical module connector.

In FIG. 22, the arrangement of the transmitter, receiver, and power supply fiber ports in the first optical fiber connector 1662, and the arrangement of the transmitter, receiver, and power supply fiber ports in the second optical fiber connector 1664 have the two properties described above. First property: When looking into the optical fiber connector (from the outer edge of the connector inward toward the optical fibers), the mapping of the transmitter, receiver, and power supply fiber ports in the first optical fiber connector 1662 is the same as the mapping of the transmitter, receiver, and power supply fiber ports in the optical fiber connector 1664. Row 1, column 1 of the optical fiber connector 1662 is a power supply fiber port (1622a), and row 1, column 1 of the optical fiber connector 1664 is also a power supply fiber port (1622b). Row 1, column 3 of the optical fiber connector 1662 is a transmitter fiber port (1614a), and row 1, column 3 of the optical fiber connector 1664 is also a transmitter fiber port (1614b). Row 1, column 10 of the optical fiber connector 1662 is a receiver fiber port (1618a), and row 1, column 10 of the optical fiber connector 1664 is also a receiver fiber port (1618b), and so forth.

The optical fiber connectors 1662 and 1664 have the second universal optical fiber interconnection cable port mapping property described above. The port mapping of the optical fiber connector 1662 is a mirror image of the port mapping of the optical fiber connector 1664 after swapping each transmitter port to a receiver port and swapping each receiver port to a transmitter port in the mirror image. The mirror image is generated with respect to a reflection axis 1626 at the connector edge that is parallel to the column direction. The power supply fiber ports (e.g., 1662a, 1624a) of the optical fiber connector 1662 are mirror images of the power supply fiber ports (e.g., 1622b, 1624b) of the optical fiber connector 1664. The transmitter fiber ports (e.g., 1614a, 1616a) of the optical fiber connector 1662 and the receiver fiber ports (e.g., 1618b, 1620b) of the optical fiber connector 1664 are pairwise mirror images of each other, i.e., each transmitter fiber port (e.g., 1614a, 1616a) of the optical fiber connector 1662 is mirrored to a receiver fiber port (e.g., 1618b, 1620b) of the optical fiber connector 1664. The receiver fiber ports (e.g., 1618a, 1620a) of the optical fiber connector 1662 and the transmitter fiber ports (e.g., 1618b, 1620b) of the optical fiber connector 1664 are pairwise mirror images of each other, i.e., each receiver fiber port (e.g., 1618a, 1620a) of the optical fiber connector 1662 is mirrored to a transmitter fiber port (e.g., 1618b, 1620b) of the optical fiber connector 1664.

For example, the power supply fiber port 1622a at row 1, column 1 of the optical fiber connector 1662 is a mirror image of the power supply fiber port 1624b at row 1, column 12 of the optical fiber connector 1664 with respect to the reflection axis 1626. The power supply fiber port 1624a at row 1, column 12 of the optical fiber connector 1662 is a mirror image of the power supply fiber port 1622b at row 1, column 1 of the optical fiber connector 1664. The transmitter fiber port 1614a at row 1, column 3 of the optical fiber connector 1662 and the receiver fiber port 1618b at row 1, column 10 of the optical fiber connector 1604 are pairwise mirror images of each other. The receiver fiber port 1618a at row 1, column 10 of the optical fiber connector 1662 and the transmitter fiber port 1614b at row 1, column 3 of the optical fiber connector 1664 are pairwise mirror images of each other. The transmitter fiber port 1616a at row 3, column 3 of the optical fiber connector 1662 and the receiver fiber port 1620b at row 3, column 10 of the optical fiber connector 1664 are pairwise mirror images of each other. The receiver fiber port 1620a at row 3, column 10 of the optical fiber connector 1662 and the transmitter fiber port 1616b at row 3, column 3 of the optical fiber connector 1664 are pairwise mirror images of each other.

In addition, and as an alternate view of the second property, each optical fiber connector 1662, 1664 is TX-RX pairwise symmetric and PS symmetric with respect to the center axis that is parallel to the column direction. Using the first optical fiber connector 1662 as an example, the power supply fiber ports (e.g., 1622a, 1624a) are symmetric with respect to the center axis, i.e., if there is a power supply fiber port in the left half portion of the first optical fiber connector 1662, there will also be a power supply fiber port at the mirror location in the right half portion of the first optical fiber connector 1662. The transmitter fiber ports and the receiver fiber ports are pairwise symmetric with respect to the main axis, i.e., if there is a transmitter fiber port in the left half portion of the first optical fiber connector 1662, there will be a receiver fiber port at a mirror location in the right half portion of the first optical fiber connector 1662. Likewise, if there is a receiver fiber port in the left half portion of the optical fiber connector 1662, there will be a transmitter fiber port at a mirror location in the right half portion of the optical fiber connector 1662.

If the port mapping of the first optical fiber connector 1662 is represented by port matrix M with entries PS=0, TX=+1, RX=−1, then $-\overleftrightarrow{M}$=M, in which $\overleftrightarrow{M}$ represents the column-mirror operation, e.g., generating a mirror image with respect to the reflection axis 1626.

FIG. 23 is a diagram showing another example of the fiber port mapping for an optical fiber interconnection cable 1670 that includes a pair of optical fiber connectors, i.e., a first optical fiber connector 1672 and a second optical fiber connector 1674. In the diagram, the port mapping for the second optical fiber connector 1674 is the same as that of optical fiber connector 1672. The optical fiber interconnection cable 1670 has the two universal optical fiber interconnection cable port mapping properties described above.

First property: The mapping of the transmitter, receiver, and power supply fiber ports in the first optical fiber connector 1672 is the same as the mapping of the transmitter, receiver, and power supply fiber ports in the second optical fiber connector 1674.

Second property: The port mapping of the first optical fiber connector 1672 is a mirror image of the port mapping of the second optical fiber connector 1674 after swapping each transmitter port to a receiver port and swapping each receiver port to a transmitter port in the mirror image. The mirror image is generated with respect to a reflection axis 1640 at the connector edge parallel to the row direction.

Alternative view of the second property: Each of the first and second optical fiber connectors 1672, 1674 is TX-RX pairwise symmetric and PS symmetric with respect to the central axis that is parallel to the row direction. For example, the optical fiber connector 1672 can be divided in two halves along a central axis parallel to the row direction. The power supply fiber ports (e.g., 1678, 1680) are symmetric with respect to the center axis. The transmitter fiber ports (e.g., 1682, 1684) and the receiver fiber ports (e.g., 1686, 1688) are pairwise symmetric with respect to the center axis, i.e., if there is a transmitter fiber port (e.g., 1682 or 1684) in the upper half portion of the first optical fiber connector 1672, then there will be a receiver fiber port (e.g., 1686, 1688) at a mirror location in the lower half of the optical fiber connector 1672. Likewise, if there is a receiver fiber port in the upper half portion of the optical fiber connector 1672, then there is a transmitter fiber port at a mirror location in the lower half portion of the optical fiber connector 1672. In the example of FIG. 23, the middle row 1690 should all be power supply fiber ports.

In general, if the port mapping of the first optical fiber connector is a mirror image of the port mapping of the second optical fiber connector after swapping the transmitter and receiver ports in the mirror image, the mirror image is generated with respect to a reflection axis at the connector edge parallel to the row direction (as in the example of FIG. 90), and there is an odd number of rows in the port matrix, then the center row should all be power supply fiber ports. If the port mapping of the first optical fiber connector is a mirror image of the port mapping of the second optical fiber connector after swapping the transmitter and receiver ports in the mirror image, the mirror image is generated with respect to a reflection axis at the connector edge parallel to the column direction, and there is an odd number of columns in the port matrix, then the center column should all be power supply fiber ports.

Figure 24:
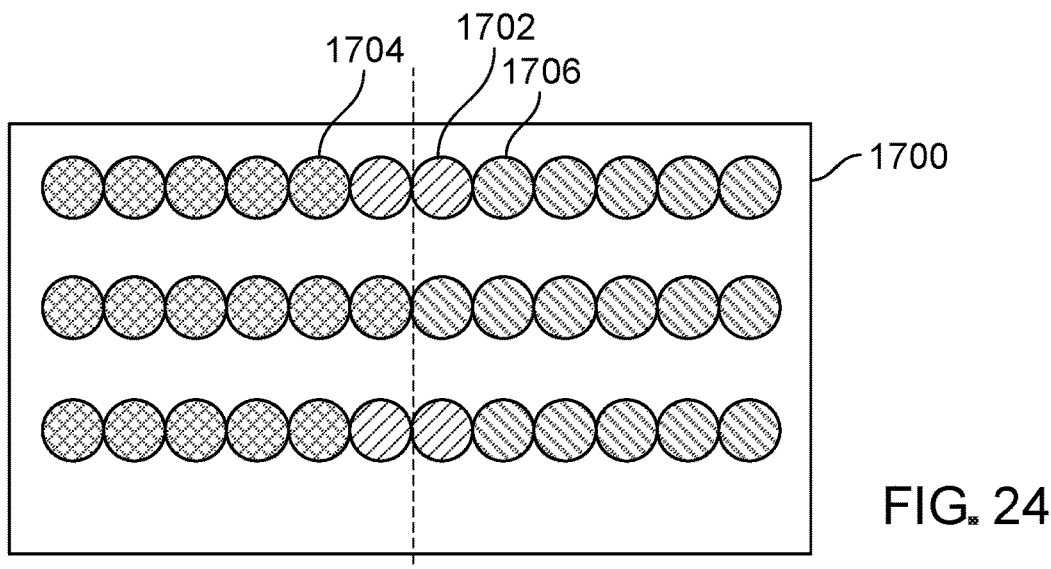
FIGS. 24 and 25 are diagrams of examples of viable port mapping for optical fiber connectors of universal optical fiber interconnection cables.

FIG. 24 is a diagram of an example of a viable port mapping for an optical fiber connector 1700 of a universal optical fiber interconnection cable. The optical fiber connector 1700 includes power supply fiber ports (e.g., 1702), transmitter fiber ports (e.g., 1704), and receiver fiber ports (e.g., 1706). The optical fiber connector 1700 is TX-RX pairwise symmetric and PS symmetric with respect to the center axis that is parallel to the column direction.

Figure 25:
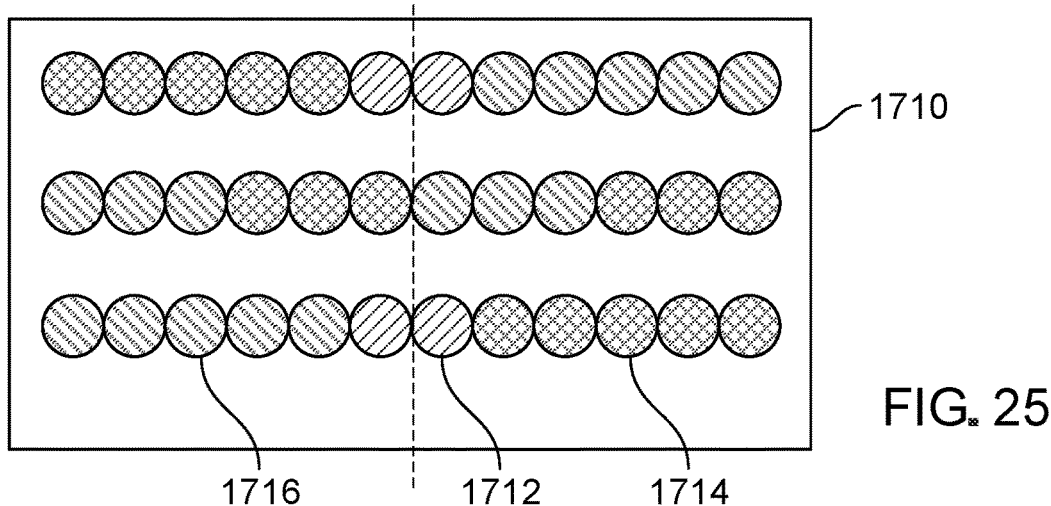

FIG. 25 is a diagram of an example of a viable port mapping for an optical fiber connector 1710 of a universal optical fiber interconnection cable. The optical fiber connector 1710 includes power supply fiber ports (e.g., 1712), transmitter fiber ports (e.g., 1714), and receiver fiber ports (e.g., 1716). The optical fiber connector 1710 is TX-RX pairwise symmetric and PS symmetric with respect to the center axis that is parallel to the column direction.

Figure 26:
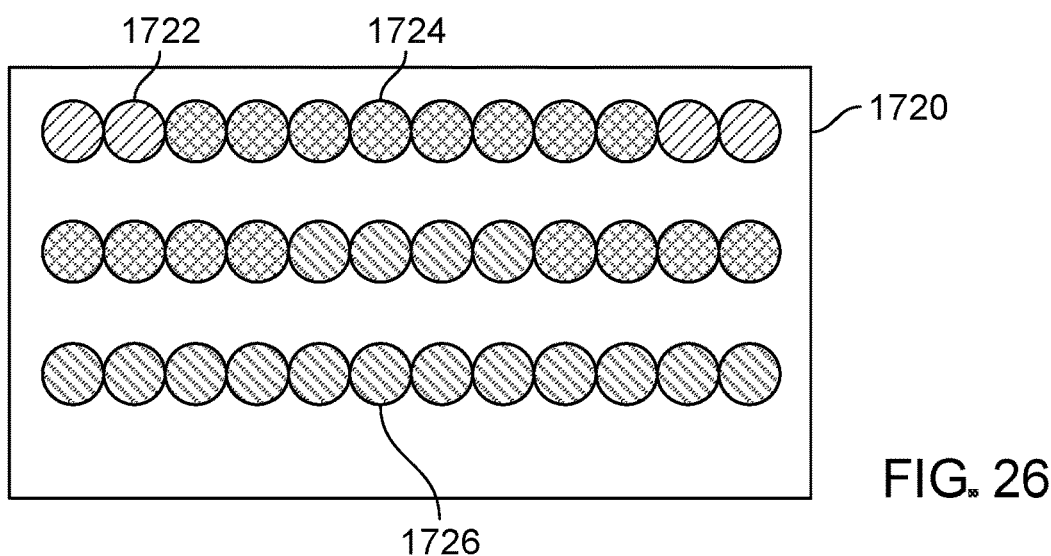
FIG. 26 is a diagram of an example of a port mapping for an optical fiber connector that is not appropriate for a universal optical fiber interconnection cable.

FIG. 26 is a diagram of an example of a port mapping for an optical fiber connector 1720 that is not appropriate for a universal optical fiber interconnection cable. The optical fiber connector 1720 includes power supply fiber ports (e.g., 1722), transmitter fiber ports (e.g., 1724), and receiver fiber ports (e.g., 1726). The optical fiber connector 1720 is not TX-RX pairwise symmetric with respect to the center axis that is parallel to the column direction, or the center axis that is parallel to the row direction.

Figure 27:
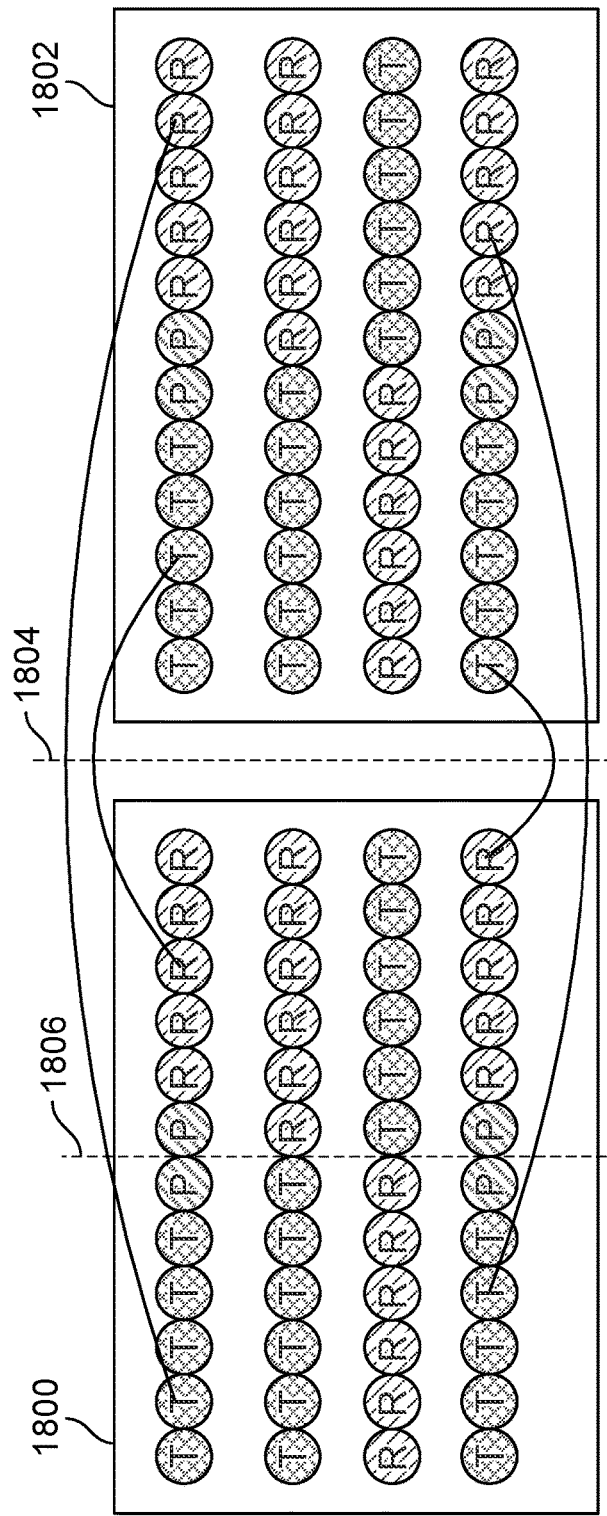
FIGS. 27 and 28 are diagrams of examples of viable port mapping for optical fiber connectors of universal optical fiber interconnection cables.

FIG. 27 is a diagram of an example of a viable port mapping for a universal optical fiber interconnection cable that includes a pair of optical fiber connectors, i.e., a first optical fiber connector 1800 and a second optical fiber connector 1802. The mapping of the transmitter, receiver, and power supply fiber ports in the first optical fiber connector 1800 is the same as the mapping of the transmitter, receiver, and power supply fiber ports in the second optical fiber connector 1802. The port mapping of the first optical fiber connector 1800 is a mirror image of the port mapping of the second optical fiber connector 1802 after swapping the transmitter and receiver ports in the mirror image. The mirror image is generated with respect to a reflection axis 1804 at the connector edge parallel to the column direction. The optical fiber connector 1800 is TX-RX pairwise symmetric and PS symmetric with respect to the center axis 1806 that is parallel to the column direction.

Figure 28:
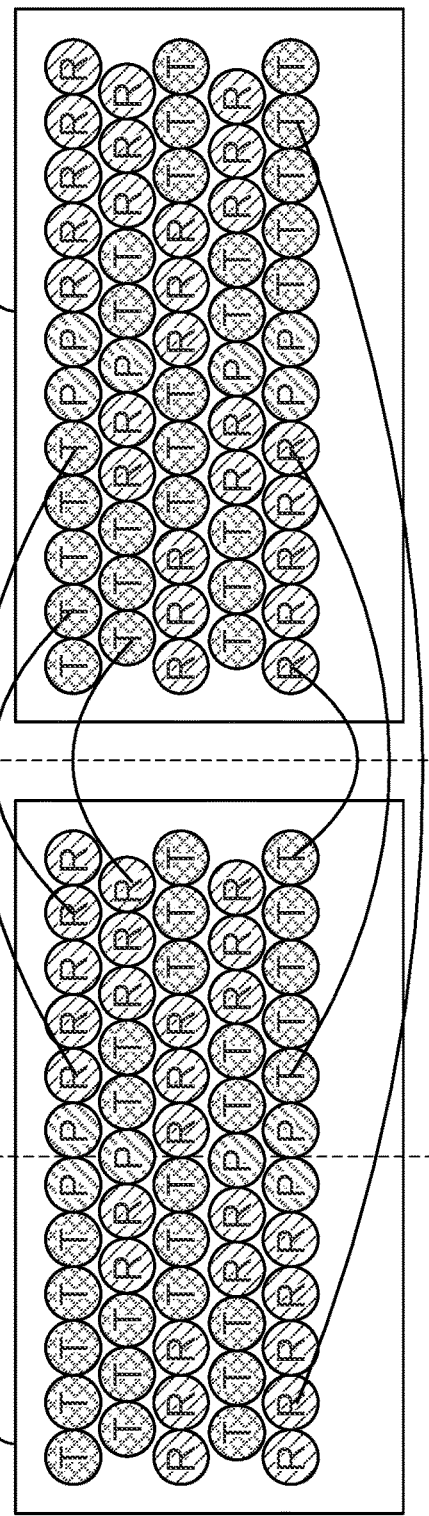

FIG. 28 is a diagram of an example of a viable port mapping for a universal optical fiber interconnection cable that includes a pair of optical fiber connectors, i.e., a first optical fiber connector 1810 and a second optical fiber connector 1812. The mapping of the transmitter, receiver, and power supply fiber ports in the first optical fiber connector 1810 is the same as the mapping of the transmitter, receiver, and power supply fiber ports in the second optical fiber connector 1812. The port mapping of the first optical fiber connector 1810 is a mirror image of the port mapping of the second optical fiber connector 1812 after swapping the transmitter and receiver ports in the mirror image. The mirror image is generated with respect to a reflection axis 1814 at the connector edge parallel to the column direction. The optical fiber connector 1810 is TX-RX pairwise symmetric and PS symmetric with respect to the center axis 1816 that is parallel to the column direction.

In the example of FIG. 28, the first, third, and fifth rows each has an even number of fiber ports, and the second and fourth rows each has an odd number of fiber ports. In general, a viable port mapping for a universal optical fiber interconnection cable can be designed such that an optical fiber connector includes (i) rows that all have even numbers of fiber ports, (ii) rows that all have odd numbers of fiber ports, or (iii) rows that have mixed even and odd numbers of fiber ports. A viable port mapping for a universal optical fiber interconnection cable can be designed such that an optical fiber connector includes (i) columns that all have even numbers of fiber ports, (ii) columns that all have odd numbers of fiber ports, or (iii) columns that have mixed even and odd numbers of fiber ports.

The optical fiber connector of a universal optical fiber interconnection cable does not have be a rectangular shape as shown in the examples of FIGS. 22, 23, 25 to 28. The optical fiber connectors can also have an overall triangular, square, pentagonal, hexagonal, trapezoidal, circular, oval, or n-sided polygon shape, in which n is an integer larger than 6, as long as the arrangement of the transmitter, receiver, and power supply fiber ports in the optical fiber connectors have the three universal optical fiber interconnection cable port mapping properties described above.

In the examples of FIGS. 13A, 15A, 17A, and 20A, the switch boxes (e.g., 1302, 1304) includes co-packaged optical modules (e.g., 1312, 1316) that is optically coupled to the optical fiber interconnection cables or optical cable assemblies (e.g., 1340, 1400, 1490) through fiber array connectors. For example, the fiber array connector can correspond to a first optical connector part, and the optical fiber connector (e.g., 1342, 1344, 1402, 1404, 1492, 1498) of the optical cable assembly can correspond to a second optical connector part. The port map (i.e., mapping of power supply fiber ports, transmitter fiber ports, and receiver fiber ports) of the fiber array connector (which is optically coupled to the photonic integrated circuit) is a mirror image of the port map of the optical fiber connector (which is optically coupled to the optical fiber interconnection cable). The port map of the fiber array connector refers to the arrangement of the power supply, transmitter, and receiver fiber ports when viewed from an external edge of the fiber array connector into the fiber array connector.

As described above, universal optical fiber connectors have symmetrical properties, e.g., each optical fiber connector is TX-RX pairwise symmetric and PS symmetric with respect to one of the main or center axes, which can be parallel to the row direction or the column direction. The fiber array connector also has the same symmetrical properties, e.g., each fiber array connector is TX-RX pairwise symmetric and PS symmetric with respect to one of the main or center axes, which can be parallel to the row direction or the column direction.

In some implementations, a restriction can be imposed on the port mapping of the optical fiber connectors of the optical cable assembly such that the optical fiber connector can be pluggable when rotated by 180 degrees, or by 90 degrees in the case of a square connector. This results in further port mapping constraints.

Figure 29:
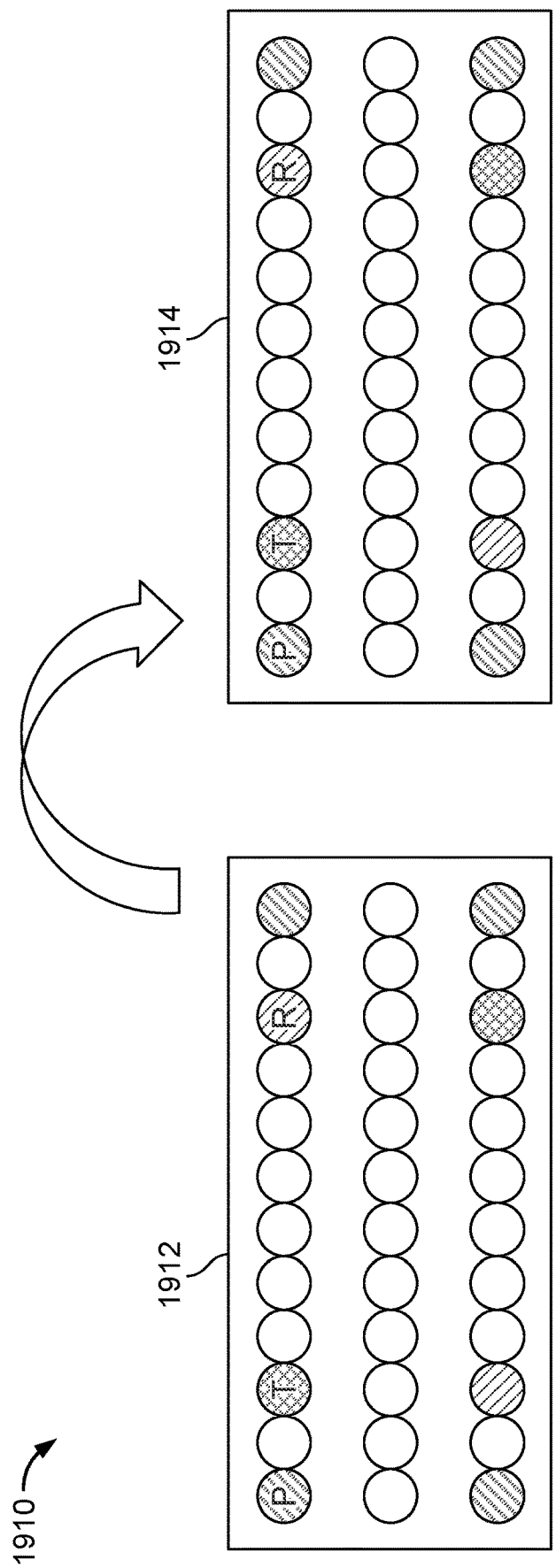
FIGS. 29, 30, 31A, and 31B are diagrams of examples of optical fiber connectors.

FIG. 29 is a diagram of an example of an optical fiber connector 1910 having a port map 1912 that is invariant against a 180-degree rotation. Rotating the optical fiber connector 1910 180 degrees results in a port map 1914 that is the same as the port map 1912. The port map 1912 also satisfies the second universal optical fiber interconnection cable port mapping property, e.g., the optical fiber connector is TX-RX pairwise symmetric and PS symmetric with respect to the center axis parallel to the column direction.

Figure 30:
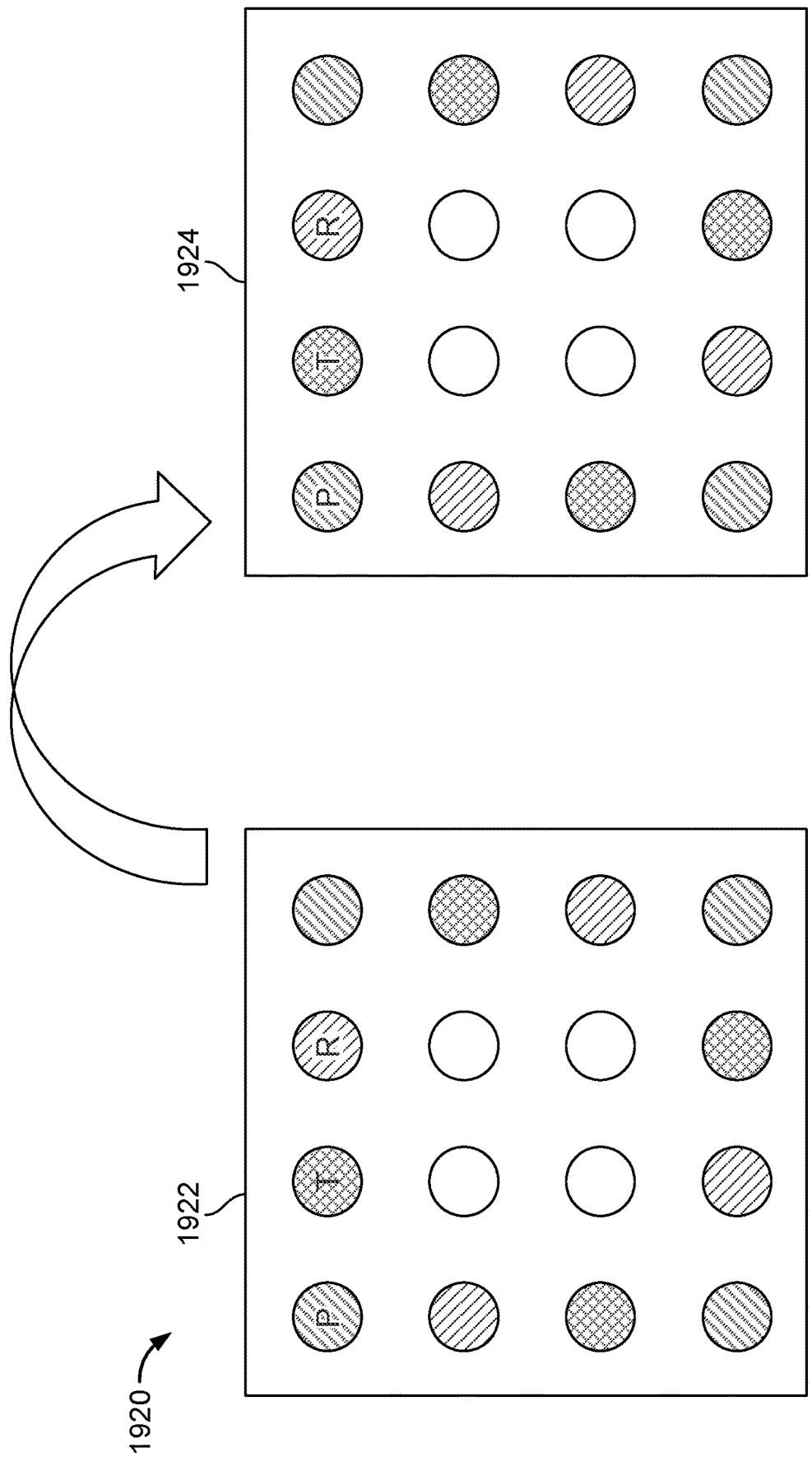

FIG. 30 is a diagram of an example of an optical fiber connector 1920 having a port map 1922 that is invariant against a 90-degree rotation. Rotating the optical fiber connector 1920 180 degrees results in a port map 1924 that is the same as the port map 1922. The port map 1922 also satisfies the second universal optical fiber interconnection cable port mapping property, e.g., the optical fiber connector is TX-RX pairwise symmetric and PS symmetric with respect to the center axis parallel to the column direction.

Figure 31A:
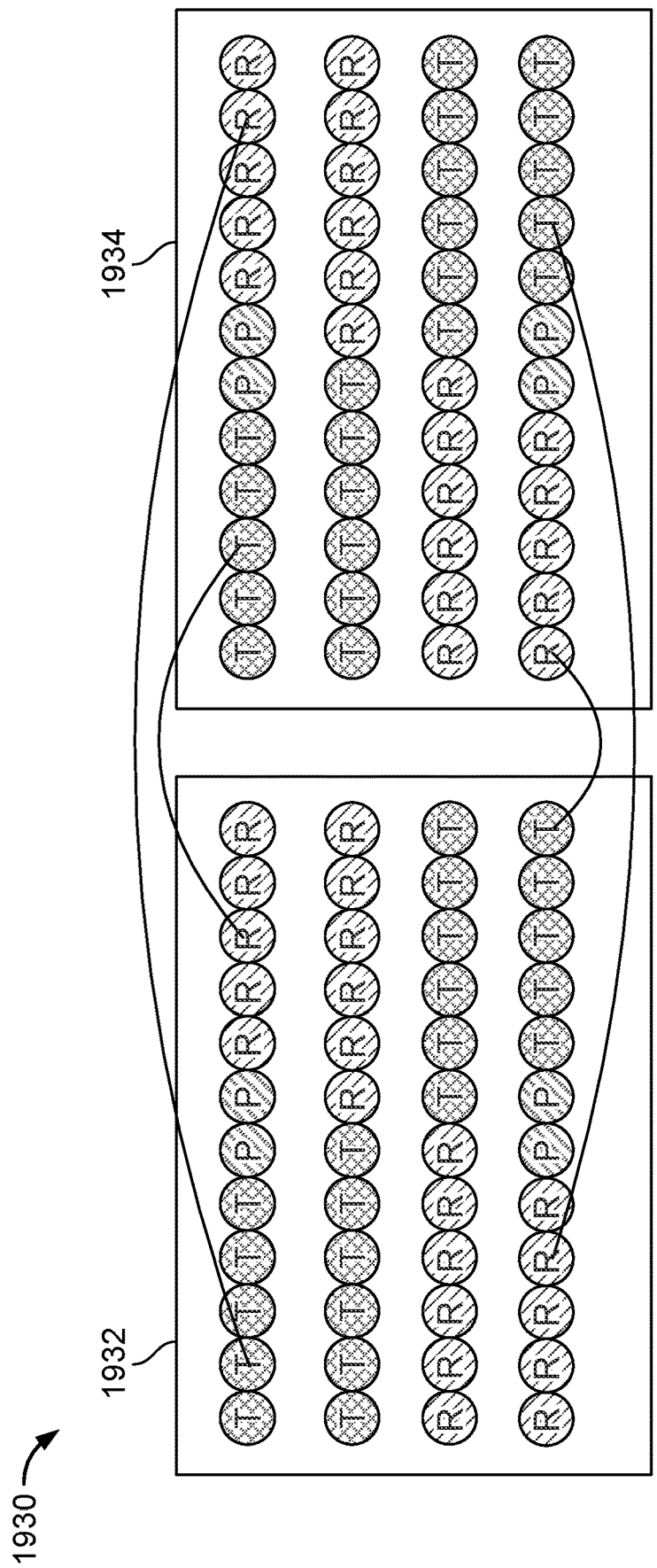

FIG. 31A is a diagram of an example of an optical fiber connector 1930 having a port map 1932 that is TX-RX pairwise symmetric and PS symmetric with respect to the center axis parallel to the column direction. When mirroring the port map 1932 to generate a mirror image 1934 and replacing each transmitter port with a receiver port as well as replacing each receiver port with a transmitter port in the mirror image 1934, the original port map 1932 is recovered. The mirror image 1934 is generated with respect to a reflection axis at the connector edge parallel to the column direction.

Figure 31B:
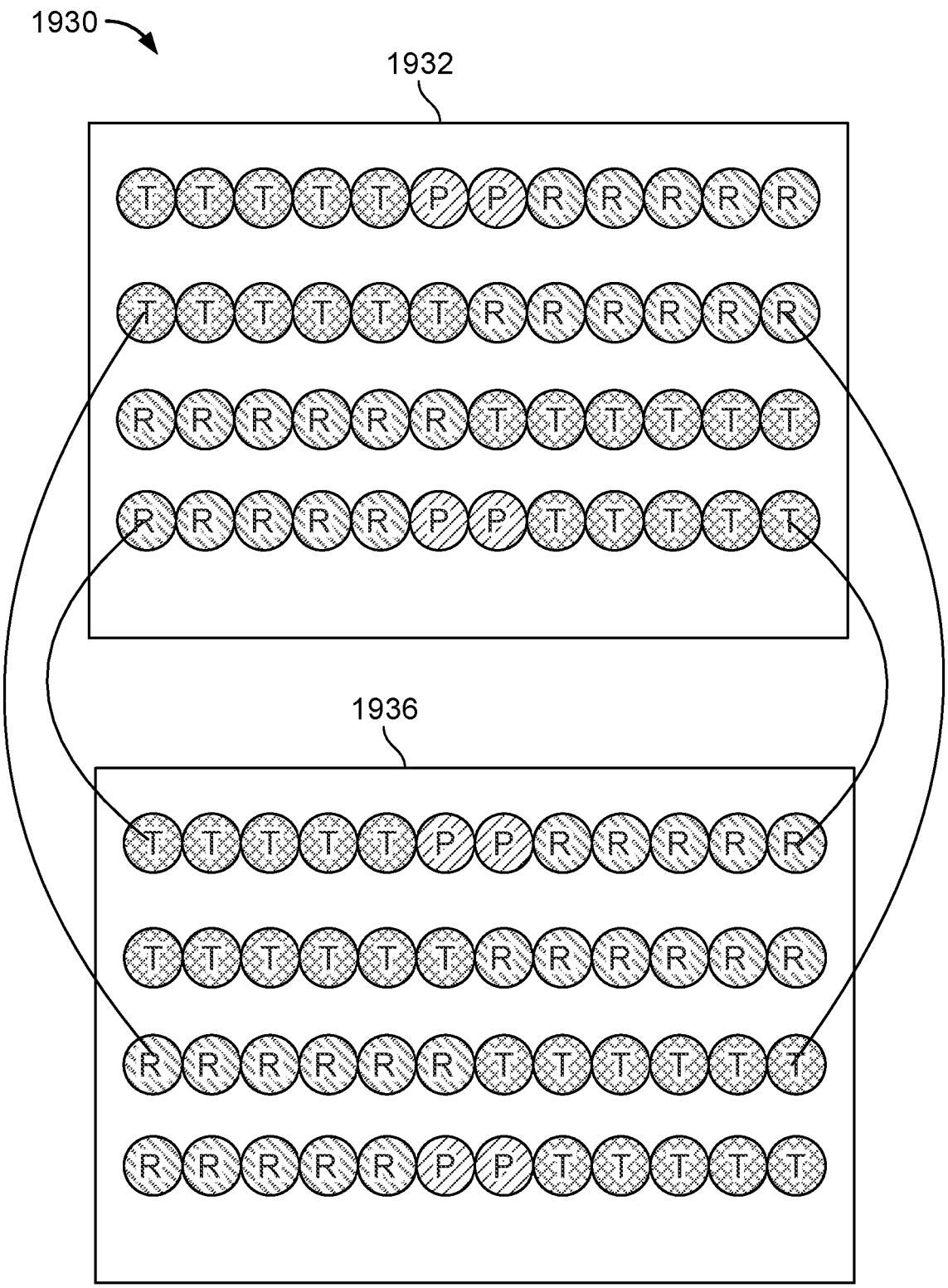

Referring to FIG. 31B, the port map 1932 of the optical fiber connector 1930 is also TX-RX pairwise symmetric and PS symmetric with respect to the center axis parallel to the row direction. When mirroring the port map 1932 to generate a mirror image 1936 and replacing each transmitter port with a receiver port as well as replacing each receiver port with a transmitter port in the mirror image 1936, the original port map 1932 is recovered. The mirror image 1936 is generated with respect to a reflection axis at the connector edge parallel to the row direction.

Additional information about the optical communication systems described in this document can be found in U.S. patent application Ser. No. 16/816,171, filed on Mar. 11, 2020, U.S. patent application Ser. No. 16/888,890, filed on Jun. 1, 2020, U.S. provisional patent application 63/080,528, filed on Sep. 18, 2020, U.S. provisional patent application 63/088,914, filed on Oct. 7, 2020, U.S. provisional patent application 63/116,660, filed on Nov. 20, 2020, and U.S. provisional patent application 63/146,421, filed on Feb. 5, 2021. The entire contents of the above applications are incorporated by reference.

In some embodiments of the above fiber-optic cable, the cable segment is configured to change the cross-sectional shape in response to being bent.

In some embodiments of any of the above fiber-optic cables, in a bent portion of the cable segment, a pair of the optical fibers is laterally separated by a larger distance than any two of the optical fibers in a straight portion of the cable segment (e.g., $a > a_0$, FIG. 3C).

In some embodiments of any of the above fiber-optic cables, in a bent portion of the cable segment, a pair of the optical fibers is laterally separated by a larger distance than any two points in an orthogonal cross-section of a straight portion of the cable segment (e.g., $a > A_0$, FIG. 3C).

In some embodiments of any of the above fiber-optic cables, the cable sheath comprises a layer of a laterally flexible material.

In some embodiments of any of the above fiber-optic cables, the cable sheath comprises a layer of a laterally stretchable material.

In some embodiments of any of the above fiber-optic cables, the plurality of optical fibers comprises at least 100 optical fibers.

In some embodiments of any of the above fiber-optic cables, the plurality of optical fibers comprises at least 1000 optical fibers.

In some embodiments of any of the above fiber-optic cables, the cable segment further comprises one or more strength members (e.g., 230, FIGS. 3-4).

In some embodiments of any of the above fiber-optic cables, the cable segment is constructed to permit lateral movement of at least some of the optical fibers with respect to the one or more strength members (e.g., as illustrated by comparison of 302, 304, 306, FIG. 3C).

In some embodiments of any of the above fiber-optic cables, at least some of the strength members are distributed throughout an interior of the cable (e.g., 230, FIG. 4B).

In some embodiments of any of the above fiber-optic cables, at least some of the strength members are more concentrated near a center of the cable (e.g., 230, FIG. 4C).

In some embodiments of any of the above fiber-optic cables, at least some of the strength members are attached to an inner surface of the cable sheath (e.g., 230, FIG. 4D).

In some embodiments of any of the above fiber-optic cables, at least some of the strength members are embedded within the cable sheath (e.g., 230, FIG. 4E).

In some embodiments of any of the above fiber-optic cables, at least some of the strength members are attached to an outer surface of the cable sheath (e.g., 230, FIG. 4F).

According to another example embodiment disclosed above, e.g., in the summary section and/or in reference to any one or any combination of some or all of FIGS. 1-7, provided is an apparatus comprising a raceway (e.g., 600, FIG. 6) having a hollow cable conduit (e.g., 602, FIG. 6), the hollow cable conduit having a curved portion and a straight portion connected to the curved portion, the curved portion of the hollow cable conduit having a larger cross-sectional size (e.g., D, FIG. 6C) measured orthogonally to a main plane of the raceway than a corresponding cross-sectional size (e.g., $D_0$, FIG. 6B) of the straight portion of the hollow cable conduit.

In some embodiments of the above apparatus, the raceway has a substantially constant height along the curved and straight portions (e.g., as in FIGS. 7A-7C and in FIG. 6E), said height being measured orthogonally to the main plain.

In some embodiments of any of the above apparatus, the raceway has a larger height along the curved portion than along the straight portion (e.g., compare FIGS. 6B and 6C), said height being measured orthogonally to the main plain.

In some embodiments of any of the above apparatus, the apparatus further comprises a fiber-optic cable (e.g., 102, FIG. 1) laid in the hollow cable conduit of the raceway.

In some embodiments of any of the above apparatus, the fiber-optic cable comprises a cable segment (e.g., 300, FIGS. 3B-3C; 520, FIG. 5B) that has a plurality of optical fibers (e.g., 220, FIG. 2, 3, 4, or 5) laterally encased by a cable sheath (e.g., 210, FIG. 2, 3, 4, or 5); and the cable segment is constructed to permit relative lateral movement of at least some of the optical fibers within the cable sheath (e.g., as illustrated by comparison of 302, 304, 306, FIG. 3C) to change a cross-sectional shape of the cable segment.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments can be implemented as circuit-based processes, including possible implementation on a single integrated circuit.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Throughout the detailed description, the drawings, which are not to scale, are illustrative only and are used in order to explain, rather than limit the disclosure. The use of terms such as height, length, width, top, bottom, is strictly to facilitate the description of the embodiments and is not intended to limit the embodiments to a specific orientation. For example, height does not imply only a vertical rise limitation, but is used to identify one of the three dimensions of a three-dimensional structure as shown in the figures. Such "height" would be vertical where the raceway is horizontal, but would be horizontal where the raceway is vertical, and so on.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof

What is claimed is:

1. A fiber-optic cable comprising:
   a cable segment that has a plurality of optical fibers laterally encased by a cable sheath; and
   a first optical fiber connector comprising one or more optical power supply fiber ports, a plurality of transmitter fiber ports, and a plurality of receiver fiber ports that are optically coupled to the plurality of optical fibers;
   wherein the one or more optical power supply fiber ports, the transmitter fiber ports, and the receiver fiber ports are arranged in the optical fiber connector according to a port map configured such that when mirroring the port map to generate a mirror image of the port map and replacing each transmitter port with a receiver port as well as replacing each receiver port with a transmitter port in the mirror image, locations of the one or more optical power supply fiber ports, the transmitter fiber ports, and the receiver ports in the mirror image are the same as locations of the one or more optical power supply fiber ports, the transmitter fiber ports, and the receiver ports in the port map;
   wherein the mirroring is performed with respect to a reflection axis at an edge of the fiber array connector;
   wherein the cable segment is constructed to permit relative lateral movement of at least some of the optical fibers within the cable sheath to change a cross-sectional shape of the cable segment.

2. The fiber-optic cable of claim 1, wherein the first optical fiber connector comprises at least one optical power supply fiber port.

3. The fiber-optic cable of claim 1, comprising a second optical fiber connector comprising at least one transmitter fiber port and at least one receiver fiber port that are optically coupled to the plurality of optical fibers;
   wherein each of the at least one transmitter fiber port of the first optical fiber connector is optically coupled to a corresponding receiver fiber port of the second optical fiber connector, and each of the at least one receiver fiber port of the first optical fiber connector is optically coupled to a corresponding transmitter fiber port of the second optical fiber connector.

4. The fiber-optic cable of claim 3 wherein each transmitter fiber port in the first optical fiber connector maps to a receiver fiber port in a mirror image of the first optical fiber connector, wherein the mirror image is generated relative to an axis of reflection at an edge of the first optical fiber connector.

5. The fiber-optic cable of claim 3 wherein each receiver fiber port in the first optical fiber connector maps to a transmitter fiber port in the mirror image of the first optical fiber connector, wherein the mirror image is generated relative to the axis of reflection at the edge of the first optical fiber connector.

6. The fiber-optic cable of claim 4 wherein each transmitter fiber port in the second optical fiber connector maps to a receiver fiber port in a mirror image of the second optical fiber connector, wherein the mirror image is generated relative to an axis of reflection at an edge of the second optical fiber connector.

7. The fiber-optic cable of claim 5 wherein each receiver fiber port in the second optical fiber connector maps to a transmitter fiber port in the mirror image of the second optical fiber connector, wherein the mirror image is generated relative to the axis of reflection at the edge of the second optical fiber connector.

8. The fiber-optic cable of claim 3, wherein the first optical fiber connector comprises at least one optical power supply fiber port, the second optical fiber connector comprises at least one optical power supply fiber port,
wherein for each optical power supply fiber port in the first optical fiber connector, there is another optical power supply fiber port in a mirror image of the first optical fiber connector, wherein the mirror image is generated relative to an axis of reflection at a main central axis of the first optical fiber connector.

9. The fiber-optic cable of claim 8 wherein each optical power supply fiber port in the second optical fiber connector maps to another optical power supply fiber port in a mirror image of the second optical fiber connector, wherein the mirror image is generated relative to an axis of reflection at a main central axis of the second optical fiber connector.

10. The fiber-optic cable of claim 3, wherein the first optical fiber connector comprises at least one optical power supply fiber port, the second optical fiber connector comprises at least one optical power supply fiber port, and each optical power supply fiber port in the first optical fiber connector is optically coupled to a corresponding optical power supply fiber port in the second optical fiber connector.

11. The fiber-optic cable of claim 1 in which at least some of the one or more power supply fiber ports, the transmitter fiber ports, and the receiver fiber ports are arranged in rows, and the reflection axis is perpendicular to a row direction.

12. The fiber-optic cable of claim 1 in which at least some of the one or more power supply fiber ports, the transmitter fiber ports, and the receiver fiber ports are arranged in rows, and the reflection axis is parallel to a row direction.

13. The fiber-optic cable of claim 1 in which at least some of the one or more power supply fiber ports, the transmitter fiber ports, and the receiver fiber ports are arranged in columns, and the reflection axis is perpendicular to a column direction.

14. The fiber-optic cable of claim 1 in which at least some of the one or more power supply fiber ports, the transmitter fiber ports, and the receiver fiber ports are arranged in columns, and the reflection axis is parallel to a column direction.

15. The fiber-optic cable of claim 1 in which the port map is invariant against a 180-degree rotation.

16. The fiber-optic cable of claim 1 in which the port map is invariant against a 90-degree rotation.

17. The fiber-optic cable of claim 3, wherein the second optical fiber connector comprises at least one optical power supply fiber port.

18. The fiber-optic cable of claim 1, comprising a second optical fiber connector comprising one or more optical power supply fiber ports, a plurality of transmitter fiber ports, and a plurality of receiver fiber ports;
wherein each of the transmitter fiber ports of the first optical fiber connector is optically coupled to a corresponding receiver fiber port of the second optical fiber connector; and
wherein each of the receiver fiber ports of the first optical fiber connector is optically coupled to a corresponding transmitter fiber port of the second optical fiber connector.

19. The fiber-optic cable of claim 18 wherein the first optical fiber connector and the second optical fiber connector have the same port map.

20. A fiber-optic cable comprising:
a cable segment that has a plurality of optical fibers laterally encased by a cable sheath; and
a first optical fiber connector comprising one or more optical power supply fiber ports, a plurality of transmitter fiber ports, and a plurality of receiver fiber ports that are optically coupled to the plurality of optical fibers;
wherein the one or more optical power supply fiber ports, the transmitter fiber ports, and the receiver fiber ports are arranged in the optical fiber connector according to a port map configured such that when mirroring the port map to generate a mirror image of the port map and replacing each transmitter port with a receiver port as well as replacing each receiver port with a transmitter port in the mirror image, locations of the one or more optical power supply fiber ports, the transmitter fiber ports, and the receiver ports in the mirror image are the same as locations of the one or more optical power supply fiber ports, the transmitter fiber ports, and the receiver ports in the port map;
wherein the mirroring is performed with respect to a reflection axis at an edge of the fiber array connector;
wherein the plurality of optical fibers are permitted to move laterally relative to one another to become relatively spatially rearranged from a first cross-section of the cable segment to a second cross-section of the cable segment, and
wherein the cable sheath comprises a laterally stretchable material that permits a cross-sectional shape of the cable segment to change in response to movement of the optical fibers within the cable sheath.

21. The fiber-optic cable of claim 20, wherein each of the plurality of optical fibers comprises a cladding, and wherein a cross-sectional diameter of each of the plurality of optical fibers does not exceed 900 micrometers.

22. The fiber-optic cable of claim 20, wherein the cable segment is terminated by one or more connectors configured to interface with at least one of an optical communication device, an optical power supply, and a multiplexing unit.

23. The fiber-optic cable of claim 22, wherein the plurality of optical fibers are arranged within a rectangular cross-section of the one or more connectors.

* * * * *